US012281203B2

United States Patent
Nguyen et al.

(10) Patent No.: US 12,281,203 B2
(45) Date of Patent: Apr. 22, 2025

(54) THERMALLY RESPONSIVE BRUSH POLYMERS HAVING A COPOLYMER BACKBONE AND COPOLYMER ARMS

(71) Applicant: Infineum International Limited, Oxfordshire (GB)

(72) Inventors: Nga Nguyen, Linden, NJ (US); Ronald M. Lewis, Linden, NJ (US); Remzi Becer, Coventry (GB); Matilde Concilio, Coventry (GB)

(73) Assignee: Infineum International Limited, Oxfordshire (GB)

( * ) Notice: Subject to any disclaimer, the term of this patent is extended or adjusted under 35 U.S.C. 154(b) by 0 days.

(21) Appl. No.: 18/269,637

(22) PCT Filed: Dec. 21, 2021

(86) PCT No.: PCT/EP2021/087011
§ 371 (c)(1),
(2) Date: Jun. 26, 2023

(87) PCT Pub. No.: WO2022/136384
PCT Pub. Date: Jun. 30, 2022

(65) Prior Publication Data
US 2024/0309155 A1     Sep. 19, 2024

Related U.S. Application Data

(60) Provisional application No. 63/130,474, filed on Dec. 24, 2020.

(51) Int. Cl.
| | |
|---|---|
| *C08G 81/02* | (2006.01) |
| *C10M 149/12* | (2006.01) |
| *C10M 169/04* | (2006.01) |
| *C10N 20/00* | (2006.01) |
| *C10N 20/02* | (2006.01) |
| *C10N 20/04* | (2006.01) |

(52) U.S. Cl.
CPC ......... *C08G 81/024* (2013.01); *C10M 149/12* (2013.01); *C10M 169/041* (2013.01); *C10M 2203/003* (2013.01); *C10M 2217/046* (2013.01); *C10N 2020/02* (2013.01); *C10N 2020/04* (2013.01); *C10N 2020/071* (2020.05)

(58) Field of Classification Search
CPC .............. C08G 81/024; C10M 149/12; C10M 169/041; C10M 2203/003; C10M 2217/046; C10N 2020/02; C10N 2020/04; C10N 2020/071
See application file for complete search history.

(56) References Cited

U.S. PATENT DOCUMENTS

| | | |
|---|---|---|
| 2,719,125 A | 9/1955 | Roberts |
| 2,719,126 A | 9/1955 | Fields et al. |
| 2,760,933 A | 8/1956 | Fields et al. |
| 2,836,564 A | 5/1958 | Fields et al. |
| 3,087,937 A | 4/1963 | Giorgio et al. |
| 3,254,025 A | 5/1966 | Le Suer |
| 3,502,677 A | 3/1970 | Sner |
| 3,663,561 A | 5/1972 | Blaha |
| 4,259,194 A | 3/1981 | deVries et al. |
| 4,259,195 A | 3/1981 | King et al. |
| 4,261,843 A | 4/1981 | King et al. |
| 4,263,152 A | 4/1981 | King et al. |
| 4,265,773 A | 5/1981 | deVries et al. |
| 4,272,387 A | 6/1981 | King et al. |
| 4,283,295 A | 8/1981 | deVries et al. |
| 4,285,822 A | 8/1981 | deVries et al. |
| 4,857,214 A | 8/1989 | Papay et al. |
| 4,873,009 A | 10/1989 | Anderson |
| 5,840,663 A | 11/1998 | Nibert et al. |
| 2009/0005277 A1 | 1/2009 | Watts et al. |

FOREIGN PATENT DOCUMENTS

WO     WO-94/06897 A1     3/1994

OTHER PUBLICATIONS

Weber, C., Becer, C.R., Guenther, W., Hoogenboom, R., Schubert, U.S., "Dual Responsive Methacrylic acid and Oligo(2-ethyl-2-oxazoline) Containing Graft Copolymers", Macromolecules, 2010, 43, 160-167 (Year: 2010).*
Beyer, V.P., Cattoz, B., Strong, A., Schwarz, A., Becer, C.R., "Brush Copolymers from 2-Oxazoline and Acrylic Monomers via an Inimer Approach", Macromolecules, 2020, 53, 2950-2958 (Year: 2020).*
Bassiri et al., Polymerization of Cyclic Imino Ethers. I. Oxazolines, J. Polym. Sci. Part B Polym. Lett., 5(9): 871-879 (1967).
Diab et al., Microcalorimetric Study of the Temperature-Induced Phase Separation in Aqueous Solutions of Poly(2-Isopropyl-2-Oxazolines), Macromolecules, 37(7): 2556-2562 (2004).
Fedors, A Method for Estimating Both the Solubility Parameters and Molar Volumes of Liquids, Polym. Eng. Sci., 14(2): 147-154 (Feb. 1974).
Fu et al., UCST-Type thermoresponsive polymers in synthetic lubricating oil polyalphaolefin (PAO), Macromolecules, 51(5):1674-80 (2018).

(Continued)

*Primary Examiner* — James C Goloboy

(74) *Attorney, Agent, or Firm* — MARSHALL, GERSTEIN & BORUN LLP

(57) ABSTRACT

The description involves a brush copolymer composition comprising a copolymeric backbone including monomeric repeat units of at least two different acrylate monomers and copolymeric brush arms including monomeric repeat units of at least two different acylated poly(alkylene amine)s, in which the brush arms, the brush copolymer, or both may advantageously exhibit UCST behavior, e.g, in hydrocarbon diluent. Methods of making such copolymers using RAFT and CROP (pseudo-)living reaction processes are also described herein.

9 Claims, No Drawings

(56) References Cited

OTHER PUBLICATIONS

Hoogenboom et al., A Schizophrenic Gradient Copolymer: Switching and Reversing Poly(2-Oxazoline) Micelles Based on UCST and Subtle Solvent Changes, Soft Matter, 5(19): 3590-3592 (2009).
Hoogenboom et al., High-Throughput Synthesis and Screening of a Library of Random and Gradient Copoly(2-oxazoline)s, Journal of Combinatorial Chemistry, 8(2): 145-148.
Hoogenboom et al., Tuning Solution Polymer Properties by Binary Water-Ethanol Solvent Mixtures, Soft Matter, 4(1): 103-107 (2008).
Huber et al., Effect of End Group Polarity Upon the Lower Critical Solution Temperature of Poly(2-Isopropyl-2-Oxazoline), Colloid Polym. Sci., 286(14-15): 1653-1661 (2008).
Interntational Application No. PCT/EP2021/087011, International Search Report and Written Opinion, Apr. 25, 2022.
Jung et al., Linear and Cyclic Poly(2-Isopropyl-2-Oxazoline)s for Fine Control of Thermoresponsiveness, Eur. Polym. J., 88: 605-612 (2017).
Kagiya et al., Ring Opening Polymerization of 2-Substituted 2 Oxazolines, J. Polym. Sci. Part B Polym. Lett., 4(7): 441-445 (1966).
Kobayashi et al., Block Copolymers from Cyclic Imino Ethers: A New Class of Nonionic Polymer Surfactant, Macromolecules, 19(3): 535-541 (1986).
Lambermont-Thijs et al., Solubility Behavior of Amphiphilic Block and Random Copolymers Based on 2-Ethyl-2-Oxazoline and 2-Nonyl-2-Oxazoline in Binary Water-Ethanol Mixtures, J. Polym. Sci. Part A Polym. Chem., 47(2): 515-522 (2009).
Lambermont-Thijs et al., Temperature Induced Solubility Transitions of Various Poly(2-Oxazoline)s in Ethanol-Water Solvent Mixtures, Polymers, 2(3): 188-199 (2010).
Lin et al., Solubility and Miscibility of Poly(Ethyl Oxazoline), Polym. Phys. 26(3): 603-619 (1988).
Meyer et al., Unexpected Thermal Characteristics of Aqueous Solutions of Poly(2-Isopropyl-2-Oxazolines), Soft Matter, 3(4): 430-431 (2007).
Park et al., Versatile Synthesis of End-Functionalized Thermosensitive Poly(2-Isopropyl-2-Oxazolines), Macromolecules, 37(18): 6786-6792 (2004).
Perrier, Raft Polymerization—A User's Guide, Macromolecules, 50: 7443-47 (2017).
Pizzi et al., Poly(2-Oxazoline) Macromonomers as Building Blocks for Functional and Biocompatible Polymer Architectures, Eur. Polym. J., 121: 109258 (2019).
Rossegger et al., Design Strategies for Functionalized Poly(2-oxazolines) and Derived Materials, Polymers, 5(3): 956-1011 (2013).
Rudin et al., Free-Radical Polymerization, The Elements of Polymer Science & Engineering, 3rd ed., 341-389 (2013).
Saegusa et al., One-Shot Block Copolymerization, Makromol. Chem. Macromol. Symp., 31(1): 1-10 (1990).
Schlaad et al., Poly(2-Oxazoline)s as Smart Bioinspired Polymers, Macromol. Rapid Commun., 31(6): 511-525 (2010).
Seeliger et al., Recent Syntheses and Reactions of Cyclic Imidic Esters, Angew. Chem. Int. Ed. Engl., 5(10): 875-888 (1966).
Smallheer et al., Chemistry of Additives, Lubricant Additives, 1-11 (1967).
Tomalia et al., Homopolymerization of 2-alkyl- and 2-aryl-2-oxazolines, J. Polym. Sci. Part A-1 Polym. Chem., 4(9): 2253-2265 (1966).
Uyama et al., A Novel Thermo-Senstive Polymer. Poly(2-Iso-Propyl-2-Oxazoline), Chem Lett., 21(9): 1643-1646 (1992).
Verbraeken et al., The Chemistry of Poly(2-oxazolines), Eur. Polym. J., 88: 451-469 (2017).
Weber et al., Dual responsive methacrylic acid and olig(2-ethyl-2-oxazoline) containing graft copolymers, Macromolecules, 43:160-7 (2009).
Yoshida et al., Stimuli-Responsive Reversible Physical Networks. I. Synthesis and Physical Network Properties of Amphiphilic Block an Random Copolymers with Long Alkyl Chains by Living Cationic Polymerization, J. Polym. Sci. Part A Polym. Chem., 43(6): 1155-1165 (2005).

\* cited by examiner

THERMALLY RESPONSIVE BRUSH POLYMERS HAVING A COPOLYMER BACKBONE AND COPOLYMER ARMS

FIELD

This disclosure generally relates to brush copolymers having a copolymeric backbone and copolymeric brush arms. The copolymeric brush arms and/or the brush copolymers themselves may exhibit upper critical solution temperature (UCST) behavior in a relatively non-polar diluent. Such brush copolymers may be useful in modifying viscosity of compositions such as lubricant compositions (e.g., for passenger car, heavy-duty diesel, and/or marine diesel engines) or other functional fluids, such as manual/automatic transmission fluids. More specifically, such brush copolymers may have a poly(meth)acrylate copolymer backbone, onto which acylated poly(alkylene amine) copolymers such as polyoxazolines may be grafted. Lubricant compositions containing such brush copolymers, as well as methods of manufacturing such brush copolymers, are also described herein.

BACKGROUND

Since 1966, when the living cationic ring-opening polymerization (CROP) of 2-oxazolines was first reported by four independent research groups (T. Kagiya et al., Ring-Opening Polymerization of 2-Substituted 2-Oxazolines. *J. Polym. Sci. Part B Polym. Lett.,* 1966, 4 (7), 441-445; W. Seeliger et al., Recent Syntheses and Reactions of Cyclic Imidic Esters. *Angew. Chem. Int. Ed. Engl.,* 1966, 5 (10), 875-888; D. A. Tomalia, et al., Homopolymerization of 2-alkyl- and 2-aryl-2-oxazolines. *J. Polym. Sci. Part A-1 Polym. Chem.,* 1966, 4 (9), 2253-2265; and T. G. Bassiri, et al., Polymerization of Cyclic Imino Ethers. I. Oxazolines. *J. Polym. Sci. Part B Polym. Lett.,* 1967, 5 (9), 871-879), 2-oxazoline monomers and their corresponding poly(2-alkyl-2-oxazolines)s have gained an increasing interest for the development of high-performance polymeric materials especially for bio-medical applications.

Under appropriate conditions, the CROP of 2-oxazolines can proceed in a living or quasi-living fashion, following the typical mechanism of a chain-growth polymerization. B. Verbraeken, et al., The Chemistry of Poly(2-oxazoline)s. *Eur. Polym. J.,* 2017, 88, 451-469. The living nature of the polymerization allows the synthesis not only of well-defined homopolymers, but also of well-defined random and block copolymers depending on the reactivity of the 2-oxazoline monomers. S. Kobayashi, et al., Block Copolymers from Cyclic Imino Ethers: A New Class of Nonionic Polymer Surfactant. *Macromolecules,* 1986, 19 (3), 535-541; T. Saegusa, et al., One-Shot Block Copolymerization. *Makromol. Chem. Macromol. Symp.,* 1990, 31 (1), 1-10.

Additionally, by varying the substituent on the 2-position of the 2-oxazoline ring, the structure and physical properties of the poly(2-alkyl-2-oxazoline)s can be precisely tuned and adjusted depending on the desired application. In addition to linear (co)polymers, different architectures obtained via copolymerization with other monomers have been described in literature (e.g., E. Rossegger, et al., Design Strategies for Functionalized Poly(2-oxazoline)s and Derived Materials. *Polymers,* 2013, 5 (3), 956-1011; H. Schlaad et al., Poly(2-Oxazoline)s as Smart Bioinspired Polymers. *Macromol. Rapid Commun.,* 2010, 31 (6), 511-525; D. Pizzi, et al., Poly(2-Oxazoline) Macromonomers as Building Blocks for Functional and Biocompatible Polymer Architectures. *Eur. Polym. J.,* 2019, 121, 109258). Among them, brush and graft-(co)polymers are of great interest, since the properties of different polymeric units can be combined within the same molecule opening the possibility of a variety of potential applications. Three synthetic methods may be used for the synthesis of graft-copolymers: (i) grafting-through, (ii) grafting-from, and (iii) grafting-onto.

However, graft architectures based on poly(2-alkyl-2-oxazoline)s are rare. They are mainly synthesized via the grafting-through method, in which the living oxazolinium species are end-capped with a (meth)acrylate and then (co)polymerized with other monomers.

On the one hand, the use of living polymerization techniques can present many advantages (i.e., a good control over the molecular weight, the dispersity values, and the macromolecular architecture of the resulting polymers, well-defined end groups, and the possibility to easily synthesize block copolymers). On the other hand, a large variety of monomers can be (co)polymerize with the conventional free radical polymerization due to the easy reaction conditions and the high tolerance towards many functional groups. However, well-defined (co)polymers usually cannot be obtained via free radical polymerization due to the occurrence of termination reactions (A. Rudin, et al., Free-Radical Polymerization. *The Elements of Polymer Science & Engineering,* 3rd ed.; Academic Press: 2013; pp 341-389). Therefore, the development of processes combining both the advantages of living polymerizations and the versatility of the free radical polymerization is considered of interest in the polymer chemistry field.

The three main mechanisms of controlled radical polymerization (CRP) are: (i) nitroxide mediated polymerization (NMP), (ii) atom transfer radical polymerization (ATRP), and (iii) reversible addition-fragmentation chain-transfer (RAFT) polymerization. Among them, RAFT polymerization is considered one of the most powerful and versatile methods to provide living character to radical polymerizations. RAFT polymerization can often tend to have relatively easy reaction conditions and relatively high functional group tolerance, which allow polymerization of a wide variety of monomers (wider than for NMP and ATRP), over a broad range of temperatures and in a large choice of solvents. Thus, the combination of CROP and RAFT polymerization techniques, as herein, may provide a powerful tool to obtain well-defined polymers based on poly(2-alkyl-2-oxazoline)s and RAFT monomers with precise architectures.

The ability of combining hydrophilic and hydrophobic monomers into well-defined polymers with specific macromolecular architectures opens a variety of potential applications, especially for their amphiphilic character, which can result in self-assembling in solution into nanoscale-size objects. Their self-assembling behavior can be also triggered by an external stimulus, making them valuable and versatile candidates for a broad range of applications. Polymers that respond to temperature are gaining special attention due to their potential applications in the biomedical field, as well as in water-recovery strategies, and in architecture.

However, the temperature-responsive behavior of linear (co)polymers and (co)polymers with more complex architectures has been studied especially in pure water or in alcohol/water mixtures. Indeed, only a limited amount of studies reports polymers with thermoresponsiveness in non-aqueous media.

It has been observed that linear poly(octadecyl vinyl ether) can undergo an upper critical solution temperature (UCST) phase transition around 30° C. in various solvents due to the crystallization of the long alkyl chains (T.

Yoshida, et al., Stimuli-Responsive Reversible Physical Networks. I. Synthesis and Physical Network Properties of Amphiphilic Block and Random Copolymers with Long Alkyl Chains by Living Cationic Polymerization. *J. Polym. Sci. Part A Polym. Chem.*, 2005, 43 (6), 1155-1165).

Block copolymers of polystyrene and polyisoprene can form cylindrical micelles or vesicles in heptane at room temperature, depending on the length of the isoprene block, and they may be reversibly changed into spherical or cylindrical micelles, respectively, upon heating up to ~40° C. Poly(styrene-dimethylsiloxane) diblock copolymers can self-assemble into vesicles in various dialkyl phthalates at room temperature. With the increase in temperature and, thus, the decrease in the selectivity of the solvent, a reversible morphological transition from vesicles to cylinders to spherical micelles may be observed.

Poly(lauryl methacrylate-block-styrene-block-lauryl methacrylate) gradient copolymers can form spherical colloidal micelles into a commercially available aliphatic oil, which swell when the temperature is increased due to the gradual solubilisation of the domains in which the two blocks are mixed.

It has been shown that the worm phase obtained via polymerization-induced self-assembly (PISA) of diblock copolymers composed of benzyl methacrylate and lauryl methacrylate can form a soft free-standing gel at ~20° C. in n-dodecane. This gel can undergo degelation when heated above ~50° C., due to a worm-to-sphere transition, which appears to be irreversible for dilute solutions (~0.10% w/w), and they may become reversible when the polymer concentration is increased (~20% w/w).

Block copolymers of stearyl methacrylate and 3-phenylpropyl methacrylate can form pure worm phases in n-octane, resulting in physical gels at room temperature. Upon heating, the gels can turn into free flowing solutions, supposedly due to a morphological transition from worm to spherical nanoparticles caused by a change in solvation of the 3-phenylpropyl methacrylate block.

All-acrylic di-block copolymer nanoparticles composed of lauryl acrylate and benzyl acrylate can also show a similar behaviour in n-dodecane. More recently, the thermoresponsive behaviour of diblock copolymer vesicles of stearyl methacrylate and benzyl methacrylate directly prepared in mineral oil via PISA has been studied. Also in this case, the diblock copolymers can undergo a vesicle-to-worm phase transition upon heating.

A UCST-type behavior in polyalphaolefin (PAO) has been observed for homopolymers and random copolymers of alkyl methacrylate monomers with an appropriate alkyl pendant length. Additionally, a series of ABA triblock copolymers containing a PAO-philic middle block and temperature-responsive outer blocks have been synthesized by RAFT polymerization using a difunctional chain transfer agent. At appropriate block compositions and concentrations, the triblock copolymers appear to show a tunable thermally reversible sol-gel transition.

Graft-copolymers consisting of polyolefin backbones grafted with butyl and lauryl methacrylates can show a UCST behavior in n-dodecane: at low temperature, clusters containing methacrylate-rich domains can be observed due to the low solubility of the side chains, while the high temperature seems to favor the de-aggregation into single chains due to an increase in the methacrylate side chains solubility.

Finally, the solution behavior of linear polydimethylsiloxane-poly(2-(dimethylamino)ethyl methacrylate) diblock copolymers in decamethyl cyclopentasiloxane silicone oil has been recently studied: the diblock copolymers seem to undergo a warm-to-sphere transition upon heating caused by a reversible solvent plasticization of the poly(2-(dimethylamino)ethyl methacrylate) cores.

Also in the case of poly(2-alkyl-2-oxazoline)-based materials, their tunable thermoresponsive behavior has only been studied in pure water or in water/alcohol mixtures. For example, the temperature responsive behavior of 2-ethyl-2-oxazoline and 2-isopropyl-2-oxazoline homopolymers has been extensively reported. It has been shown that they present a lower critical solution temperature (LCST) in aqueous solutions (P. Lin, et al., Solubility and Miscibility of Poly(Ethyl Oxazoline). *Polym. Phys.*, 1988, 26 (3), 603-619; U. Hiroshi, et al., A Novel Thermo-Sensitive Polymer. Poly(2-Iso-Propyl-2-Oxazoline). *Chem. Lett.*, 1992, 21 (9), 1643-1646.; C. Diab, et al., Microcalorimetric Study of the Temperature-Induced Phase Separation in Aqueous Solutions of Poly(2-Isopropyl-2-Oxazolines). *Macromolecules*, 2004, 37 (7), 2556-2562; J. S. Park, et al., Versatile Synthesis of End-Functionalized Thermosensitive Poly(2-Isopropyl-2-Oxazolines). *Macromolecules*, 2004, 37 (18), 6786-6792; M. Meyer, et al., Unexpected Thermal Characteristics of Aqueous Solutions of Poly(2-Isopropyl-2-Oxazoline). *Soft Matter*, 2007, 3 (4), 430-431; S. Huber, et al., Effect of End Group Polarity Upon the Lower Critical Solution Temperature of Poly(2-Isopropyl-2-Oxazoline). *Colloid Polym. Sci.*, 2008, 286 (14-15), 1653-1661; Y. Jung, et al., Linear and Cyclic Poly(2-Isopropyl-2-Oxazoline)s for Fine Control of Thermoresponsiveness. *Eur. Polym. J*, 2017, 88, 605-612). The LCST can be varied and precisely controlled by copolymerizing 2-oxazoline monomers with different alkyl side-chain length and, thus, different hydrophilicity/hydrophobicity ratios.

More complex architectures have also been studied in order to enhance the properties of the final material and have a better control over the temperature range of the phase transition. Among all, comb- and graft-copolymers based on poly(2-alkyl-2-oxazoline)s showing a tunable LCST in aqueous solutions are of great interest due to the aforementioned application potential. However, despite the large amount of work on 2-oxazoline polymers showing a LCST behavior, few polyoxazolines have been reported show a upper critical solution temperature (UCST) phase transition, and those reported have only occurred in alcohol/water mixtures. H. M. L. Lambermont-Thijs, et al., Solubility Behavior of Amphiphilic Block and Random Copolymers Based on 2-Ethyl-2-Oxazoline and 2-Nonyl-2-Oxazoline in Binary Water-Ethanol Mixtures. *J. Polym. Sci. Part A Polym. Chem.*, 2009, 47 (2), 515-522. 81, 89-91; H. M. L. Lambermont-Thijs, et al., Temperature Induced Solubility Transitions of Various Poly(2-Oxazoline)s in Ethanol-Water Solvent Mixtures. *Polymers*, 2010, 2 (3), 188-199; R. Hoogenboom, et al., A Schizophrenic Gradient Copolymer: Switching and Reversing Poly(2-Oxazoline) Micelles Based on UCST and Subtle Solvent Changes. *Soft Matter*, 2009, 5 (19), 3590-3592; R. Hoogenboom, et al., Tuning Solution Polymer Properties by Binary Water-Ethanol Solvent Mixtures. *Soft Matter*, 2008, 4 (1), 103-107.

As described further herein, brush arm copolymers (and even some linear homopolymers) of 2-stearyl-2-oxazoline (SteOx) and 2-ethyl-2-oxazoline (EtOx), as well as other oxazoline monomers were synthesized via living CROP, resulting in well-defined polymers with different polarity and oil solubility. Additionally, grafted brush copolymers having a methacrylic acid-(2-ethylhexyl) methacrylate random copolymer backbone (poly(xMA)), obtained via RAFT polymerization, reacted with the brush arm copolymer side chains (polyOx) using the grafting-onto method. The solubility behavior in a commercially available oil (e.g., Yubase™ 4) of the 2-oxazoline copolymers, as well as of the grafted brush copolymers, were evaluated using turbidity measurements and thermal analyses. It is believed that this is the first example of thermoresponsive linear copolymers and grafted brush copolymers based on 2-oxazolines and methacrylate monomers showing an UCST-type phase transition in pure non-aqueous systems.

The present disclosure also provides a use of a brush copolymer composition according to the present disclosure to modify a turbidity, thermal, and/or viscometric property of a lubricant composition.

DETAILED DESCRIPTION

The present disclosure relates to brush copolymers, to methods of making them, and to application(s)/use(s) thereof, e.g., as lubricant components and/or in lubricant compositions. The brush copolymers disclosed herein have a copolymeric backbone and copolymeric brush arms.

The copolymeric brush arms can comprise, consist essentially of, or consist of monomeric repeat units of at least two different acylated poly(alkylene amine)s of formulae (1) and (2), respectively.

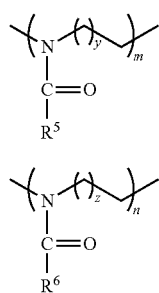

In formulae (1) and (2), each $R^5$ may individually be hydrogen or a linear or branched $C_1$-$C_{24}$ alkyl moiety (in particular, a linear or branched $C_2$-$C_{18}$ alkyl moiety), and each $R^6$, being different from each $R^5$ although having the same or a greater number of carbons than each $R^5$, may individually be a linear or branched $C_8$-$C_{24}$ alkyl moiety (in particular, a linear or branched $C_8$-$C_{20}$ alkyl moiety). In these formulae, subscripts y and z may each be 1 or 2 (in particular, both subscripts y and z can be 1). Because of the typical similarity (though not identicality) between the monomeric repeat units of formulae (1) and (2), it is believed that the brush arms may be random (or close to random) copolymers, but in any event are not block copolymers and typically do not having a high block copolymer character.

As used herein, the term "alkyl" in reference to hydrocarbons should be understood to distinguish non-aromatic, non-heteroatom-containing hydrocarbons from both aromatic hydrocarbons and from heteroatom-containing hydrocarbons, and thus the term "alkyl" may be defined as including cycloalkyl groups, alkenyl groups having one or more carbon-carbon double bonds (in addition to or exclusive of any cyclic groups; also including conjugated double bonds, so long as the conjugation does not form an aromatic conjugation), and alkynyl groups having one or more carbon-carbon triple bonds (in addition to or exclusive of any carbon-carbon double bonds and/or any cyclic groups). As one of ordinary skill in the art knows, in hydrocarbonaceous material, "heteroatoms" represent atoms other than hydrogen and carbon, which may include, but are not necessarily limited to, oxygen, nitrogen, sulfur, phosphorus, selenium, halogens, metalloids (such as boron, silicon, germanium, arsenic, antimony, tellurium, and the like), metals (such as alkali metals, alkaline earth metals, transition metals, lanthanides, actinides, aluminum, gallium, indium, lead, tin, bismuth, and the like), and noble gases. In some embodiments, however, the term "alkyl" may be limited to only acyclic, singly-carbon-carbon-bonded hydrocarbons.

In embodiments where the brush arms consist of only monomers of formulae (1) and (2), the sum of subscripts m and n will of course represent 100 mol % of an average degree of polymerization of the copolymeric brush arms. However, in embodiments where the brush arms comprise or consist essentially of monomers formulae (1) and (2), the sum of m+n may be from 60 mol % to 100 mol % (e.g., from 60 mol % to 99 mol %, from 60 mol % to 95 mol %, from 60 mol % to 90 mol %, from 60 mol % to 85 mol %, from 60 mol % to 80 mol %, from 70 mol % to 100 mol %, from 70 mol % to 99 mol %, from 70 mol % to 95 mol %, from 70 mol % to 90 mol %, from 70 mol % to 85 mol %, from 70 mol % to 80 mol %, from 80 mol % to 100 mol %, from 80 mol % to 99 mol %, from 80 mol % to 95 mol %, from 80 mol % to 90 mol %, from 90 mol % to 100 mol %, from 90 mol % to 99 mol %, from 90 mol % to 95 mol %, from 95 mol % to 100 mol %, from 95 mol % to 99 mol %, or from 99 mol % to 100 mol %; in particular, from 90 mol % to 100 mol %, from 95 mol % to 100 mol %, or from 99 mol % to 100 mol %) of the average degree of polymerization of the copolymeric brush arms.

Additionally or alternatively, the average degree of polymerization of the brush arms and/or the sum of m+n may be 100 or less (e.g., 85 or less, 75 or less, 65 or less, 60 or less, 55 or less, 50 or less, 45 or less, 40 or less, 35 or less, or 30 or less); optionally but preferably, the average degree of polymerization of the brush arms and/or the sum of m+n may also be at least 8 (e.g., at least 11, at least 14, at least 17, at least 20, at least 23, or at least 25) (in particular, the average degree of polymerization of the brush arms and/or the sum of m+n may be 75 or less, 60 or less, from 11 to 75, or from 14 to 60). Further additionally or alternatively, the brush arms may be characterized by a ratio of subscripts m:n; e.g., the ratio of m:n may be from 1:99 to 9:1, from 1:49 to 4:1, from 1:25 to 2:1, from 1:19 to 1.5:1, from 1:14 to 1:1, or from 1:9 to 1:1.5 (in particular, from 1:25 to 2:1, from 1:19 to 1.5:1, from 1:14 to 1:1, or from 1:9 to 1:1.5).

The copolymeric backbone can comprise, consist essentially of, or consist of monomeric repeat units of at least two different acrylate monomers of formulae (3) and (4), respectively.

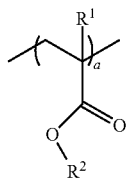

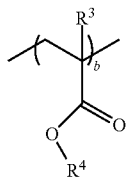

(4)

In formulae (3) and (4), each $R^1$ and $R^3$ may individually be hydrogen, a linear or branched $C_1$-$C_4$ alkyl moiety, or a mixture thereof (in particular, hydrogen, methyl, and/or ethyl); each $R^2$ may individually be a covalently-linked copolymeric brush arm, a residual hydrogen, a residual trisubstituted silyl group in which the substitutions are each individually a linear, branched, and/or cyclic $C_1$-$C_8$ alkyl, aryl, alkaryl, or aralkyl moiety, a residual linear, cyclic, or branched $C_1$-$C_7$ acyl moiety, a residual linear or branched $C_1$-$C_4$ hydroxyalkyl moiety, or a residual monovalent counterion (in particular, a covalently-linked copolymeric brush arm, a residual hydrogen, a residual linear or branched $C_2$-$C_4$ hydroxyalkyl moiety, or a residual monovalent counterion); and each $R^4$ may individually be a linear, branched, and/or cyclic $C_8$-$C_{30}$ alkyl, aryl, alkaryl, or aralkyl moiety (in particular, a linear or branched $C_8$-$C_{22}$ alkyl moiety). In a particular embodiment, the brush copolymer composition comprises a copolymeric backbone in which at least 40 mol % (e.g., at least 45 mol %, at least 50 mol %, at least 55 mol %, at least 60 mol %, at least 65 mol %, at least 70 mol %, at least 75 mol %, at least 80 mol %, at least 85 mol %, or at least 90 mol %) of the $R^2$ groups are covalently-linked copolymeric brush arms. In a particular embodiment, it is believed that the copolymeric backbone may be a random (or close to random) copolymer, but in any event is not a block copolymer and typically does not have a high block copolymer character.

When a residual monovalent counterion is present, it can advantageously be a monovalent cation. In some embodiments, the residual monovalent counterion may comprise, consist essentially of, or consist of: a metal ion such as lithium, potassium, sodium, copper(I), silver(I), or the like, or a combination thereof, a nonmetal ion such as ammonium or the like; or a mixture thereof.

In embodiments where the copolymeric backbone consists of only monomers of formulae (1) and (2), the sum of subscripts a and b will of course represent 100 mol % of an average degree of polymerization of the copolymeric backbone. However, in embodiments where the copolymeric backbone comprises or consists essentially of monomers formulae (1) and (2), the sum of a+b may be from 60 mol % to 100 mol % (e.g., from 60 mol % to 99 mol %, from 60 mol % to 95 mol %, from 60 mol % to 90 mol %, from 60 mol % to 85 mol %, from 60 mol % to 80 mol %, from 70 mol % to 100 mol %, from 70 mol % to 99 mol %, from 70 mol % to 95 mol %, from 70 mol % to 90 mol %, from 70 mol % to 85 mol %, from 70 mol % to 80 mol %, from 80 mol % to 100 mol %, from 80 mol % to 99 mol %, from 80 mol % to 95 mol %, from 80 mol % to 90 mol %, from 90 mol % to 100 mol %, from 90 mol % to 99 mol %, from 90 mol % to 95 mol %, from 95 mol % to 100 mol %, from 95 mol % to 99 mol %, or from 99 mol % to 100 mol %; in particular, from 90 mol % to 100 mol %, from 95 mol % to 100 mol %, or from 99 mol % to 100 mol %) of the average degree of polymerization of the copolymeric backbone.

Additionally or alternatively, the average degree of polymerization of the copolymeric backbone and/or the sum of a+b may be 500 or less (e.g., 450 or less, 400 or less, 350 or less, 300 or less, 250 or less, 200 or less, 150 or less, 120 or less, 100 or less, 90 or less, 80 or less, 70 or less, 60 or less, or 50 or less); optionally but preferably, the average degree of polymerization of the copolymeric backbone and/or the sum of a+b may also be at least 15, at least 20, at least 25, at least 30, at least 35, at least 40, at least 45, at least 50, at least 75, or at least 100 (in particular, the average degree of polymerization of the copolymeric backbone and/or the sum of a+b may be 400 or less, 250 or less, from 20 to 250, or from 25 to 200). Further additionally or alternatively, the copolymeric backbone may be characterized by a ratio of subscripts a:b; e.g., the ratio of a:b may be from 1:19 to 1:1.5, from 1:14 to 1:2, from 1:9 to 1:2.5, from 1:7 to 1:3, from 1:6 to 1:3.5, or about 1:4 (in particular, from 1:19 to 1:1.5, from 1:7 to 1:3, or from 1:6 to 1:3.5).

The brush copolymer composition and each of its reactants/intermediate products may be made by a number of different methods. Particular methods and materials are disclosed herein. However, other methods and/or materials may be used to attain the same or similar brush copolymer composition product.

For instance, the copolymeric brush arms can be made by polymerizing at least two different cyclic monomers that, when polymerized, would form repeat units of formulae (1) and (2), respectively. Examples of such monomers may include, but are not necessarily limited to, 2-oxazoline, 2-methyl-2-oxazoline, 2-ethyl-2-oxazoline, 2-propyl-2-oxazoline, 2-isopropyl-2-oxazoline, 2-propenyl-2-oxazoline, 2-butyl-2-oxazoline, 2-(methylpropyl)-2-oxazoline, 2-tert-butyl-2-oxazoline, 2-butenyl-2-oxazoline, 2-pentyl-2-oxazoline, 2-(methylbutyl)-2-oxazoline, 2-(dimethylpropyl)-2-oxazoline, 2-pentenyl-2-oxazoline, 2-hexyl-2-oxazoline, 2-(methylpentyl)-2-oxazoline, 2-(dimethylbutyl)-2-oxazoline, 2-(ethylbutyl)-2-oxazoline, 2-hexenyl-2-oxazoline, 2-hexadienyl-2-oxazoline, 2-heptyl-2-oxazoline, 2-(methylhexyl)-2-oxazoline, 2-(dimethylpentyl)-2-oxazoline, 2-(ethylpentyl)-2-oxazoline, 2-heptenyl-2-oxazoline, 2-heptadienyl-2-oxazoline, 2-octyl-2-oxazoline, 2-nonyl-2-oxazoline, 2-decyl-2-oxazoline, 2-undecyl-2-oxazoline, 2-dodecyl-2-oxazoline, 2-tridecyl-2-oxazoline, 2-tetradecyl-2-oxazoline, 2-pentadecyl-2-oxazoline, 2-pentadecenyl-2-oxazoline, 2-hexadecyl-2-oxazoline, 2-heptadecyl-2-oxazoline, 2-(methylhexadecyl)-2-oxazoline, 2-heptadecenyl-2-oxazoline, 2-heptadecadienyl-2-oxazoline, 2-heptadecatrienyl-2-oxazoline, 2-heptadecatetraenyl-2-oxazoline, 2-octadecyl-2-oxazoline, 2-nonadecyl-2-oxazoline, 2-nonadecenyl-2-oxazoline, 2-nonadecadienyl-2-oxazoline, 2-nonadecatrienyl-2-oxazoline, 2-nonadecatetraenyl-2-oxazoline, 2-nonadecapentaenyl-2-oxazoline, 2-eicosanyl-2-oxazoline, 2-heneicosanyl-2-oxazoline, 2-docosanyl-2-oxazoline, 2-tricosanyl-2-oxazoline, 2-tetracosanyl-2-oxazoline, 4,5-dihydro-1,3-oxazine, 2-methyl-4,5-dihydro-1,3-oxazine, 2-ethyl-4,5-dihydro-1,3-oxazine, 2-propyl-4,5-dihydro-1,3-oxazine, 2-isopropyl-4,5-dihydro-1,3-oxazine, 2-propenyl-4,5-dihydro-1,3-oxazine, 2-butyl-4,5-dihydro-1,3-oxazine, 2-(methylpropyl)-4,5-dihydro-1,3-oxazine, 2-tert-butyl-4,5-dihydro-1,3-oxazine, 2-butenyl-4,5-dihydro-1,3-oxazine, 2-pentyl-4,5-dihydro-1,3-oxazine, 2-(methylbutyl)-4,5-dihydro-1,3-oxazine, 2-(dimethylpropyl)-4,5-dihydro-1,3-oxazine, 2-pentenyl-4,5-dihydro-1,3-oxazine, 2-hexyl-4,5-dihydro-1,3-oxazine, 2-(methylpentyl)-4,5-dihydro-1,3-oxazine, 2-(dimethylbutyl)-4,5-dihydro-1,3-oxazine, 2-(ethylbutyl)-4,5-dihydro-1,3-oxazine, 2-hexenyl-4,5-dihydro-1,3-oxazine, 2-hexadienyl-4,5-dihydro-1,3-oxazine, 2-heptyl-4,5-dihydro-1,3-oxazine, 2-(methylhexyl)-4,5-dihydro-1,3-oxazine, 2-(dimethylpentyl)-4,5-dihydro-1,3-oxazine, 2-(ethylpentyl)-4,5-dihydro-1,3-oxazine, 2-heptenyl-4,5-dihydro-1,3-oxazine, 2-heptadienyl-4,5-dihydro-1,3-oxazine, 2-octyl-4,5-dihydro-1,3-oxazine, 2-nonyl-4,5-dihydro-1,3-oxazine, 2-decyl-4,5-dihydro-1,3-oxazine, 2-undecyl-4,5-dihydro-1,3-oxazine, 2-dodecyl-4,5-dihydro-1,3-oxazine, 2-tridecyl-4,5-dihydro-1,3-oxazine, 2-tetradecyl-4,5-dihydro-1,3-oxazine, 2-pentadecyl-4,5-dihydro-1,3-oxazine, 2-pentadecenyl-4,5-dihydro-1,3-oxazine, 2-hexadecyl-4,5-dihydro-1,3-oxazine, 2-heptadecyl-4,5-dihydro-1,3-oxazine, 2-(methylhexadecyl)-4,5-dihydro-1,3-oxazine, 2-heptadecenyl-4,5-dihydro-1,3-oxazine, 2-heptadecadienyl-4,5-dihydro-1,3-oxazine, 2-heptadecatrienyl-4,5-dihydro-1,3-oxazine, 2-heptadecatetraenyl-4,5-dihydro-1,3-oxazine, 2-octadecyl-4,5-dihydro-1,3-oxazine, 2-nonadecyl-4,5-dihydro-1,3-oxazine, 2-nonadecenyl-4,5-dihydro-1,3-oxazine, 2-nonadecadienyl-4,5-dihydro-1,3-oxazine, 2-nonadecatrienyl-4,5-dihydro-1,3-oxazine, 2-nonadecatetraenyl-4,5-dihydro-1,3-oxazine, 2-nonadecapentaenyl-4,5-dihydro-1,3-oxazine, 2-eicosanyl-4,5-dihydro-1,3-oxazine, 2-heneicosanyl-4,5-dihydro-1,3-oxazine, 2-docosanyl-4,5-dihydro-1,3-oxazine, 2-tricosanyl-4,5-dihydro-1,3-oxazine, 2-tetracosanyl-4,5-dihydro-1,3-oxazine, and combinations thereof.

In the case of copolymerizing at least two different (hetero)cyclic monomers (e.g., oxazolines and/or oxazines, as delineated herein, each of which contain a nitrogen and an oxygen atom), the brush arms can advantageously be formed using a cationic ring-opening polymerization (CROP) process. Although radical, anionic, or other polymerization schemes are not precluded with (hetero)cyclic monomers such as oxazolines/oxazines, a cationic process enables a relatively stable oxazolinium/oxazinium (hetero)cyclic cation at a polymerizable chain end. As one of ordinary skill in the art would understand, suitable CROP initiators may include, but are not necessarily limited to, electrophilic sulfonate esters such as alkyl tosylates (e.g., methyl tosylate), alkyl nosylates, alkyl brosylates alkyl triflates, and the like, oxazinium salts, oxazolinium salts, alkyl halides, Lewis acids comprising a relatively stable anion, and other functional compounds with sufficiently low (e.g., substantially no) nucleophilic character, as well as combinations or mixtures thereof. Suitable (co)polymerization temperatures can be selected based on choice of monomer(s) and initiator, e.g., to effectuate relatively efficient initiation/propagation while reducing or eliminating undesirable termination and/or side reactions.

Although suitable initiators may be diluted with an appropriate solvent, the CROP polymerization can advantageously be done in a relatively low concentration of solvent, e.g., in bulk (any small amount of initiator solvent added to a monomer reactant system is still considered to be "in bulk" herein, as any initiator solvent would typically represent only trace amounts, relative to the amounts of the at least two monomers and any other polymerization reactants/facilitators). Indeed, when the polymerizing chain end moiety is stable enough, a living or pseudo-living polymerization process is possible, which typically enables better control of molecular weight, molecular weight distribution, reduced side reactions, and the like, thereby typically forming more uniform and chemically stable brush copolymer arms. Living or pseudo-living polymerization processes may additionally offer the advantage of the copolymeric brush arms being able to be grafted onto sites on the copolymeric backbone with little or no activation or post-polymerization functionalization.

Alternatively, at least one (some) or both (all) of the monomers polymerized to form the at least two different repeat units can be acyclic. In one such example, a single acyclic monomer can be used to polymerize an otherwise homopolymeric poly(alkylene amine) chain (e.g., poly(ethylene amine) or poly(propylene amine)), after which a post-polymerization reaction to acylate the backbone secondary amines with at least two different acyl groups to form the copolymeric brush arms having repeat units of formulae (1) and (2). In another such example, at least two different monomers (one/some or both/all of which can be acyclic) can be used to copolymerize an intermediate copolymer having alkylene amine and/or functionalized alkylene amine repeat units, after which one or both of the pendant groups on the backbone nitrogens of the respective repeat unit(s) formed thereby may be subject to a post-polymerization reaction to selectively acylate those nitrogens with the appropriate acyl group(s), so as to then form the copolymeric brush arms having repeat units of formulae (1) and (2).

In an analogous but still alternative embodiment, both (all) of the monomers polymerized to form the at least two different repeat units may be cyclic, so as to be susceptible to ring opening polymerization processes, but one (some) or both (all) of the monomers may be selected so as to create a situation where an intermediate polymer or copolymer is formed with one (some) or both (all) functional groups on the backbone nitrogens being different than the $R^5$—C(=O)— and $R^6$—C(=O)— acyl groups described in formulae (1) and (2), after which one or both of the pendant groups on the backbone nitrogens of the respective repeat unit(s) may be subject to a post-polymerization reaction to selectively acylate those nitrogens with the appropriate acyl group(s).

The copolymer backbone can be made by polymerizing at least two different acrylate monomers that, when polymerized, would form repeat units of formulae (3) and (4), respectively. Examples of monomers polymerizable to form repeat units of formula (3) may include, but are not necessarily limited to, acrylic acid, methacrylic acid, ethacrylic acid, trimethylsilyl acrylate, trimethylsilyl methacrylate, ethyldimethylsilyl acrylate, ethyldimethylsilyl methacrylate, phenyldimethylsilyl acrylate, phenyldimethylsilyl methacrylate, methyldiphenylsilyl acrylate, methyldiphenylsilyl methacrylate, tolyldimethylsilyl acrylate, tolyldimethylsilyl methacrylate, benzyldimethylsilyl acrylate, benzyldimethylsilyl methacrylate, triphenylsilyl acrylate, triphenylsilyl methacrylate, acrylic acetic anhydride, methacrylic acetic anhydride, ethacrylic acetic anhydride, an acrylic propionic anhydride, a methacrylic propionic anhydride, an ethacrylic propionic anhydride, an acrylic butyric anhydride, amethacrylic butyric anhydride, an ethacrylic butyric anhydride, an acrylic isobutyric anhydride, a methacrylic isobutyric anhydride, an ethacrylic isobutyric anhydride, an acrylic pentanoic anhydride, a methacrylic pentanoic anhydride, an ethacrylic pentanoic anhydride, an acrylic methylbutanoic anhydride, a methacrylic methylbutanoic anhydride, an ethacrylic methylbutanoic anhydride, an acrylic pivalic anhydride, a methacrylic pivalic anhydride, an ethacrylic pivalic anhydride, an acrylic hexanoic anhydride, a methacrylic hexanoic anhydride, an ethacrylic hexanoic anhydride, an acrylic methylpentanoic anhydride, a methacrylic methylpentanoic anhydride, an ethacrylic methylpentanoic anhydride, an acrylic dimethylbutanoic anhydride, a methacrylic dimethylbutanoic anhydride, an ethacrylic dimethylbutanoic anhydride, an acrylic heptanoic anhydride, a methacrylic heptanoic anhydride, an ethacrylic heptanoic anhydride, an acrylic methylhexanoic anhydride, a methacrylic methylhexanoic anhydride, an ethacrylic methylhexanoic anhydride, an acrylic dimethylpentanoic anhydride, a methacrylic dimethylpentanoic anhydride, an ethacrylic dimethylpentanoic anhydride, an acrylic ethylpentanoic anhydride, a methacrylic ethylpentanoic anhydride, an ethacrylic ethylpentanoic anhydride, an acrylic cyclohexanecarboxylic anhydride, a methacrylic cyclohexanecarboxylic anhydride, an ethacrylic cyclohexanecarboxylic anhydride, an acrylic benzoic anhydride, a methacrylic benzoic anhydride, an ethacrylic benzoic anhydride, hydroxymethyl acrylate, hydroxymethyl methacrylate, hydroxyethyl acrylate, hydroxyethyl methacrylate, a hydroxypropyl acrylate, a hydroxypropyl methacrylate, a hydroxybutyl acrylate, a hydroxybutyl methacrylate, lithium acrylate, lithium methacrylate, potassium acrylate, potassium methacrylate, sodium acrylate, sodium methacrylate, copper (I) acrylate, copper (I) methacrylate, silver (I) acrylate, silver (I) methacrylate, ammonium acrylate, ammonium methacrylate, an alkylated ammonium (alk)acrylate (e.g., monomethylammonium acrylate, monomethylammonium methacrylate, dimethylammonium acrylate, dimethylammonium methacrylate, trimethylammonium acrylate, trimethylammonium methacrylate, tetramethylammonium acrylate, tetramethylammonium methacrylate, monoethylammonium acrylate, monoethylammonium methacrylate, diethylammonium acrylate, diethylammonium methacrylate, triethylammonium acrylate, triethylammonium methacrylate, tetraethylammonium acrylate, tetraethylammonium methacrylate, or the like, or a mixture thereof), or the like, or a combination thereof.

Examples of monomers polymerizable to form repeat units of formula (4) may include, but are not necessarily limited to, an octyl acrylate, an octyl methacrylate, a methylheptyl acrylate, a methylheptyl methacrylate, an ethylhexyl acrylate, an ethylhexyl methacrylate, a dimethylhexyl acrylate, a dimethylhexyl methacrylate, a trimethylpentyl acrylate, a trimethylpentyl methacrylate, a methylethylpentyl acrylate, a methylethylpentyl methacrylate, a propylpentyl acrylate, a propylpentyl methacrylate, a cyclooctyl acrylate, a cyclooctyl methacrylate, a cycloheptylmethyl acrylate, a cycloheptylmethyl methacrylate, a tricyclo[3.3.0.0]octanyl acrylate, a tricyclo[3.3.0.0]octanyl methacrylate, a tricyclo[2.2.1.1]octanyl acrylate, a tricyclo[2.2.1.1]octanyl methacrylate, a bicyclo[2.2.2]octanyl acrylate, a bicyclo[2.2.2]octanyl methacrylate, a bicyclo[3.2.1]octanyl acrylate, a bicyclo[3.2.1]octanyl methacrylate, an octahydropentalenyl acrylate, an octahydropentalenyl methacrylate, a methylcycloheptyl acrylate, a methylcycloheptyl methacrylate, a cycloheptylmethyl acrylate, a cycloheptylmethyl methacrylate, a cyclohexylethyl acrylate, a cyclohexylethyl methacrylate, an ethylcyclohexyl acrylate, an ethylcyclohexyl methacrylate, a dimethylcyclohexyl acrylate, a dimethylcyclohexyl methacrylate, a methylcyclohexylmethyl acrylate, a methylcyclohexylmethyl methacrylate, a cyclopentylpropyl acrylate, a cyclopentylpropyl methacrylate, a propylcyclopentyl acrylate, a propylcyclopentyl methacrylate, a methylcyclopentylethyl acrylate, a methylcyclopentylethyl methacrylate, a dimethylcyclopentylmethyl acrylate, a dimethylcyclopentylmethyl methacrylate, an ethylcyclopentylmethyl acrylate, an ethylcyclopentylmethyl methacrylate, a trimethylcyclopentyl acrylate, a trimethylcyclopentyl methacrylate, a methylethylcyclopentyl acrylate, a methylethylcyclopentyl methacrylate, a pentalenyl acrylate, a pentalenyl methacrylate, a methylbenzyl acrylate, a methylbenzyl methacrylate, a benzylmethyl acrylate, a benzylmethyl methacrylate, a dimethylphenyl acrylate, a dimethylphenyl methacrylate, an ethylphenyl acrylate, an ethylphenyl methacrylate, a phenylethyl acrylate, a phenylethyl methacrylate, a nonyl acrylate, a nonyl methacrylate, a methyloctyl acrylate, a methyloctyl methacrylate, an ethylheptyl acrylate, an ethylheptyl methacrylate, a dimethylheptyl acrylate, a dimethylheptyl methacrylate, a trimethylhexyl acrylate, a trimethylhexyl methacrylate, a methylethylhexyl acrylate, a methylethylhexyl methacrylate, a propylhexyl acrylate, a propylhexyl methacrylate, a tetramethylpentyl acrylate, a tetramethylpentyl methacrylate, an ethyldimethylpentyl acrylate, an ethyldimethylpentyl methacrylate, a diethylpentyl acrylate, a diethylpentyl methacrylate, a tricyclo[4.3.0.0]nonanyl acrylate, a tricyclo[4.3.0.0]nonanyl methacrylate, a bicyclo[3.2.2]nonanyl acrylate, a bicyclo[3.2.2]nonanyl methacrylate, a bicyclo[3.3.1]nonanyl acrylate, a bicyclo[3.3.1]nonanyl methacrylate, a bicyclo[4.2.1]nonanyl acrylate, a bicyclo[4.2.1]nonanyl methacrylate, an octahydroindenyl acrylate, an octahydroindenyl methacrylate, a cyclooctylmethyl acrylate, a cyclooctylmethyl methacrylate, a methylcyclooctyl acrylate, a methylcyclooctyl methacrylate, an octahydropentalenylmethyl acrylate, an octahydropentalenylmethyl methacrylate, a methyloctahydropentalenyl acrylate, a methyloctahydropentalenyl methacrylate, an ethylcycloheptyl acrylate, an ethylcycloheptyl methacrylate, a cycloheptylethyl acrylate, a cycloheptylethyl methacrylate, a dimethylcycloheptyl acrylate, a dimethylcycloheptyl methacrylate, a methylcycloheptylmethyl acrylate, a methylcycloheptylmethyl methacrylate, a cyclohexylpropyl acrylate, a cyclohexylpropyl methacrylate, a propylcyclohexyl acrylate, a propylcyclohexyl methacrylate, a methylethylcyclohexyl acrylate, a methylethylcyclohexyl methacrylate, a methylcyclohexylethyl acrylate, a methylcyclohexylethyl methacrylate, an ethylcyclohexylmethyl acrylate, an ethylcyclohexylmethyl methacrylate, a trimethylcyclohexyl acrylate, a trimethylcyclohexyl methacrylate, a dimethylcyclohexylmethyl acrylate, a dimethylcyclohexylmethyl methacrylate, a cyclopentylbutyl acrylate, a cyclopentylbutyl methacrylate, a butylcyclopentyl acrylate, a butylcyclopentyl methacrylate, a methylcyclopentylpropyl acrylate, a methylcyclopentylpropyl methacrylate, a propylcyclopentylmethyl acrylate, a propylcyclopentylmethyl methacrylate, a diethylcyclopropyl acrylate, a diethylcyclopentyl methacrylate, an ethylcyclopentylethyl acrylate, an ethylcyclopentylethyl methacrylate, a dimethylcyclopentylethyl acrylate, a dimethylcyclopentylethyl methacrylate, a tetramethylcyclopentyl acrylate, a tetramethylcyclopentyl methacrylate, a trimethylcyclopentylmethyl acrylate, a trimethylcyclopentylmethyl methacrylate, an indenyl acrylate, an indenyl methacrylate, a spiro[4.4]nonanyl acrylate, a spiro[4.4]nonanyl methacrylate, a spiro[4.4]nonadienyl acrylate, a spiro[4.4]nonadienyl methacrylate, a spiro[4.4]nonatetraenyl acrylate, a spiro[4.4]nonatetraenyl methacrylate, a methylphenylethyl methacrylate, a methylpentalenyl acrylate, a methylpentalenyl methacrylate, a pentalenylmethyl acrylate, a pentalenylmethyl methacrylate, an ethylbenzyl acrylate, an ethylbenzyl methacrylate, a benzylethyl acrylate, a benzylethyl methacrylate, a dimethylbenzyl acrylate, a dimethylbenzyl methacrylate, a phenylpropyl acrylate, a phenylpropyl methacrylate, a propylphenyl acrylate, a propylphenyl methacrylate, a trimethylphenyl acrylate, a trimethylphenyl methacrylate, a methylethylphenyl acrylate, a methylethylphenyl methacrylate, a methylphenylethyl acrylate, a decyl acrylate, a decyl methacrylate, a methylnonyl acrylate, a methylnonyl methacrylate, an ethyloctyl acrylate, an ethyloctyl methacrylate, a dimethyloctyl acrylate, a dimethyloctyl methacrylate, a propylheptyl acrylate, a propylheptyl methacrylate, a methylethylheptyl acrylate, a methylethylheptyl methacrylate, a trimethylheptyl acrylate, a trimethylheptyl methacrylate, a butylhexyl acrylate, a butylhexyl methacrylate, a tetramethylhexyl acrylate, a tetramethylhexyl methacrylate, a dimethylethylhexyl acrylate, a dimethylethylhexyl methacrylate, a diethylhexyl acrylate, a diethylhexyl methacrylate, a pentamethylpentyl acrylate, a pentamethylpentyl methacrylate, an ethyltrmethylpentyl acrylate, an ethyltrimethylpentyl methacrylate, a diethylmethylpentyl acrylate, a diethylmethylpentyl methacrylate, a butylmethylpentyl acrylate, a butylmethylpentyl methacrylate, an ethylpropylpentyl acrylate, an ethylpropylpentyl methacrylate, a dimethylpropylpentyl acrylate, a dimethylpropylpentyl methacrylate, a tetracyclo[4.2.1.1.0]decanyl acrylate, a tetracyclo[4.2.1.1.0]decanyl methacrylate, an adamantanyl acrylate, an adamantanyl methacrylate, a decahydrocyclopentapentalenyl acrylate, a decahydrocyclopentapentalenyl methacrylate, a tricyclo[4.4.0.0]decanyl acrylate, a tricyclo[4.4.0.0]decanyl methacrylate, a tricyclo[4.2.1.1]decanyl acrylate, a tricyclo[4.2.1.1]decanyl methacrylate, a tricyclo[3.3.1.1]decanyl acrylate, a tricyclo[3.3.1.1]decanyl methacrylate, a tricyclo[2.2.2.2]decanyl acrylate, a tricyclo[2.2.2.2]decanyl methacrylate, a bicyclo[3.3.2]decanyl acrylate, a bicyclo[3.3.2]decanyl methacrylate, a bicyclo[4.2.2]decanyl acrylate, a bicyclo[4.2.2]decanyl methacrylate, a decahydronaphthalenyl acrylate, a decahydronaphthalenyl methacrylate, a decahydroazulenyl acrylate, a decahydroazulenyl methacrylate, a methyloctahydroindenyl acrylate, a methyloctahydroindenyl methacrylate, an octahydroindenylmethyl acrylate, an octahydroindenylmethyl methacrylate, an octahydropentalenylethyl acrylate, an octahydropentalenylethyl methacrylate, an ethyloctahydropentalenyl acrylate, an ethyloctahydropentalenyl methacrylate, a methyloctahydropentalenylmethyl acrylate, a methyloctahydropentalenylmethyl methacrylate, a dimethyloctahydropentalenyl acrylate, a dimethyloctahydropentalenyl methacrylate, a dimethylcyclooctyl acrylate, a dimethylcyclooctyl methacrylate, a methylcyclooctylmethyl acrylate, a methylcyclooctylmethyl methacrylate, an ethylcyclooctyl acrylate, an ethylcyclooctyl methacrylate, a propylcycloheptyl acrylate, a propylcycloheptyl methacrylate, a cycloheptylpropyl acrylate, a cycloheptylpropyl methacrylate, an ethylcycloheptylmethyl acrylate, an ethylcycloheptylmethyl methacrylate, a methylcycloheptylethyl acrylate, a methylcycloheptylethyl acrylate, a trimethylcycloheptyl acrylate, a trimethylcycloheptyl methacrylate, a dimethylcycloheptylmethyl acrylate, a dimethylcycloheptylmethyl methacrylate, a cyclohexylbutyl acrylate, a cyclohexylbutyl methacrylate, a butylcyclohexyl acrylate, a butylcyclohexyl methacrylate, a propylcyclohexylmethyl acrylate, a propylcyclohexylmethyl methacrylate, a methylpropylcyclohexyl acrylate, a methylpropylcyclohexyl methacrylate, a methylcyclohexylpropyl acrylate, a methylcyclohexylpropyl methacrylate, an ethylcyclohexylethyl acrylate, an ethylcyclohexylethyl methacrylate, a diethylcyclohexyl acrylate, a diethylcyclohexyl methacrylate, a dimethylcyclohexylethyl acrylate, a dimethylcyclohexyl methacrylate, a tetramethylcyclohexyl acrylate, a tetramethylcyclohexyl methacrylate, a trimethylcyclohexylmethyl acrylate, a trimethylcyclohexylmethyl methacrylate, a naphthalenyl acrylate, a naphthalenyl methacrylate, a tetrahydronaphthalenyl acrylate, a tetrahydronaphthalenyl methacrylate, a bicyclopentadienylidenyl acrylate, a bicyclopentadienylidenyl methacrylate, an azulenyl acrylate, an azulenyl methacrylate, a dimethylpentalenyl acrylate, a dimethylpentalenyl methacrylate, a methylpentalenylmethyl acrylate, a methylpentalenylmethyl methacrylate, an ethylpentalenyl acrylate, an ethylpentalenyl methacrylate, a pentalenylethyl acrylate, a pentalenylethyl methacrylate, a spiro[4.5]decanyl acrylate, a spiro[4.5]decanyl methacrylate, a spiro[4.5]decadienyl acrylate, a spiro[4.5]decadienyl methacrylate, a spiro[4.5]decatetraenyl acrylate, a spiro[4.5]decatetraenyl methacrylate, a butylphenyl acrylate, a butylphenyl methacrylate, a phenylbutyl acrylate, a phenylbutyl methacrylate, a propylbenzyl acrylate, a propylbenzyl methacrylate, a benzylpropyl acrylate, a benzylpropyl methacrylate, a trimethylbenzyl acrylate, a trimethylbenzyl methacrylate, a methylethylbenzyl acrylate, a methylethylbenzyl methacrylate, a methylphenylpropyl acrylate, a methylphenylpropyl methacrylate, a dimethylphenylethyl acrylate, a dimethylphenylethyl methacrylate, an ethylphenylethyl acrylate, an ethylphenylethyl methacrylate, an undecyl acrylate, an undecyl methacrylate, a methyldecyl acrylate, a methyldecyl methacrylate, an ethylnonyl acrylate, an ethylnonyl methacrylate, a dimethylnonyl acrylate, a dimethylnonyl methacrylate, a propyloctyl acrylate, a propyloctyl methacrylate, a methylethyloctyl acrylate, a methylethyloctyl methacrylate, a trimethyloctyl acrylate, a trimethyloctyl methacrylate, a butylheptyl acrylate, a butylheptyl methacrylate, a methylpropylheptyl acrylate, a methylpropylheptyl methacrylate, a diethylheptyl acrylate, a diethylheptyl methacrylate, a tetramethylheptyl acrylate, a tetramethylheptyl methacrylate, a pentylhexyl acrylate, a pentylhexyl methacrylate, a pentamethylhexyl acrylate, a pentamethylhexyl methacrylate, a trimethylethylhexyl acrylate, a trimethylethylhexyl methacrylate, a methyldiethylhexyl acrylate, a methyldiethylhexyl methacrylate, a propylethylhexyl acrylate, a propylethylhexyl methacrylate, a propyldimethylhexyl acrylate, a propyldimethylhexyl methacrylate, a tetracyclo[3.3.1.1.1]undecanyl acrylate, a tetracyclo[3.3.1.1.1]undecanyl methacrylate, a tetracyclo[6.2.1.0.0]undecanyl acrylate, a tetracyclo[6.2.1.0.0]undecanyl methacrylate, a tetracyclo[5.3.1.0.0]undecanyl acrylate, a tetracyclo[5.3.1.0.0]undecanyl methacrylate, a methyladamantanyl acrylate, a methyladamantanyl methacrylate, an adamantanylmethyl acrylate, an adamantanylmethyl methacrylate, a tricyclo[5.2.1.1]undecanyl acrylate, a tricyclo[5.2.1.1]undecanyl methacrylate, a tricyclo[4.3.1.1]undecanyl acrylate, a tricyclo[4.3.1.1]undecanyl methacrylate, a tricyclo[4.2.2.1]undecanyl acrylate, a tricyclo[4.2.2.1]undecanyl methacrylate, a tricyclo[3.3.2.1]undecanyl acrylate, a tricyclo[3.3.2.1]undecanyl methacrylate, a tricyclo[3.2.2.2]undecanyl acrylate, a tricyclo[3.2.2.2]undecanyl methacrylate, a bicyclo[4.3.2]undecanyl acrylate, a bicyclo[4.3.2]undecanyl methacrylate, a bicyclo[4.4.1]undecanyl acrylate, a bicyclo[4.4.1]undecanyl methacrylate, a bicyclo[3.3.3]undecanyl acrylate, a bicyclo[3.3.3]undecanyl methacrylate, a bicyclo[5.3.1]undecanyl acrylate, a bicyclo[5.3.1]undecanyl methacrylate, a bicyclo[5.2.2]undecanyl acrylate, a bicyclo[5.2.2]undecanyl methacrylate, a bicyclo[6.2.1]undecanyl acrylate, a bicyclo[6.2.1]undecanyl methacrylate, a bicyclo[7.1.1]undecanyl acrylate, a bicyclo[7.1.1]undecanyl methacrylate, a methyldecahydronaphthalenyl acrylate, a methyldecahydronaphthalenyl methacrylate, a decahydronaphthalenylmethyl acrylate, a decahydronaphthalenylmethyl methacrylate, a methyldecahydroazulenyl acrylate, a methyldecahydroazulenyl methacrylate, a decahydroazulenylmethyl acrylate, a decahydroazulenylmethyl methacrylate, a dimethyloctahydroindenyl acrylate, a dimethyloctahydroindenyl methacrylate, an ethyloctahydroindenyl acrylate, an ethyloctahydroindenyl methacrylate, an octahydroindenylethyl acrylate, an octahydroindenylethyl methacrylate, an octahydropentalenylpropyl acrylate, an octahydropentalenylpropyl methacrylate, a propyloctahydropentalenyl acrylate, a propyloctahydropentalenyl methacrylate, a trimethylcyclooctyl acrylate, a trimethylcyclooctyl methacrylate, a dimethylcyclooctylmethyl acrylate, a dimethylcyclooctylmethyl methacrylate, an ethylcyclooctylmethyl acrylate, an ethylcyclooctylmethyl methacrylate, a butylcycloheptyl acrylate, a butylcycloheptyl methacrylate, a cycloheptylbutyl acrylate, a cycloheptylbutyl methacrylate, a diethylcycloheptyl acrylate, a diethylcycloheptyl methacrylate, a tetramethylcycloheptyl acrylate, a tetramethylcycloheptyl methacrylate, a cyclohexylpentyl acrylate, a cyclohexylpentyl methacrylate, a pentylcyclohexyl acrylate, a pentylcyclohexyl methacrylate, a pentamethylcyclohexyl acrylate, a pentamethylcyclohexyl methacrylate, a cyclopentapentalenyl acrylate, a cyclopentapentalenyl acrylate, a cyclopentadienylphenyl acrylate, a cyclopentadienylphenyl methacrylate, a phenylcyclopentadienyl acrylate, a phenylcyclopentadienyl methacrylate, a spiro[4.6]undecanyl acrylate, a spiro[4.6]undecanyl methacrylate, a spiro[4.6]undecadienyl acrylate, a spiro[4.6]undecadienyl methacrylate, a spiro[4.6]undecatrienyl acrylate, a spiro[4.6]undecatrienyl methacrylate, a spiro[4.6]undecapentaenyl acrylate, a spiro[4.6]undecapentaenyl methacrylate, a methylnaphthalenyl acrylate, a methylnaphthalenyl methacrylate, a naphthalenylmethyl acrylate, a naphthalenylmethyl methacrylate, a methylbicyclopentadienylidenyl acrylate, a methylbicyclopentadienylidenyl methacrylate, a methylazulenyl acrylate, a methylazulenyl methacrylate, an azulenylmethyl acrylate, an azulenylmethyl methacrylate, a methyltetrahydronaphthalenyl acrylate, a methyltetrahydronaphthalenyl methacrylate, a spiro[5.5]undecanyl acrylate, a spiro[5.5]undecanyl methacrylate, a diethylbenzyl acrylate, a diethylbenzyl methacrylate, a pentamethylphenyl acrylate, a pentamethylphenyl methacrylate, a phenylpentyl acrylate, a phenylpentyl methacrylate, a dodecyl acrylate, a dodecyl methacrylate, a methylundecyl acrylate, a methylundecyl methacrylate, an ethyldecyl acrylate, an ethyldecyl methacrylate, a dimethyldecyl acrylate, a dimethyldecyl methacrylate, a propylnonyl acrylate, a propylnonyl methacrylate, a methylethylnonyl acrylate, a methylethylnonyl methacrylate, a trimethylnonyl acrylate, a trimethylnonyl methacrylate, a butyloctyl acrylate, a butyloctyl methacrylate, a methylpropyloctyl acrylate, a methylpropyloctyl methacrylate, a diethyloctyl acrylate, a diethyloctyl methacrylate, a tetramethyloctyl acrylate, a tetramethyloctyl methacrylate, a pentylheptyl acrylate, a pentylheptyl methacrylate, a pentamethylheptyl acrylate, a pentamethylheptyl methacrylate, a trimethylethylheptyl acrylate, a trimethylethylheptyl methacrylate, a methyldiethylheptyl acrylate, a methyldiethylheptyl methacrylate, a propylethylheptyl acrylate, a propylethylheptyl methacrylate, a propyldimethylheptyl acrylate, a propyldimethylheptyl methacrylate, a tetracyclo[7.2.1.0.0]dodecanyl acrylate, a tetracyclo[7.2.1.0.0]dodecanyl methacrylate, a tetracyclo[4.2.2.1.1]dodecanyl acrylate, a tetracyclo[4.2.2.1.1]dodecanyl methacrylate, a tetracyclo[4.3.1.1.1]dodecanyl acrylate, a tetracyclo[4.3.1.1.1]dodecanyl methacrylate, a tetracyclo[3.3.2.1.1]dodecanyl acrylate, a tetracyclo[3.3.2.1.1]dodecanyl methacrylate, an ethyladamantyl acrylate, an ethyladamantyl methacrylate, a dimethyladamantanyl acrylate, a dimethyladamantanyl methacrylate, an adamantanylethyl acrylate, an adamantanylethyl methacrylate, a tricyclo[6.2.1.1]dodecanyl acrylate, a tricyclo[6.2.1.1]dodecanyl methacrylate, a tricyclo[5.3.1.1]dodecanyl acrylate, a tricyclo[5.3.1.1]dodecanyl methacrylate, a tricyclo[4.4.1.1]dodecanyl acrylate, a tricyclo[4.4.1.1]dodecanyl methacrylate, a tricyclo[5.2.2.1]dodecanyl acrylate, a tricyclo[5.2.2.1]dodecanyl methacrylate, a tricyclo[4.3.2.1]dodecanyl acrylate, a tricyclo[4.3.2.1]dodecanyl methacrylate, a tricyclo[4.2.2.2]dodecanyl acrylate, a tricyclo[4.2.2.2]dodecanyl methacrylate, a tricyclo[3.3.2.2]dodecanyl acrylate, a tricyclo[3.3.2.2]dodecanyl methacrylate, a bicyclo[4.3.3]dodecanyl acrylate, a bicyclo[4.3.3]dodecanyl methacrylate, a bicyclo[4.4.2]dodecanyl acrylate, a bicyclo[4.4.2]dodecanyl methacrylate, a bicyclo[5.4.1]dodecanyl acrylate, a bicyclo[5.4.1]dodecanyl methacrylate, a bicyclo[5.3.2]dodecanyl acrylate, a bicyclo[5.3.2]dodecanyl methacrylate, a bicyclo[6.2.2]dodecanyl acrylate, a bicyclo[6.2.2]dodecanyl methacrylate, a bicyclo[6.3.1]dodecanyl acrylate, a bicyclo[6.3.1]dodecanyl methacrylate, a bicyclo[7.2.1]dodecanyl acrylate, a bicyclo[7.2.1]dodecanyl methacrylate, a bicyclo[8.1.1]dodecanyl acrylate, a bicyclo[8.1.1]dodecanyl methacrylate, an ethyldecahydronaphthalenyl acrylate, an ethyldecahydronaphthalenyl methacrylate, a decahydronaphthalenylethyl acrylate, a decahydronaphthalenylethyl methacrylate, an ethyldecahydroazulenyl acrylate, an ethyldecahydroazulenyl methacrylate, a decahydroazulenylethyl acrylate, a decahydroazulenylethyl methacrylate, a trimethyloctahydroindenyl acrylate, a trimethyloctahydroindenyl methacrylate, a propyloctahydroindenyl acrylate, a propyloctahydroindenyl methacrylate, an octahydroindenylpropyl acrylate, an octahydroindenylpropyl methacrylate, a butyloctahydropentalenyl acrylate, a butyloctahydropentalenyl methacrylate, a tetramethylcyclooctyl acrylate, a tetramethylcyclooctyl methacrylate, a diethylcyclooctyl acrylate, a diethylcyclooctyl methacrylate, a pentylcycloheptyl acrylate, a pentylcycloheptyl methacrylate, a cycloheptylpentyl acrylate, a cycloheptylpentyl methacrylate, a pentamethylcycloheptyl acrylate, a pentamethylcycloheptyl methacrylate, a cyclohexylhexyl acrylate, a cyclohexylhexyl methacrylate, a cyclohexylcyclohexyl acrylate, a cyclohexylcyclohexyl methacrylate, a pentamethylcyclohexylmethyl acrylate, a pentamethylcyclohexylmethyl methacrylate, an acenaphthylenyl acrylate, an acenaphthylenyl methacrylate, an acenaphthenyl acrylate, an acenaphthenyl methacrylate, a biphenylyl acrylate, a biphenylyl methacrylate, an indacenyl acrylate, an indacenyl methacrylate, a heptalenyl acrylate, a heptalenyl methacrylate, a cyclopentadienylidenecycloheptatrienyl acrylate, a cyclopentadienylidenecycloheptatrienyl methacrylate, a cycloheptatrienylidenecyclopentadienyl acrylate, a cycloheptatrienylidenecyclopentadienyl methacrylate, a methylcyclopentapentalenyl acrylate, a methylcyclopentapentalenyl acrylate, a methylcyclopentadienylphenyl acrylate, a methylcyclopentadienylphenyl methacrylate, a cyclopentadienyltolyl acrylate, a cyclopentadienyltolyl methacrylate, a cyclopentadienylbenzyl acrylate, a cyclopentadienylbenzyl methacrylate, a methylphenylcyclopentadienyl acrylate, a methylphenylcyclopentadienyl methacrylate, a tolylcyclopentadienyl acrylate, a tolylcyclopentadienyl methacrylate, a spiro[5.6]dodecanyl acrylate, a spiro[5.6]dodecanyl methacrylate, a spiro[5.6]dodecatrienyl acrylate, a spiro[5.6]dodecatrienyl methacrylate, a dimethylnaphthalenyl acrylate, a dimethylnaphthalenyl methacrylate, an ethylnaphthalenyl acrylate, an ethylnaphthalenyl methacrylate, a naphthalenylethyl acrylate, a naphthalenylethyl methacrylate, a dimethylazulenyl acrylate, a dimethylazulenyl methacrylate, an ethylazulenyl acrylate, an ethylazulenyl methacrylate, an azulenylethyl acrylate, an azulenylethyl methacrylate, a dimethyltetrahydronaphthalenyl acrylate, a dimethyltetrahydronaphthalenyl methacrylate, a triethylphenyl acrylate, a triethylphenyl methacrylate, a phenylhexyl acrylate, a phenylhexyl methacrylate, a hexylphenyl acrylate, a hexylphenyl methacrylate, a cyclohexylphenyl acrylate, a cyclohexylphenyl methacrylate, a phenylcyclohexyl acrylate, a phenylcyclohexyl methacrylate, a tridecyl acrylate, a tridecyl methacrylate, a methyldodecyl acrylate, a methyldodecyl methacrylate, a dimethylundecyl acrylate, a dimethylundecyl methacrylate, an ethylundecyl acrylate, an ethylundecyl methacrylate, a trimethyldecyl acrylate, a trimethyldecyl methacrylate, a methylethyldecyl acrylate, a methylethyldecyl methacrylate, a propyldecyl acrylate, a propyldecyl methacrylate, a diethylnonyl acrylate, a diethylnonyl methacrylate, a tetramethylnonyl acrylate, a tetramethylnonyl methacrylate, a butylnonyl acrylate, a butylnonyl methacrylate, a methylpropylnonyl acrylate, a methylpropylnonyl methacrylate, a pentyloctyl acrylate, a pentyloctyl methacrylate, a pentamethyloctyl acrylate, a pentamethyloctyl methacrylate, a trimethylethyloctyl acrylate, a trimethylethyloctyl methacrylate, a methyldiethyloctyl acrylate, a methyldiethyloctyl methacrylate, a propylethyloctyl acrylate, a propylethyloctyl methacrylate, a propyldimethyloctyl acrylate, a propyldimethyloctyl methacrylate, a triethylheptyl acrylate, a triethylheptyl methacrylate, a tetracyclo[6.3.2.0.0]tridecanyl acrylate, a tetracyclo[6.3.2.0.0]tridecanyl methacrylate, a tetracyclo[6.2.1.1.1]tridecanyl acrylate, a tetracyclo[6.2.1.1.1]tridecanyl methacrylate, a tetracyclo[5.3.1.1.1]tridecanyl acrylate, a tetracyclo[5.3.1.1.1]tridecanyl methacrylate, a tetracyclo[4.4.1.1.1]tridecanyl acrylate, a tetracyclo[4.4.1.1.1]tridecanyl methacrylate, a tetracyclo[4.3.2.1.1]tridecanyl acrylate, a tetracyclo[4.3.2.1.1]tridecanyl methacrylate, a tetracyclo[4.2.2.2.1]tridecanyl acrylate, a tetracyclo[4.2.2.2.1]tridecanyl methacrylate, a propyladamantyl acrylate, a propyladamantyl methacrylate, a trimethyladamantanyl acrylate, a trimethyladamantanyl methacrylate, a tricyclo[7.2.1.1]tridecanyl acrylate, a tricyclo[7.2.1.1]tridecanyl methacrylate, a tricyclo[6.3.1.1]tridecanyl acrylate, a tricyclo[6.3.1.1]tridecanyl methacrylate, a tricyclo[6.2.2.1]tridecanyl acrylate, a tricyclo[6.2.2.1]tridecanyl methacrylate, a tricyclo[5.4.1.1]tridecanyl acrylate, a tricyclo[5.4.1.1]tridecanyl methacrylate, a tricyclo[5.3.2.1]tridecanyl acrylate, a tricyclo[5.3.2.1]tridecanyl methacrylate, a tricyclo[5.2.2.2]tridecanyl acrylate, a tricyclo[5.2.2.2]tridecanyl methacrylate, a tricyclo[4.4.2.1]tridecanyl acrylate, a tricyclo[4.4.2.1]tridecanyl methacrylate, a tricyclo[4.3.3.1]tridecanyl acrylate, a tricyclo[4.3.3.1]tridecanyl methacrylate, a tricyclo[4.3.2.2]tridecanyl acrylate, a tricyclo[4.3.2.2]tridecanyl methacrylate, a dodecahydrofluorenyl acrylate, a dodecahydrofluorenyl methacrylate, a dodecahydrophenalenyl acrylate, a dodecahydrophenalenyl methacrylate, a dodecahydroannulenyl acrylate, a dodecahydroannulenyl methacrylate, a spiro[6.6]tridecahexaenyl acrylate, a spiro[6.6]tridecahexaenyl methacrylate, a spiro[6.6]tridecatrienyl acrylate, a spiro[6.6]tridecatrienyl methacrylate, a spiro[6.6]tridecanyl acrylate, a spiro[6.6]tridecanyl methacrylate, a methyldodecahydroacenaphthylenyl acrylate, a methyldodecahydroacenaphthylenyl methacrylate, a methyldodecahydro(s)indacenyl acrylate, a methyldodecahydro(s)indacenyl methacrylate, a methyldodecahydroheptalenyl acrylate, a methyldodecahydroheptalenyl methacrylate, a bicyclo[4.4.3]tridecanyl acrylate, a bicyclo[4.4.3]tridecanyl methacrylate, a bicyclo[5.5.1]tridecanyl acrylate, a bicyclo[5.5.1]tridecanyl methacrylate, a bicyclo[5.4.2]tridecanyl acrylate, a bicyclo[5.4.2]tridecanyl methacrylate, a bicyclo[5.3.3]tridecanyl acrylate, a bicyclo[5.3.3]tridecanyl methacrylate, a bicyclo[6.3.2]tridecanyl acrylate, a bicyclo[6.3.2]tridecanyl methacrylate, a bicyclo[6.4.1]tridecanyl acrylate, a bicyclo[6.4.1]tridecanyl methacrylate, a bicyclo[7.2.2]tridecanyl acrylate, a bicyclo[7.2.2]tridecanyl methacrylate, a bicyclo[7.3.1]tridecanyl acrylate, a bicyclo[7.3.1]tridecanyl methacrylate, a bicyclo[8.2.1]tridecanyl acrylate, a bicyclo[8.2.1]tridecanyl methacrylate, a propyldecahydronaphthalenyl acrylate, a propyldecahydronaphthalenyl methacrylate, a decahydronaphthalenylpropyl acrylate, a decahydronaphthalenylpropyl methacrylate, a trimethyldecahydronaphthalenyl acrylate, a trimethyldecahydronaphthalenyl methacrylate, a propyldecahydroazulenyl acrylate, a propyldecahydroazulenyl methacrylate, a trimethyldecahydroazulenyl acrylate, a trimethyldecahydroazulenyl methacrylate, a tetramethyloctahydroindenyl acrylate, a tetramethyloctahydroindenyl methacrylate, a butyloctahydroindenyl acrylate, a butyloctahydroindenyl methacrylate, a diethyloctahydroindenyl acrylate, a diethyloctahydroindenyl methacrylate, a pentyloctahydropentalenyl acrylate, a pentyloctahydropentalenyl methacrylate, a pentamethylcyclooctyl acrylate, a pentamethylcyclooctyl methacrylate, a hexylcycloheptyl acrylate, a hexylcycloheptyl methacrylate, a hexamethylcycloheptyl acrylate, a hexamethylcycloheptyl methacrylate, a cyclohexylheptyl acrylate, a cyclohexylheptyl methacrylate, a cyclohexylcycloheptyl acrylate, a cyclohexylcycloheptyl methacrylate, a cycloheptylcyclohexyl acrylate, a cycloheptylcyclohexyl methacrylate, a fluorenyl acrylate, a fluorenyl methacrylate, a phenalenyl acrylate, a phenalenyl methacrylate, an annulenyl acrylate, an annulenyl methacrylate, a methylacenaphthylenyl acrylate, a methylacenaphthylenyl methacrylate, an acenaphthylenylmethyl acrylate, an acenaphthylenylmethyl methacrylate, a methylacenaphthenyl acrylate, a methylacenaphthenyl methacrylate, an acenaphthenylmethyl acrylate, an acenaphthenylmethyl methacrylate, a methylbiphenylyl acrylate, a methylbiphenylyl methacrylate, a methylindacenyl acrylate, a methylindacenyl methacrylate, an indacenylmethyl acrylate, an indacenylmethyl methacrylate, a methylheptalenyl acrylate, a methylheptalenyl methacrylate, a tetradecyl acrylate, a tetradecyl methacrylate, a methyltridecyl acrylate, a methyltridecyl methacrylate, a dimethyldodecyl acrylate, a dimethyldodecyl methacrylate, an ethyldodecyl acrylate, an ethyldodecyl methacrylate, a trimethylundecyl acrylate, a trimethylundecyl methacrylate, a methylethylundecyl acrylate, a methylethylundecyl methacrylate, a propylundecyl acrylate, a propylundecyl methacrylate, a diethyldecyl acrylate, a diethyldecyl methacrylate, a tetramethyldecyl acrylate, a tetramethyldecyl methacrylate, a butyldecyl acrylate, a butyldecyl methacrylate, a methylpropyldecyl acrylate, a methylpropyldecyl methacrylate, a pentylnonyl acrylate, a pentylnonyl methacrylate, a pentamethylnonyl acrylate, a pentamethylnonyl methacrylate, a trimethylethylnonyl acrylate, a trimethylethylnonyl methacrylate, a methyldiethylnonyl acrylate, a methyldiethylnonyl methacrylate, a propylethylnonyl acrylate, a propylethylnonyl methacrylate, a propyldimethylnonyl acrylate, a propyldimethylnonyl methacrylate, a hexyloctyl acrylate, a hexyloctyl methacrylate, a triethyloctyl acrylate, a triethyloctyl methacrylate, a dipropyloctyl acrylate, a dipropyloctyl methacrylate, a hexamethyloctyl acrylate, a hexamethyloctyl methacrylate, a dimethyldiethyloctyl acrylate, a dimethyldiethyloctyl methacrylate, a butylethyloctyl acrylate, a butylethyloctyl methacrylate, a butyldimethyloctyl acrylate, a butyldimetyloctyl methacrylate, a tetracyclo[6.2.2.1.1]tetradecanyl acrylate, a tetracyclo[6.2.2.1.1]tetradecanyl methacrylate, a tetracyclo[6.3.1.1.1]tetradecanyl acrylate, a tetracyclo[6.3.1.1.1]tetradecanyl methacrylate, a tetracyclo[5.4.1.1.1]tetradecanyl acrylate, a tetracyclo[5.4.1.1.1]tetradecanyl methacrylate, a tetracyclo[5.3.2.1.1]tetradecanyl acrylate, a tetracyclo[5.3.2.1.1]tetradecanyl methacrylate, a tetracyclo[4.4.2.1.1]tetradecanyl acrylate, a tetracyclo[5.2.2.2.1]tetradecanyl acrylate, a tetracyclo[5.2.2.2.1]tetradecanyl methacrylate, a tetracyclo[4.4.2.1.1]tetradecanyl methacrylate, a tetracyclo[4.4.2.1.1]tetradecanyl acrylate, a tetracyclo[4.4.2.1.1]tetradecanyl methacrylate, a tetracyclo[4.3.2.2.1]tetradecanyl acrylate, a tetracyclo[4.3.2.2.1]tetradecanyl methacrylate, a tetracyclo

[4.3.3.1.1]tetradecanyl acrylate, a tetracyclo[4.3.3.1.1]tetradecanyl methacrylate, a tetradecahydrocyclopentaacenaphthylenyl acrylate, a tetradecahydrocyclopentaacenaphthylenyl methacrylate, a tetrahydrocyclopentaacenaphthylenyl acrylate, a tetrahydrocyclopentaacenaphthylenyl methacrylate, a tetradecahydrodicyclopentapentalenyl acrylate, a tetradecahydrodicyclopentapentalenyl methacrylate, a tetradecahydroanthracenyl acrylate, a tetradecahydroanthracenyl methacrylate, a tetradecahydrophenanthrenyl acrylate, a tetradecahydrophenanthrenyl methacrylate, a tetradecahydrocycloheptanaphthalenyl acrylate, a tetradecahydrocycloheptanaphthalenyl methacrylate, a hexahydrocycloheptanaphthalenyl acrylate, a hexahydrocycloheptanaphthalenyl methacrylate, a tetradecahydrooctalenyl acrylate, a tetradecahydrooctalenyl methacrylate, a hexahydrooctalenyl acrylate, a hexahydrooctalenyl methacrylate, a tricyclo[8.2.1.1]tetradecanyl acrylate, a tricyclo[8.2.1.1]tetradecanyl methacrylate, a tricyclo[7.3.1.1]tetradecanyl acrylate, a tricyclo[7.3.1.1]tetradecanyl methacrylate, a tricyclo[7.2.2.1]tetradecanyl acrylate, a tricyclo[7.2.2.1]tetradecanyl methacrylate, a tricyclo[6.4.1.1]tetradecanyl acrylate, a tricyclo[6.4.1.1]tetradecanyl methacrylate, a tricyclo[6.3.2.1]tetradecanyl acrylate, a tricyclo[6.3.2.1]tetradecanyl methacrylate, a tricyclo[6.2.2.2]tetradecanyl acrylate, a tricyclo[6.2.2.2]tetradecanyl methacrylate, a tricyclo[5.5.1.1]tetradecanyl acrylate, a tricyclo[5.5.1.1]tetradecanyl methacrylate, a tricyclo[5.4.2.1]tetradecanyl acrylate, a tricyclo[5.4.2.1]tetradecanyl methacrylate, a tricyclo[5.3.3.1]tetradecanyl acrylate, a tricyclo[5.3.3.1]tetradecanyl methacrylate, a tricyclo[5.3.2.2]tetradecanyl acrylate, a tricyclo[5.3.2.2]tetradecanyl methacrylate, a tricyclo[4.4.2.2]tetradecanyl acrylate, a tricyclo[4.4.2.2]tetradecanyl methacrylate, a tricyclo[4.4.3.1]tetradecanyl acrylate, a tricyclo[4.4.3.1]tetradecanyl methacrylate, a tricyclo[4.3.3.2]tetradecanyl acrylate, a tricyclo[4.3.3.2]tetradecanyl methacrylate, a methyldodecahydrofluorenyl acrylate, a methyldodecahydrofluorenyl methacrylate, a dodecahydrofluorenylmethyl acrylate, a dodecahydrofluorenylmethyl methacrylate, a methyldodecahydrophenalenyl acrylate, a methyldodecahydrophenalenyl methacrylate, a dodecahydrophenalenylmethyl acrylate, a dodecahydrophenalenylmethyl methacrylate, a dodecahydroannulenylmethyl acrylate, a dodecahydroannulenylmethyl methacrylate, a methyldodecahydroannulenyl acrylate, a methyldodecahydroannulenyl methacrylate, a butyladamantyl acrylate, a butyladamantyl methacrylate, a diethyladamantyl acrylate, a diethyladamantyl methacrylate, a tetramethyladamantanyl acrylate, a tetramethyladamantanyl methacrylate, an ethyldodecahydroacenaphthylenyl acrylate, an ethyldodecahydroacenaphthylenyl methacrylate, a dimethyldodecahydroacenaphthylenyl acrylate, a dimethyldodecahydroacenaphthylenyl methacrylate, an ethyldodecahydro(s)indacenyl acrylate, an ethyldodecahydro(s)indacenyl methacrylate, a dimethyldodecahydro(s)indacenyl acrylate, a dimethyldodecahydro(s)indacenyl methacrylate, an ethyldodecahydroheptalenyl acrylate, an ethyldodecahydroheptalenyl methacrylate, a dimethyldodecahydroheptalenyl acrylate, a dimethyldodecahydroheptalenyl methacrylate, a bicyclo[5.4.3]tetradecanyl acrylate, a bicyclo[5.4.3]tetradecanyl methacrylate, a bicyclo[5.5.2]tetradecanyl acrylate, a bicyclo[5.5.2]tetradecanyl methacrylate, a bicyclo[6.3.3]tetradecanyl acrylate, a bicyclo[6.3.3]tetradecanyl methacrylate, a bicyclo[6.4.2]tetradecanyl acrylate, a bicyclo[6.4.2]tetradecanyl methacrylate, a bicyclo[6.5.1]tetradecanyl acrylate, a bicyclo[6.5.1] tetradecanyl methacrylate, a bicyclo[7.3.2]tetradecanyl acrylate, a bicyclo[7.3.2]tetradecanyl methacrylate, a bicyclo[7.4.1]tetradecanyl acrylate, a bicyclo[7.4.1]tetradecanyl methacrylate, a bicyclo[8.2.2]tetradecanyl acrylate, a bicyclo[8.2.2]tetradecanyl methacrylate, a bicyclo[8.3.1]tetradecanyl acrylate, a bicyclo[8.3.1]tetradecanyl methacrylate, a bicyclo[9.2.1]tetradecanyl acrylate, a bicyclo[9.2.1]tetradecanyl methacrylate, a butyldecahydronaphthalenyl acrylate, a butyldecahydronaphthalenyl methacrylate, a diethyldecahydronaphthalenyl acrylate, a diethyldecahydronaphthalenyl methacrylate, a tetramethyldecahydronaphthalenyl acrylate, a tetramethyldecahydronaphthalenyl methacrylate, a butyldecahydroazulenyl acrylate, a butyldecahydroazulenyl methacrylate, a diethyldecahydroazulenyl acrylate, a diethyldecahydroazulenyl methacrylate, a tetramethyldecahydroazulenyl acrylate, a tetramethyldecahydroazulenyl methacrylate, a pentyloctahydroindenyl acrylate, a pentyloctahydroindenyl methacrylate, a hexyloctahydropentalenyl acrylate, a hexyloctahydropentalenyl methacrylate, a cyclohexyloctahydropentalenyl acrylate, a cyclohexyloctahydropentalenyl methacrylate, a hexamethylcyclooctyl acrylate, a hexamethylcyclooctyl methacrylate, a cyclohexylcyclooctyl acrylate, a cyclohexylcyclooctyl methacrylate, a heptylcycloheptyl acrylate, a heptylcycloheptyl methacrylate, a cycloheptylcycloheptyl acrylate, a cycloheptylcycloheptyl methacrylate, a cyclopentaacenaphthylenyl acrylate, a cyclopentaacenaphthylenyl methacrylate, a dicyclopentapentalenyl acrylate, a dicyclopentapentalenyl methacrylate, an anthracenyl acrylate, an anthracenyl methacrylate, a phenanthrenyl acrylate, a phenanthrenyl methacrylate, a cycloheptanaphthalenyl acrylate, a cycloheptanaphthalenyl methacrylate, a bibenzylyl acrylate, a bibenzylyl methacrylate, a stilbenyl acrylate, a stilbenyl methacrylate, a bicycloheptatrienylidenyl acrylate, a bicycloheptatrienylidenyl methacrylate, an octalenyl acrylate, an octalenyl methacrylate, a pentadecyl acrylate, a pentadecyl methacrylate, a cyclopentaphenanthrene acrylate, a cyclopentaphenanthrene methacrylate, a hexadecyl acrylate, a hexadecyl methacrylate, a pyrenyl acrylate, a pyrenyl methacrylate, a fluoranthenyl acrylate, a fluoranthenyl methacrylate, an aceanthrylenyl acrylate, an aceanthrylenyl methacrylate, a dicyclopentaheptalenyl acrylate, a dicyclopentaheptalenyl methacrylate, an indenoindenyl acrylate, an indenoindenyl methacrylate, a cyclooctaindacenyl acrylate, a cyclooctaindacenyl methacrylate, a cycloheptafluorenyl acrylate, a cycloheptafluorenyl methacrylate, a phenylnaphthalenyl acrylate, a phenylnaphthalenyl methacrylate, a bicyclooctatetraenyl acrylate, a bicyclooctatetraenyl methacrylate, a heptadecyl acrylate, a heptadecyl methacrylate, a methylhexadecyl acrylate, a methylhexadecyl methacrylate, an octadecyl acrylate, an octadecyl methacrylate, an octadecenyl acrylate, an octadecenyl methacrylate, an octadecadienyl acrylate, an octadecadienyl methacrylate, an octadecatrienyl acrylate, an octadecatrienyl methacrylate, a cyclopentapyrenyl acrylate, a cyclopentapyrenyl methacrylate, a cyclopentaaceanthrylenyl acrylate, a cyclopentaaceanthrylenyl methacrylate, an azulenoindacenyl acrylate, an azulenoindacenyl methacrylate, a dicycloheptanaphthalenyl acrylate, a dicycloheptanaphthalenyl methacrylate, a dicyclooctapentalenyl acrylate, a dicyclooctapentalenyl methacrylate, a tetracenyl acrylate, a tetracenyl methacrylate, a tetraphenyl acrylate, a tetraphenyl methacrylate, a chrysenyl acrylate, a chrysenyl methacrylate, a triphenylenyl acrylate, a triphenylenyl methacrylate, a cycloheptaanthracenyl acrylate, a cycloheptaanthracenyl methacrylate, an azulenoazulenyl acrylate, an azulenoazulenyl methacrylate, a nonadecyl acrylate, a nonadecyl methacrylate, an eicosanyl acrylate, an eicosanyl methacrylate, an indenofluorenyl acrylate, an indenofluorenyl methacrylate, a dicycloheptaindacenyl acrylate, a dicycloheptaindacenyl methacrylate, a perylenyl acrylate, a perylenyl methacrylate, a cycloheptapyrenyl acrylate, a cycloheptapyrenyl methacrylate, a dibenzofluoranthenyl acrylate, a dibenzofluoranthenyl methacrylate, a heptalenofluorenyl acrylate, a heptalenofluorenyl methacrylate, a dicycloheptanaphthalenyl acrylate, a dicycloheptanaphthalenyl methacrylate, a binaphthalenyl acrylate, a binaphthalenyl methacrylate, a biazulenyl acrylate, a biazulenyl methacrylate, a heneicosanyl acrylate, a heneicosanyl methacrylate, an azulenophenanthrenyl acrylate, an azulenophenanthrenyl methacrylate, a docosanyl acrylate, a docosanyl methacrylate, a pentacenyl acrylate, a pentacenyl methacrylate, a pentaphenyl acrylate, a pentaphenyl methacrylate, a picenyl acrylate, a picenyl methacrylate, a cycloheptaazulenoheptalenyl acrylate, a cycloheptaazulenoheptalenyl methacrylate, a tricosanyl acrylate, a tricosanyl methacrylate, a tetracosanyl acrylate, a tetracosanyl methacrylate, a coronenyl acrylate, a coronenyl methacrylate, a tetraphenylenyl acrylate, a tetraphenylenyl methacrylate, a biheptalenyl acrylate, a biheptalenyl methacrylate, a pentacosanyl acrylate, a pentacosanyl methacrylate, a hexacosanyl acrylate, a hexacosanyl methacrylate, a hexacenyl acrylate, a hexacenyl methacrylate, a hexaphenyl acrylate, a hexaphenyl methacrylate, a bianthracenyl acrylate, a bianthracenyl methacrylate, or a combination thereof.

In particular, regarding brush copolymer compositions according to the present disclosure: each $R^5$ may individually be a linear or branched $C_2$-$C_{18}$ alkyl moiety; each $R^6$ may individually be a linear $C_8$-$C_{20}$ alkyl moiety; each $R^1$ and $R^3$ may individually be hydrogen or methyl; each $R^2$ may individually be a covalently-linked copolymeric brush arm, a residual hydrogen, or a residual linear or branched $C_1$-$C_4$ hydroxyalkyl moiety; each $R^4$ may individually be a linear or branched $C_8$-$C_{24}$ alkyl moiety; and y and z may each be 1.

In particular, regarding brush copolymer compositions according to the present disclosure, three or more (e.g., four or more, five or more, six or more, seven or more, eight or more, or all; in particular, five or more, seven or more, or all) of the following are satisfied: a number average molecular weight of the brush copolymer composition, as measured using gel permeation chromatography (GPC) with tetrahydrofuran (TIF) containing ~2% (v/v) TEA as an eluent at ~40° C. against poly(methyl methacrylate) (PMMA) standards, is from 30,000 g/mol to 100,000 g/mol; each $R^5$ is individually a linear or branched $C_2$-$C_{18}$ alkyl moiety; each $R^6$ is individually a linear $C_8$-$C_{20}$ alkyl moiety; each $R^1$ and $R^3$ are individually hydrogen or methyl; each $R^4$ is individually a linear or branched $C_8$-$C_{24}$ alkyl moiety; and y and z are each 1; each $R^2$ is individually a covalently-linked copolymeric brush arm, a residual hydrogen, or a residual linear or branched $C_1$-$C_4$ hydroxyalkyl moiety, and at least 70 mol % of the $R^2$ groups are covalently-linked copolymeric brush arms; a sum of m+n is from 90 mol % to 100 mol % of an average degree of polymerization of the copolymeric brush arms; a ratio of m:n is from 1:25 to 2:1; a sum of a+b is from 90 mol % to 100 mol % of an average degree of polymerization of the copolymeric backbone; a ratio of a:b is from 1:14 to 1:2; the sum of a+b is 250 or less; and the sum of m+n is 75 or less.

In some embodiments, the copolymeric backbone can be made via a reversible deactivation radical polymerization (RDRP) process, such as a Reversible Addition Fragmentation chain Transfer (RAFT) polymerization process. Radical initiators for such process(es) may include, but are not necessarily limited to, peroxides, diazo compounds, and the like, as well as combinations and/or hybrids thereof. In RAFT polymerization processes, for example, a chain transfer agent can be used in tandem with the radical initiator(s). Suitable chain transfer agents may be chosen depending upon the (co)monomer system to be polymerized, e.g., as described in "Raft Polymerization A User's Guide," by S. Perrier, *Macromolecules,* 2017, 50, 7443-47 ("the Perrier article"), the contents of which are hereby incorporated by reference, and chain transfer agents may be selected to include, but are not necessarily limited to, thiocarbonylthio groups, such as aromatic substituted alkyl dithionates. RAFT conditions may also be chosen based upon the (co)monomer system to be polymerized, again, as noted in the Perrier article. Such (co)polymerizations may be carried out at standard pressures, reduced pressures, or elevated pressures. The polymerization temperature may also vary over a wide range. In particular, the polymerization may typically be conducted at temperatures from about −20° C. to about 200° C., e.g., from about 50° C. to about 150° C. or from about 70° C. to about 130° C.

In some embodiments, brush copolymer compositions, and/or individual brush arm components of brush copolymer compositions, according to the present description may advantageously exhibit upper critical solution temperature (UCST) behavior at a concentration of ~5 mg/mL in a Group III basestock having a kinematic viscosity at ~100° C. (KV100) of ~4 cSt. Turbidity analyses using UV-Vis spectroscopy (e.g., by altering temperature and monitoring a sensitive wavelength or group of wavelengths, such as at about 600 nm) may be used to indicate such UCST behavior. In such turbidity analyses, transition temperatures (indicating either dissolution or other wavelength-specific absorptions/scattering) can be measured as occurring at ~50% transmission, and it is preferred to do at least two heating and cooling cycles (over a reasonable temperature range chosen specifically not to induce significant (co)polymer degradation) and to consider data only from a heating and/or cooling cycle other than the first (e.g., so as to reduce, inhibit, or erase any prior thermal or associative history). UV-Vis turbidity transitions at ~600 nm wavelength for brush arms can be below ~80.0° C. (e.g., below ~75.0° C., below ~70.0° C., below ~65.0° C., below ~60.0° C., below ~55.0° C., below ~50.0° C., below 45.0° C., below ~40.0° C., below ~35.0° C., or below ~30° C.; additionally or alternatively, at or above ~−40.0° C., at or above ~−30.0° C., at or above ~−20.0° C., at or above ~−10.0° C., at or above ~0.0° C., at or above ~10.0° C., at or above ~15.0° C., or at or above ~20.0° C.) at a cooling rate of ~1° C./min on a second or subsequent (e.g., second or third) cooling cycle, and/or below ~85.0° C. (e.g., below ~80.0° C., below ~75.0° C., below ~70.0° C., below ~65.0° C., below ~60.0° C., below ~55.0° C., below ~50.0° C., below 45.0° C., below ~40.0° C., below ~35.0° C., or below ~30° C.; additionally or alternatively, at or above ~−40.0° C., at or above ~−30.0° C., at or above ~−20.0° C., at or above ~−10.0° C., at or above ~0.0° C., at or above ~10.0° C., at or above ~15.0° C., or at or above ~20.0° C.) at a heating rate of ~1° C./min on a second or subsequent (e.g., second or third) heating cycle.

Additionally or alternatively, such UCST behavior may be manifest as a primary exothermic transition in a differential scanning calorimeter (DSC) having a peak centered below ~85.0° C. (e.g., below ~80.0° C., below ~75.0° C., below ~70.0° C., below ~65.0° C., below ~60.0° C., below ~55.0° C., below ~50.0° C., below 45.0° C., below ~40.0° C., below ~35.0° C., or below ~30° C.; additionally or alternatively, at or above ~−40.0° C., at or above ~−30.0° C., at or above ~−20.0° C., at or above ~−10.0° C., at or above ~0.0° C., at or above ~10.0° C., at or above ~15.0° C., or at or above ~20.0° C.) at a cooling rate of ~1° C./min on a second or subsequent (e.g., second or third) cooling cycle. In such DSC analyses, as in turbidity analyses described herein, it is preferred to do at least two (e.g., at least three) heating and cooling cycles (over a reasonable temperature range chosen specifically not to induce significant (co)polymer degradation) and to consider data only from a heating and/or cooling cycle other than the first (e.g., so as to reduce, inhibit, or erase any prior thermal or associative history). As used herein, a "primary" exothermic transition can represent the largest peak (or assemblage of peaks, if multiple peaks have significant overlap) by peak area, or alternatively by peak height.

In particular, brush copolymer compositions, copolymeric backbone portions of a brush copolymer composition, and/or brush arm copolymer portions of a brush copolymer composition, according to the present disclosure, may have a polydispersity, as measured using gel permeation chromatography (GPC) with tetrahydrofuran (THF) containing ~2% (v/v) triethylamine (TEA) as an eluent at ~40° C. against poly(methyl methacrylate) (PMMA) standards, is less than 1.60 (e.g., 1.55 or less, 1.50 or less, 1.45 or less, 1.40 or less, 1.35 or less, 1.30 or less, 1.25, or 1.20 or less). Additionally or alternatively, a number average molecular weight of the brush copolymer composition, as measured using gel permeation chromatography (GPC) with tetrahydrofuran (THF) containing ~2% (v/v) TEA as an eluent at ~40° C. against poly(methyl methacrylate) (PMMA) standards, may be from 30,000 g/mol to 125,000 g/mol (e.g., from 30,000 g/mol to 110,000 g/mol, from 30,000 g/mol to 100,000 g/mol, from 30,000 g/mol to 90,000 g/mol, from 30,000 g/mol to 80,000 g/mol, from 30,000 g/mol to 75,000 g/mol, from 30,000 g/mol to 70,000 g/mol, from 30,000 g/mol to 65,000 g/mol, from 30,000 g/mol to 60,000 g/mol, from 40,000 g/mol to 125,000 g/mol, from 40,000 g/mol to 110,000 g/mol, from 40,000 g/mol to 100,000 g/mol, from 40,000 g/mol to 90,000 g/mol, from 40,000 g/mol to 80,000 g/mol, from 40,000 g/mol to 75,000 g/mol, from 40,000 g/mol to 70,000 g/mol, from 40,000 g/mol to 65,000 g/mol, from 45,000 g/mol to 125,000 g/mol, from 45,000 g/mol to 110,000 g/mol, from 45,000 g/mol to 100,000 g/mol, from 45,000 g/mol to 90,000 g/mol, from 45,000 g/mol to 80,000 g/mol, from 45,000 g/mol to 75,000 g/mol, or from 45,000 g/mol to 70,000 g/mol; in particular, from 30,000 g/mol to 100,000 g/mol, from 35,000 g/mol to 80,000 g/mol, or from 40,000 g/mol to 75,000 g/mol).

Brush copolymers according to the present disclosure may advantageously exhibit a relatively high oil solubility or dispersibility. As used herein, the term "oil-soluble" means that a composition comprising at least 0.1 wt %, preferably at least 0.5 wt %, of a comb copolymer viscosity modifier and at least 80 wt % (preferably, at least 85 wt %, at least 90 wt %, or the remainder) of a lubricating oil basestock may be combined relatively simply without stable macroscopic phase formation. Oil solubility and/or dispersibility may depend on the nature of the basestock, as well as the copolymer chemistry, inter alia.

In some preferred embodiments, the monomers of the copolymeric backbone are selected so that the resulting copolymeric backbone product (prior to reaction with the brush arms) has an calculated solubility parameter, based on the group contribution method (as described in R. Fedors, "A Method for Estimating Both the Solubility Parameters and Molar Volumes of Liquids," *Polym. Eng. Sci.*, 14(2), February 1974, pp. 147-54), of at most 9.46 $(cal/cm^3)^{1/2}$, e.g., at most 9.45 $(cal/cm^3)^{1/2}$, at most 9.44 $(cal/cm^3)^{1/2}$, at most 9.43 $(cal/cm^3)^{1/2}$, at most 9.42 $(cal/cm^3)^{1/2}$, at most 9.41 $(cal/cm^3)^{1/2}$, at most 9.40 $(cal/cm^3)^{1/2}$, at most 9.38 $(cal/cm^3)^{1/2}$, at most 9.36 $(cal/cm^3)^{1/2}$, at most 9.34 $(cal/cm^3)^{1/2}$, from 8.00 to 9.46, from 8.00 $(cal/cm^3)^{1/2}$, to 9.46 $(cal/cm^3)^{1/2}$, from 8.00 $(cal/cm^3)^{1/2}$, to 9.45 $(cal/cm^3)^{1/2}$, from 8.00 $(cal/cm^3)^{1/2}$, to 9.44 $(cal/cm^3)^{1/2}$, from 8.00 $(cal/cm^3)^{1/2}$, to 9.43 $(cal/cm^3)^{1/2}$, from 8.00 $(cal/cm^3)^{1/2}$, to 9.42 $(cal/cm^3)^{1/2}$, from 8.00 $(cal/cm^3)^{1/2}$, to 9.41 $(cal/cm^3)^{1/2}$, from 8.00 $(cal/cm^3)^{1/2}$, to 9.40 $(cal/cm^3)^{1/2}$, from 8.00 $(cal/cm^3)$, to 9.38 $(cal/cm^3)^{1/2}$, from 8.00 $(cal/cm^3)^{1/2}$ to 9.36 $(cal/cm^3)^{1/2}$, from 8.00 $(cal/cm^3)^{1/2}$ to 9.34 $(cal/cm^3)^{1/2}$, from 8.20 $(cal/cm^3)^{1/2}$, to 9.46 $(cal/cm^3)^{1/2}$, from 8.20 $(cal/cm^3)^{1/2}$, to 9.45 $(cal/cm^3)^{1/2}$, from 8.20 $(cal/cm^3)^{1/2}$, to 9.44 $(cal/cm^3)^{1/2}$, from 8.20 $(cal/cm^3)^{1/2}$ to 9.43 $(cal/cm^3)^{1/2}$, from 8.20 $(cal/cm^3)^{1/2}$, to 9.42 $(cal/cm^3)^{1/2}$, from 8.20 $(cal/cm^3)^{1/2}$, to 9.41 $(cal/cm^3)^{1/2}$, from 8.20 $(cal/cm^3)^{1/2}$, to 9.40 $(cal/cm^3)^{1/2}$, from 8.20 $(cal/cm^3)^{1/2}$ to 9.38 $(cal/cm^3)^{1/2}$, from 8.20 $(cal/cm^3)^{1/2}$, to 9.36 $(cal/cm^3)^{1/2}$, from 8.20 $(cal/cm^3)^{1/2}$, to 9.34 $(cal/cm^3)^{1/2}$, from 8.40 $(cal/cm^3)^{1/2}$, to 9.46 $(cal/cm^3)^{1/2}$, from 8.40 $(cal/cm^3)^{1/2}$, to 9.45 $(cal/cm^3)^{1/2}$, from 8.40 $(cal/cm^3)^{1/2}$, to 9.44 $(cal/cm^3)^{1/2}$, from 8.40 $(cal/cm^3)^{1/2}$ to 9.43 $(cal/cm^3)^{1/2}$, from 8.40 $(cal/cm^3)^{1/2}$, to 9.42 $(cal/cm^3)^{1/2}$, from 8.40 $(cal/cm^3)^{1/2}$, to 9.41 $(cal/cm^3)^{1/2}$, from 8.40 $(cal/cm^3)^{1/2}$, to 9.40 $(cal/cm^3)^{1/2}$, from 8.40 $(cal/cm^3)^{1/2}$ to 9.38 $(cal/cm^3)^{1/2}$, from 8.40 $(cal/cm^3)^{1/2}$ to 9.36 $(cal/cm^3)^{1/2}$, from 8.40 $(cal/cm^3)^{1/2}$, to 9.34 $(cal/cm^3)^{1/2}$, from 8.60 $(cal/cm^3)^{1/2}$, to 9.46 $(cal/cm^3)^{1/2}$, from 8.60 $(cal/cm^3)^{1/2}$, to 9.45 $(cal/cm^3)^{1/2}$, from 8.60 $(cal/cm^3)^{1/2}$, to 9.44 $(cal/cm^3)^{1/2}$, from 8.60 $(cal/cm^3)^{1/2}$, to 9.43 $(cal/cm^3)^{1/2}$, from 8.60 $(cal/cm^3)^{1/2}$, to 9.42 $(cal/cm^3)^{1/2}$, from 8.60 $(cal/cm^3)^{1/2}$, to 9.41 $(cal/cm^3)^{1/2}$, from 8.60 $(cal/cm^3)^{1/2}$, to 9.40 $(cal/cm^3)^{1/2}$, from 8.60 $(cal/cm^3)^{1/2}$ to 9.38 $(cal/cm^3)^{1/2}$, from 8.60 $(cal/cm^3)^{1/2}$ to 9.36 $(cal/cm^3)^{1/2}$, from 8.60 $(cal/cm^3)$, to 9.34 $(cal/cm^3)^{1/2}$, from 8.80 $(cal/cm^3)^{1/2}$ to 9.46 $(cal/cm^3)^{1/2}$, from 8.80 $(cal/cm^3)$, to 9.45 $(cal/cm^3)^{1/2}$, from 8.80 $(cal/cm^3)^{1/2}$ to 9.44 $(cal/cm^3)^{1/2}$, from 8.80 $(cal/cm^3)$, to 9.43 $(cal/cm^3)^{1/2}$, from 8.80 $(cal/cm^3)^{1/2}$ to 9.42 $(cal/cm^3)^{1/2}$, from 8.80 $(cal/cm^3)$, to 9.41 $(cal/cm^3)^{1/2}$, from 8.80 $(cal/cm^3)^{1/2}$ to 9.40 $(cal/cm^3)^{1/2}$, from 8.80 $(cal/cm^3)$, to 9.38 $(cal/cm^3)^{1/2}$, from 8.80 $(cal/cm^3)^{1/2}$ to 9.36 $(cal/cm^3)^{1/2}$, from 8.80 $(cal/cm^3)^{1/2}$, to 9.34 $(cal/cm^3)^{1/2}$, from 8.90 $(cal/cm^3)^{1/2}$, to 9.46 $(cal/cm^3)^{1/2}$, from 8.90 $(cal/cm^3)^{1/2}$, to 9.45 $(cal/cm^3)^{1/2}$, from 8.90 $(cal/cm^3)^{1/2}$, to 9.44 $(cal/cm^3)^{1/2}$, from 8.90 $(cal/cm^3)^{1/2}$, to 9.43 $(cal/cm^3)^{1/2}$, from 8.90 $(cal/cm^3)^{1/2}$, to 9.42 $(cal/cm^3)^{1/2}$, from 8.90 $(cal/cm^3)^{1/2}$, to 9.41 $(cal/cm^3)^{1/2}$, from 8.90 $(cal/cm^3)^{1/2}$, to 9.40 $(cal/cm^3)^{1/2}$, from 8.90 $(cal/cm^3)^{1/2}$ to 9.38 $(cal/cm^3)^{1/2}$, from 8.90 $(cal/cm^3)^{1/2}$ to 9.36 $(cal/cm^3)^{1/2}$, from 8.90 $(cal/cm^3)^{1/2}$, to 9.34 $(cal/cm^3)^{1/2}$, from 9.00 $(cal/cm^3)^{1/2}$, to 9.46 $(cal/cm^3)^{1/2}$, from 9.00 $(cal/cm^3)^{1/2}$, to 9.45 $(cal/cm^3)^{1/2}$, from 9.00 $(cal/cm^3)^{1/2}$, to 9.44 $(cal/cm^3)^{1/2}$, from 9.00 $(cal/cm^3)^{1/2}$, to 9.43 $(cal/cm^3)^{1/2}$, from 9.00 $(cal/cm^3)^{1/2}$, to 9.42 $(cal/cm^3)^{1/2}$, from 9.00 $(cal/cm^3)^{1/2}$, to 9.41 $(cal/cm^3)^{1/2}$, from 9.00 $(cal/cm^3)^{1/2}$, to 9.40 $(cal/cm^3)^{1/2}$, from 9.00 $(cal/cm^3)^{1/2}$, to 9.38 $(cal/cm^3)^{1/2}$, from 9.00 $(cal/cm^3)^{1/2}$, to 9.36 $(cal/cm^3)^{1/2}$, from 9.00 $(cal/cm^3)^{1/2}$, to 9.34 $(cal/cm^3)^{1/2}$, from 9.10 $(cal/cm^3)^{1/2}$, to 9.46 $(cal/cm^3)^{1/2}$, from 9.10 $(cal/cm^3)^{1/2}$, to 9.45 $(cal/cm^3)^{1/2}$, from 9.10 $(cal/cm^3)^{1/2}$, to 9.44 $(cal/cm^3)^{1/2}$, from 9.10 $(cal/cm^3)^{1/2}$, to 9.43 $(cal/cm^3)^{1/2}$, from 9.10 $(cal/cm^3)^{1/2}$, to 9.42 $(cal/cm^3)^{1/2}$, from 9.10 $(cal/cm^3)^{1/2}$, to 9.41 $(cal/cm^3)^{1/2}$, from 9.10 $(cal/cm^3)^{1/2}$, to 9.40 $(cal/cm^3)^{1/2}$, from 9.10 $(cal/cm^3)$, to 9.38 $(cal/cm^3)^{1/2}$, from 9.10 $(cal/cm^3)^{1/2}$ to 9.36 $(cal/cm^3)^{1/2}$, from 9.10 $(cal/cm^3)^{1/2}$ to 9.34 $(cal/cm^3)^{1/2}$, from 9.20 $(cal/cm^3)^{1/2}$, to 9.46 $(cal/cm^3)^{1/2}$, from 9.20 $(cal/cm^3)^{1/2}$, to 9.45 $(cal/cm^3)^{1/2}$, from 9.20 $(cal/cm^3)^{1/2}$, to 9.44 $(cal/cm^3)^{1/2}$, from 9.20 $(cal/cm^3)^{1/2}$ to 9.43 $(cal/cm^3)^{1/2}$, from 9.20 $(cal/cm^3)^{1/2}$, to 9.42 $(cal/cm^3)^{1/2}$, from 9.20 $(cal/cm^3)^{1/2}$, to 9.41 $(cal/cm^3)^{1/2}$, from 9.20 $(cal/cm^3)^{1/2}$, to 9.40 $(cal/cm^3)^{1/2}$, from 9.20 $(cal/cm^3)^{1/2}$, to 9.38 $(cal/cm^3)^{1/2}$, from 9.20 $(cal/cm^3)^{1/2}$, to 9.36 $(cal/cm^3)^{1/2}$, or from 9.20 $(cal/cm^3)$, to 9.34 $(cal/cm^3)^{1/2}$; in particular, the calculated solubility parameter can be at most 9.46 $(cal/cm^3)^{1/2}$, at most 9.45 $(cal/cm^3)^{1/2}$, from 8.20 $(cal/cm^3)^{1/2}$, to 9.46 $(cal/cm^3)^{1/2}$, from 8.60 $(cal/cm^3)^{1/2}$, to 9.45 $(cal/cm^3)^{1/2}$, or from 8.80 $(cal/cm^3)^{1/2}$, to 9.44 $(cal/cm^3)^{1/2}$. In the Fedors article, the solubility parameter, $\delta$, is approximated by calculation as: $\delta=[(\Sigma_i\Delta e_i)/(\Sigma_i\Delta\upsilon_i)]^{1/2}$, in which $\Delta e_i$ represent the individual tabulated energies of vaporization of the i components of each repeat unit and $\Delta\upsilon_i$ represent the individual tabulated molar volumes of the i components of each repeat unit.

If applied to modify viscosity, the brush copolymer can be combined with a lubricating composition (containing at least a lubricant basestock and optionally one or more functional lubricating composition components) in a viscosity modifying amount, e.g., to form a viscosity modified mixture. In particular, the brush copolymer may be combined with a lubricating oil basestock comprising a Group I, Group II, Group III basestock, and/or Group IV diluent/basestock, in particular comprising at least one Group II basestock and/or at least one Group III basestock while optionally comprising a Group IV metallocene-based or non-metallocene-based basestock and/or a Group V basestock. Optionally, a lubricant additive may also be included (e.g., such as via a concentrated lubricant additive package comprising a minor amount of a lubricating oil basestock and one or more of an antioxidant, a corrosion inhibitor, an anti-wear additive, a friction modifier, a dispersant, a detergent, a defoaming agent, an extreme pressure additive, a pour point depressant, and a seal-swelling control agent; or merely an admixture or combination of one or more of the enumerated additives).

In certain applications, the brush copolymer (as distinct from any viscosity modifier concentrate, which may contain additional (co)polymeric components and/or additional diluent, but no other lubricant-based functional ingredients) may be present in a lubricating composition in an amount from 0.2 mass % to 15 mass %, e.g., from 0.2 mass % to 12 mass %, from 0.2 mass % to 9.0 mass %, from 0.2 mass % to 8.0 mass %, from 0.2 mass % to 7.0 mass %, from 0.2 mass % to 6.0 mass %, from 0.2 mass % to 5.0 mass %, from 0.2 mass % to 4.0 mass %, from 0.2 mass % to 3.5 mass %, from 0.2 mass % to 3.0 mass %, from 0.2 mass % to 2.5 mass %, from 0.2 mass % to 2.0 mass %, from 0.4 mass % to 15 mass %, from 0.4 mass % to 12 mass %, from 0.4 mass % to 9.0 mass %, from 0.4 mass % to 8.0 mass %, from 0.4 mass % to 7.0 mass %, from 0.4 mass % to 6.0 mass %, from 0.4 mass % to 5.0 mass %, from 0.4 mass % to 4.0 mass %, from 0.4 mass % to 3.5 mass %, from 0.4 mass % to 3.0 mass %, from 0.4 mass % to 2.5 mass %, from 0.4 mass % to 2.0 mass %, from 0.5 mass % to 15 mass %, from 0.5 mass % to 12 mass %, from 0.5 mass % to 9.0 mass %, from 0.5 mass % to 8.0 mass %, from 0.5 mass % to 7.0 mass %, from 0.5 mass % to 6.0 mass %, from 0.5 mass % to 5.0 mass %, from 0.5 mass % to 4.0 mass %, from 0.5 mass % to 3.5 mass %, from 0.5 mass % to 3.0 mass %, from 0.5 mass % to 2.5 mass %, from 0.5 mass % to 2.0 mass %, from 0.6 mass % to 15 mass %, from 0.6 mass % to 12 mass %, from 0.6 mass % to 9.0 mass %, from 0.6 mass % to 8.0 mass %, from 0.6 mass % to 7.0 mass %, from 0.6 mass % to 6.0 mass %, from 0.6 mass % to 5.0 mass %, from 0.6 mass % to 4.0 mass %, from 0.6 mass % to 3.5 mass %, from 0.6 mass % to 3.0 mass %, from 0.6 mass % to 2.5 mass %, from 0.6 mass % to 2.0 mass %, from 0.8 mass % to 15 mass %, from 0.8 mass % to 12 mass %, from 0.8 mass % to 9.0 mass %, from 0.8 mass % to 8.0 mass %, from 0.8 mass % to 7.0 mass %, from 0.8 mass % to 6.0 mass %, from 0.8 mass % to 5.0 mass %, from 0.8 mass % to 4.0 mass %, from 0.8 mass % to 3.5 mass %, from 0.8 mass % to 3.0 mass %, from 0.8 mass % to 2.5 mass %, from 0.8 mass % to 2.0 mass %, from 1.0 mass % to 15 mass %, from 1.0 mass % to 12 mass %, from 1.0 mass % to 9.0 mass %, from 1.0 mass % to 8.0 mass %, from 1.0 mass % to 7.0 mass %, from 1.0 mass % to 6.0 mass %, from 1.0 mass % to 5.0 mass %, from 1.0 mass % to 4.0 mass %, from 1.0 mass % to 3.5 mass %, from 1.0 mass % to 3.0 mass %, from 1.0 mass % to 2.5 mass %, from 1.0 mass % to 2.0 mass %, from 1.2 mass % to 15 mass %, from 1.2 mass % to 12 mass %, from 1.2 mass % to 9.0 mass %, from 1.2 mass % to 8.0 mass %, from 1.2 mass % to 7.0 mass %, from 1.2 mass % to 6.0 mass %, from 1.2 mass % to 5.0 mass %, from 1.2 mass % to 4.0 mass %, from 1.2 mass % to 3.5 mass %, from 1.2 mass % to 3.0 mass %, from 1.2 mass % to 2.5 mass %, from 1.2 mass % to 2.0 mass %, from 1.4 mass % to 15 mass %, from 1.4 mass % to 12 mass %, from 1.4 mass % to 9.0 mass %, from 1.4 mass % to 8.0 mass %, from 1.4 mass % to 7.0 mass %, from 1.4 mass % to 6.0 mass %, from 1.4 mass % to 5.0 mass %, from 1.4 mass % to 4.0 mass %, from 1.4 mass % to 3.5 mass %, from 1.4 mass % to 3.0 mass %, from 1.4 mass % to 2.5 mass %, from 1.4 mass % to 2.0 mass %, from 1.5 mass % to 15 mass %, from 1.5 mass % to 12 mass %, from 1.5 mass % to 9.0 mass %, from 1.5 mass % to 8.0 mass %, from 1.5 mass % to 7.0 mass %, from 1.5 mass % to 6.0 mass %, from 1.5 mass % to 5.0 mass %, from 1.5 mass % to 4.0 mass %, from 1.5 mass % to 3.5 mass %, from 1.5 mass % to 3.0 mass %, from 1.5 mass % to 2.5 mass %, or from 1.5 mass % to 2.0 mass %, based on the total mass of the lubricating composition. In particular, the brush copolymer may be present in a lubricating composition in an amount from 0.5 mass % to 12 mass % or from 1.0 mass % to 9.0 mass %.

The lubricating oil basestock may be any suitable lubricating oil basestock known in the art. Both natural and synthetic lubricating oil basestocks may be suitable. Natural lubricating oils may include animal oils, vegetable oils (e.g., castor oil and lard oil), petroleum oils, mineral oils, oils derived from coal or shale, and combinations thereof. One particular natural lubricating oil includes or is mineral oil.

Suitable mineral oils may include all common mineral oil basestocks, including oils that are naphthenic or paraffinic in chemical structure. Suitable oils may be refined by conventional methodology using acid, alkali, and clay, or other agents such as aluminum chloride, or they may be extracted oils produced, for example, by solvent extraction with solvents such as phenol, sulfur dioxide, furfural, dichlorodiethyl ether, etc., or combinations thereof. They may be hydrotreated or hydrofined, dewaxed by chilling or catalytic dewaxing processes, hydrocracked, or some combination thereof. Suitable mineral oils may be produced from natural crude sources or may be composed of isomerized wax materials, or residues of other refining processes.

Synthetic lubricating oils may include hydrocarbon oils and halo-substituted hydrocarbon oils such as oligomerized, polymerized, and copolymerized olefins (e.g., polybutylenes, polypropylenes, propylene, isobutylene copolymers, chlorinated polylactenes, poly(1-hexenes), poly(1-octenes), poly-(1-decenes), etc., and mixtures thereof); alkylbenzenes (e.g., dodecyl-benzenes, tetradecylbenzenes, dinonyl-benzenes, di(2-ethylhexyl)benzene, etc.); polyphenyls (e.g., biphenyls, terphenyls, alkylated polyphenyls, etc.); alkylated diphenyl ethers, alkylated diphenyl sulfides, as well as their derivatives, analogs, and homologs thereof, and the like; and combinations and/or reaction products thereof.

In some embodiments, oils from this class of synthetic oils may comprise or be polyalphaolefins (PAO), including hydrogenated oligomers of an alpha-olefin, particularly oligomers of 1-decene, such as those produced by free radical processes, Ziegler catalysis, or cationic processes. They may, for example, be oligomers of branched or straight chain alpha-olefins having from 2 to 16 carbon atoms, specific non-limiting examples including polypropenes, polyisobutenes, poly-1-butenes, poly-1-hexenes, poly-1-octenes, poly-1-decene, poly-1-dodecene, and mixtures and/or copolymers thereof.

Synthetic lubricating oils may additionally or alternatively include alkylene oxide polymers, interpolymers, copolymers, and derivatives thereof, in which any (most) terminal hydroxyl groups have been modified by esterification, etherification, etc. This class of synthetic oils may be exemplified by: polyoxyalkylene polymers prepared by polymerization of ethylene oxide or propylene oxide; the alkyl and aryl ethers of these polyoxyalkylene polymers (e.g., methyl-polyisopropylene glycol ether having an average Mn of ~1000 Daltons, diphenyl ether of polypropylene glycol having an average Mn from about 1000 to about 1500 Daltons); and mono- and poly-carboxylic esters thereof (e.g., acetic acid ester(s), mixed $C_3$-$C_8$ fatty acid esters, $C_{12}$ oxo acid diester(s) of tetraethylene glycol, or the like, or combinations thereof).

Another suitable class of synthetic lubricating oils may comprise the esters of dicarboxylic acids (e.g., phthalic acid, succinic acid, alkyl succinic acids and alkenyl succinic acids, maleic acid, azelaic acid, suberic acid, sebacic acid, fumaric acid, adipic acid, linoleic acid dimer, malonic acid, alkylmalonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoethers, propylene glycol, etc.). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, a complex ester formed by reacting one mole of sebacic acid with two moles of tetraethylene glycol and two moles of 2-ethyl-hexanoic acid, and the like, and combinations thereof. A preferred type of oil from this class of synthetic oils may include adipates of $C_4$ to $C_{12}$ alcohols.

Esters useful as synthetic lubricating oils may additionally or alternatively include those made from $C_5$-$C_{12}$ monocarboxylic acids, polyols, and/or polyol ethers, e.g., such as neopentyl glycol, trimethylolpropane pentaerythritol, dipentaerythritol, tripentaerythritol, and the like, as well as combinations thereof.

The lubricating oils may be derived from unrefined oils, refined oils, re-refined oils, or mixtures thereof. Unrefined oils are obtained directly from a natural source or synthetic source (e.g., coal, shale, or tar sands bitumen) without further purification or treatment. Examples of unrefined oils may include a shale oil obtained directly from a retorting operation, a petroleum oil obtained directly from distillation, or an ester oil obtained directly from an esterification process, each or a combination of which may then be used without further treatment. Refined oils are similar to the unrefined oils, except that refined oils have typically been treated in one or more purification steps to change chemical structure and/or to improve one or more properties. Suitable purification techniques may include distillation, hydrotreating, dewaxing, solvent extraction, acid or base extraction, filtration, and percolation, all of which are known to those skilled in the art. Re-refined oils may be obtained by treating used and/or refined oils in processes similar to those used to obtain refined oils in the first place. Such re-refined oils may be known as reclaimed or reprocessed oils and may often additionally be processed by techniques for removal of spent additives and oil breakdown products.

Another additional or alternative class of suitable lubricating oils may include those basestocks produced from oligomerization of natural gas feed stocks or isomerization of waxes. These basestocks can be referred to in any number of ways but commonly they are known as Gas-to-Liquid (GTL) or Fischer-Tropsch basestocks.

The lubricating oil basestock according to the present disclosure may be a blend of one or more of the oils/basestocks described herein, whether of a similar or different type, and a blend of natural and synthetic lubricating oils (i.e., partially synthetic) is expressly contemplated for this disclosure.

Lubricating oils can be classified as set out in the American Petroleum Institute (API) publication "Engine Oil Licensing and Certification System", Industry Services Department, Fourteenth Edition, December 1996, Addendum 1, December 1998, in which oils are categorized as follows:

a) Group I basestocks contain less than 90 percent saturates and/or greater than 0.03 percent sulfur and have a viscosity index greater than or equal to 80 and less than 120;
b) Group II basestocks contain greater than or equal to 90 percent saturates and less than or equal to 0.03 percent sulfur and have a viscosity index greater than or equal to 80 and less than 120;
c) Group III basestocks contain greater than or equal to 90 percent saturates and less than or equal to 0.03 percent sulfur and have a viscosity index greater than or equal to 120;
d) Group IV basestocks are polyalphaolefins (PAO); and,
e) Group V basestocks include all other basestock oils not included in Groups I, II, III, or IV.

In particular, the lubricating oil may comprise or be a mineral oil or a mixture of mineral oils, in particular mineral oils of Group I, Group II, Group III, and/or Group IV (of the API classification). For example, a lubricating oil basestock (e.g., comprising Group I, Group II, Group III, and/or Group IV) may comprise from 55 mass % to 98 mass %, e.g., from 55 mass % to 95 mass %, from 55 mass % to 90 mass %, from 55 mass % to 85 mass %, from 60 mass % to 98 mass %, from 60 mass % to 95 mass %, from 60 mass % to 90 mass %, from 60 mass % to 85 mass %, from 65 mass % to 98 mass %, from 65 mass % to 95 mass %, from 65 mass % to 90 mass %, from 65 mass % to 85 mass %, from 70 mass % to 98 mass %, from 70 mass % to 95 mass %, from 70 mass % to 90 mass %, from 70 mass % to 85 mass %, from 75 mass % to 98 mass %, from 75 mass % to 95 mass %, from 75 mass % to 90 mass %, from 75 mass % to 85 mass %, from 80 mass % to 98 mass %, from 80 mass % to 95 mass %, from 80 mass % to 90 mass %, or from 80 mass % to 85 mass %, of the total mass of the lubricant composition (which comprises the lubricating oil basestock component and any lubricant additives, in this case as well as the brush copolymer).

The lubricant additive may include one or more additive components and may be present in a (concentrated) lubricant additive package. Although (concentrated) additive packages typically include some minor amount of lubricating oil basestock or the like to compatibilize additives with the remainder of the lubricant composition, the term "additive" here only refers to the lubricant additives in the lubricant composition, while the term "lubricating oil basestock" refers to all the basestocks both from the additive package and as majority phase lubricant component. Additionally or alternatively, two or more additives may be added together as an additive package, while one or more other components may be added separately to the lubricating oil basestock and/or to the admixture for forming the lubricant composition.

In particular, the lubricant additive may comprise, consist essentially of, or be one or more of an antioxidant, a corrosion inhibitor, an anti-wear additive, a friction modifier, a dispersant, a detergent, a defoaming agent, an extreme pressure additive, a pour point depressant, optionally a dye and/or a dye stabilizer, and a seal-swelling control agent.

Anti-wear additives, as the name suggests, may be used to reduce wear in lubricated components, e.g., motorized drivetrain components such as crankcases and/or transmissions. Some anti-wear components may alternatively provide antioxidant function, as well as anti-wear function.

It is known in the art that compounds contain phosphorus can provide wear protection to highly-loaded contacting metal surfaces. Without being bound by theory, this has been suggested to be the result of the formation of a phosphite 'glass' on a lubricated metal surface.

A phosphorus-containing anti-wear component may comprise one or more, in particular two or more or three or more, compounds of structures (I):

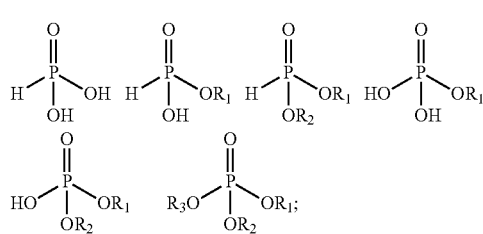

where groups $R_1$, $R_2$, and $R_3$ may each independently comprise or be alkyl groups having 1 to 18 carbon atoms and/or alkyl groups having 1 to 18 carbon atoms where the alkyl chain is interrupted by a thioether linkage, with the proviso that at least some of groups $R_1$, $R_2$, and $R_3$ may comprise or be alkyl groups having 1 to 18 carbon atoms where the alkyl chain is interrupted by a thioether linkage. The mixture may comprise three or more, four or more, or five or more compounds of the structures (I).

In some embodiments, groups $R_1$, $R_2$, and $R_3$ may each independently comprise or be alkyl groups having 4 to 10 carbon atoms and/or alkyl groups having 4 to 10 carbon atoms where the alkyl chain is interrupted by a thioether linkage, with the proviso that at least some of groups $R_1$, $R_2$, and $R_3$ may comprise or be alkyl groups having 4 to 10 carbon atoms where the alkyl chain is interrupted by a thioether linkage.

When groups $R_1$, $R_2$, and $R_3$ comprise alkyl groups (in which the alkyl chain is not interrupted by a thioether linkage), examples may include but are not limited to methyl, ethyl, propyl, and butyl, in particular including or being butyl.

When groups $R_1$, $R_2$, and $R_3$ comprise alkyl groups where the alkyl chain is interrupted by a thioether linkage, examples include groups of the structure —R'—S—R" where R' may be —$(CH_2)_n$—, in which n may be an integer from 2 to 4, and where R" may be —$(CH_2)_m$—$CH_3$, in which m may be an integer from 1 to 17, such as from 3 to 9.

In particular, with respect to the compounds of structures (I), at least 10% (e.g., at least 20%, at least 30%, or at least 40%) by mass of all structure (I) compounds comprise those in which at least one of $R_1$, $R_2$, and $R_3$ comprises or is an alkyl group where the alkyl chain is interrupted by a thioether linkage, particularly having the structure —R'—S—R", where R' may be —$(CH_2)_n$—, in which n may be an integer from 2 to 4, and where R" may be —$(CH_2)_m$—$CH_3$, in which m may be an integer from 1 to 17, such as from 3 to 9.

Another class of phosphorus-containing anti-wear additives may include one or more zinc dihydrocarbyl dithiophosphate compounds. Such compounds are known in the art and often referred to as ZDDP. They may be prepared in accordance with known techniques, such as by first forming a dihydrocarbyl dithiophosphoric acid (DDPA), usually by reaction of one or more alcohols or a phenol with $P_2S_5$, and then neutralizing the formed DDPA with a zinc compound. For example, a dithiophosphoric acid may be made by reacting mixtures of primary and secondary alcohols. Alternatively, dithiophosphoric acids can be prepared where the hydrocarbyl groups are entirely secondary in character or the hydrocarbyl groups are entirely primary in character. To make the zinc salt, any basic or neutral zinc compound may be used, but oxides, hydroxides, and carbonates are typically employed. Commercial additives may frequently contain an excess of zinc, due to the use of an excess of the basic zinc compound in the neutralization reaction.

Advantageous zinc dihydrocarbyl dithiophosphates may comprise or be oil-soluble or oil-dispersible salts of dihydrocarbyl dithiophosphoric acids, such as represented by the following formula:

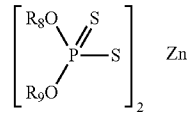

wherein $R_8$ and $R_9$ may be the same or different hydrocarbyl radicals containing from 1 to 18 (e.g., from 2 to 12 or from 2 to 8) carbon atoms, examples of which hydrocarbyl radicals may include one or more of alkyl, alkenyl, aryl, arylalkyl, alkaryl, and cycloaliphatic radicals. Exemplary hydrocarbyl radicals may comprise or be, but are not necessarily limited to, ethyl, n-propyl, isopropyl, n-butyl, isobutyl, sec-butyl, amyl, n-hexyl, isohexyl, n-octyl, decyl, dodecyl, octadecyl, 2-ethylhexyl, phenyl, benzyl, butylphenyl, cyclohexyl, methylcyclopentyl, propenyl, butenyl, and combinations thereof. In order to obtain and/or maintain oil solubility and/or dispersibility, the total number of carbon atoms on each dihydrocarbyl dithiophosphoric acid ligand (i.e., a single $R_8$ and $R_9$ pair) may generally be at least about 5. In particular, the zinc dihydrocarbyl dithiophosphate can therefore comprise or be a zinc dialkyl dithiophosphate.

A non-phosphorus-containing anti-wear component, which is typically present in admixture with the phosphorus-containing anti-wear compound(s) of structures (I), may comprise one or more, in particular two or more, compounds of structures (II):

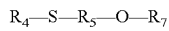

 (II)

where groups $R_4$ and $R_7$ may each independently comprise or be alkyl groups having 1 to 12 carbon atoms, and where $R_5$ and $R_6$ may each independently comprise or be alkyl linkages having 2 to 12 carbon atoms. In particular, $R_4$ and $R_7$ may each independently comprise or be $—(CH_2)_m—CH_3$, where m is an integer from 1 to 17, such as from 3 to 9, and $R_5$ and $R_6$ may each independently comprise or be $—(CH_2)_n—$, where n is an integer from 2 to 4. The mixture may comprise three or more compounds of structures (II).

In particular, a mass ratio of compounds of structure (I) to compounds of structure (II) may be from 2:1 to 1:2, from 3:2 to 2:3, or from 4:3 to 3:4.

Examples of ashless dispersants may include polyisobutenyl succinimides, polyisobutenyl succinamides, mixed ester/amides of polyisobutenyl-substituted succinic acid, hydroxyesters of polyisobutenyl-substituted succinic acid, and Mannich condensation products of hydrocarbyl-substituted phenols, formaldehyde, and polyamines, as well as reaction products and mixtures thereof.

Basic nitrogen-containing ashless dispersants are well-known lubricating oil additives and methods for their preparation are extensively described in the patent literature. Exemplary dispersants may include the polyisobutenyl succinimides and succinamides in which the polyisobutenyl-substituent is a long-chain of greater than 36 carbons, e.g., greater than 40 carbon atoms. These materials can be readily made by reacting a polyisobutenyl-substituted dicarboxylic acid material with a molecule containing amine functionality. Examples of suitable amines may include polyamines such as polyalkylene polyamines, hydroxy-substituted polyamines, polyoxyalkylene polyamines, and combinations thereof. The amine functionality may be provided by polyalkylene polyamines such as tetraethylene pentamine and pentaethylene hexamine. Mixtures where the average number of nitrogen atoms per polyamine molecule is greater than 7 are also available. These are commonly called heavy polyamines or H-PAMs and may be commercially available under trade names such as HPA™ and HPA-X™ from DowChemical, E-100™ from Huntsman Chemical, et al. Examples of hydroxy-substituted polyamines may include N-hydroxyalkyl-alkylene polyamines such as N-(2-hydroxyethyl)ethylene diamine, N-(2-hydroxyethyl)piperazine, and/or N-hydroxyalkylated alkylene diamines of the type described, for example, in U.S. Pat. No. 4,873,009. Examples of polyoxyalkylene polyamines may include polyoxyethylene and polyoxypropylene diamines and triamines having an average Mn from about 200 to about 2500 Daltons. Products of this type may be commercially available under the tradename Jeffamine™.

As is known in the art, reaction of the amine with the polyisobutenyl-substituted dicarboxylic acid material (suitably an alkenyl succinic anhydride or maleic anhydride) can be conveniently achieved by heating the reactants together, e.g., in an oil solution. Reaction temperatures of ~100° C. to ~250° C. and reaction times from ~1 to ~10 hours may be typical. Reaction ratios can vary considerably, but generally from about 0.1 to about 1.0 equivalents of dicarboxylic acid unit content may be used per reactive equivalent of the amine-containing reactant.

In particular, the ashless dispersant may include a polyisobutenyl succinimide formed from polyisobutenyl succinic anhydride and a polyalkylene polyamine such as tetraethylene pentamine or H-PAM. The polyisobutenyl group may be derived from polyisobutene and may exhibit a number average molecular weight (Mn) from about 750 to about 5000 Daltons, e.g., from about 900 to about 2500 Daltons. As is known in the art, dispersants may be post treated (e.g., with a borating/boronating agent and/or with an inorganic acid of phosphorus). Suitable examples may be found, for instance, in U.S. Pat. Nos. 3,254,025, 3,502,677, and 4,857,214.

Detergents, such as calcium-containing detergents, are sufficiently oil-soluble or oil-dispersible such as to remain dissolved or dispersed in an oil in order to be transported by the oil to their intended site of action. Calcium-containing detergents are known in the art and include neutral and overbased calcium salts with acidic substances such as salicylic acids, sulfonic acids, carboxylic acids, alkyl phenols, sulfurized alkyl phenols and mixtures of these substances.

Neutral calcium-containing detergents are those detergents that contain stoichiometrically equivalent amounts of calcium in relation to the amount of (Lewis) acidic moieties present in the detergent. Thus, in general, neutral detergents can typically have a relatively low basicity, when compared to their overbased counterparts.

The term "overbased," for example in connection with calcium detergents, is used to designate the fact that the calcium component is present in stoichiometrically larger amounts than the corresponding (Lewis) acid component. The commonly employed methods for preparing the overbased salts involve heating a mineral oil solution of an acid with a stoichiometric excess of a neutralizing agent at an appropriate temperature (in this case, a calcium neutralizing agent, such as an oxide, hydroxide, carbonate, bicarbonate, sulfide, or combination thereof, at a temperature of about 50° C.) and filtering the resultant product. The use of a "promoter" in the neutralization step to aid the incorporation of a large excess of salt/base (in this case, calcium) likewise is known. Examples of compounds useful as a promoter may include, but are not necessarily limited to, phenolic substances such as phenol, naphthol, alkyl phenol, thiophenol, sulfurized alkylphenol, and condensation products of formaldehyde with a phenolic substance; alcohols such as methanol, 2-propanol, octanol, Cellosolve™ alcohol, Carbitol™ alcohol, ethylene glycol, stearyl alcohol, and cyclohexyl alcohol; amines such as aniline, phenylene diamine, phenothiazine, phenyl-beta-naphthylamine, and dodecylamine; and combinations thereof. A particularly effective method for preparing the basic salts comprises mixing an acidic substance with an excess of calcium neutralizing agent and at least one alcohol promoter, and carbonating the mixture at an elevated temperature, such as from 60 to 200° C.

Examples of calcium-containing detergents useful in lubricant compositions of the present disclosure may include, but are not necessarily limited to, neutral and/or overbased salts of such substances as calcium phenates; sulfurized calcium phenates (e.g., wherein each aromatic group has one or more aliphatic groups to impart hydrocarbon solubility); calcium sulfonates (e.g., wherein each sulfonic acid moiety is attached to an aromatic nucleus, which in turn usually contains one or more aliphatic substituents to impart hydrocarbon solubility); calcium salicylates (e.g., wherein the aromatic moiety is usually substituted by one or more aliphatic substituents to impart hydrocarbon solubility); calcium salts of hydrolyzed phosphosulfurized olefins (e.g., having 10 to 2000 carbon atoms) and/or of hydrolyzed phosphosulfurized alcohols and/or aliphatic-substituted phenolic compounds (e.g., having 10 to 2000 carbon atoms); calcium salts of aliphatic carboxylic acids and/or aliphatic substituted cycloaliphatic carboxylic acids; and combinations and/or reaction products thereof, as well as many other similar calcium salts of oil-soluble organic acids. Mixtures of neutral and/or overbased salts of two or more different acids can be used, if desired (e.g., one or more overbased calcium phenates with one or more overbased calcium sulfonates).

Methods for the production of oil-soluble neutral and overbased calcium detergents are well known to those skilled in the art and are extensively reported in the patent literature. Calcium-containing detergents may optionally be post-treated, e.g., borated. Methods for preparing borated detergents are well known to those skilled in the art and are extensively reported in the patent literature.

Antioxidants are sometimes referred to as oxidation inhibitors and may increase the resistance (or decrease the susceptibility) of the lubricant composition to oxidation. They may work by combining with and modifying oxidative agents, such as peroxides and other free radical-forming compounds, to render them harmless, e.g., by decomposing them or by rendering inert a catalyst or facilitator of oxidation. Oxidative deterioration can be evidenced by sludge in the fluid with increased use, by varnish-like deposits on metal surfaces, and sometimes by viscosity increase.

Examples of suitable antioxidants may include, but are not limited to, copper-containing antioxidants, sulfur-containing antioxidants, aromatic amine-containing and/or amide-containing antioxidants, hindered phenolic antioxidants, dithiophosphates and derivatives, and the like, as well as combinations and certain reaction products thereof. Some anti-oxidants may be ashless (i.e., may contain few, if any, metal atoms other than trace or contaminants).

Corrosion inhibitors may be used to reduce the corrosion of metals and are often alternatively referred to as metal deactivators or metal passivators. Some corrosion inhibitors may alternatively be characterized as antioxidants.

Suitable corrosion inhibitors may include nitrogen and/or sulfur containing heterocyclic compounds such as triazoles (e.g., benzotriazoles), substituted thiadiazoles, imidazoles, thiazoles, tetrazoles, hydroxyquinolines, oxazolines, imidazolines, thiophenes, indoles, indazoles, quinolines, benzoxazines, dithiols, oxazoles, oxatriazoles, pyridines, piperazines, triazines and derivatives of any one or more thereof. A particular corrosion inhibitor is a benzotriazole represented by the structure:

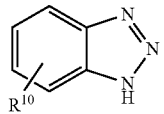

wherein $R^{10}$ is absent or is a $C_1$ to $C_{20}$ hydrocarbyl or substituted hydrocarbyl group which may be linear or branched, saturated or unsaturated. It may contain ring structures that are alkyl or aromatic in nature and/or contain heteroatoms such as N, O, or S. Examples of suitable compounds may include benzotriazole, alkyl-substituted benzotriazoles (e.g., tolyltriazole, ethylbenzotriazole, hexylbenzotriazole, octylbenzotriazole, etc.), aryl substituted benzotriazole, alkaryl- or aralkyl-substituted benzotriazoles, and the like, as well as combinations thereof. For instance, the triazole may comprise or be a benzotriazole and/or an alkylbenzotriazole in which the alkyl group contains from 1 to about 20 carbon atoms or from 1 to about 8 carbon atoms. A preferred corrosion inhibitor may comprise or be benzotriazole and/or tolyltriazole.

Additionally or alternatively, the corrosion inhibitor may include a substituted thiadiazoles represented by the structure:

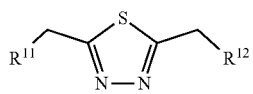

wherein $R^{11}$ and $R^{12}$ are independently hydrogen or a hydrocarbon group, which group may be aliphatic or aromatic, including cyclic, alicyclic, aralkyl, aryl and alkaryl. These substituted thiadiazoles are derived from the 2,5-dimercapto-1,3,4-thiadiazole (DMTD) molecule. Many derivatives of DMTD have been described in the art, and any such compounds can be included in the transmission fluid used in the present disclosure. For example, U.S. Pat. Nos. 2,719,125, 2,719,126, and 3,087,937 describe the preparation of various 2, 5-bis-(hydrocarbon dithio)-1,3,4-thiadiazoles.

Further additionally or alternatively, the corrosion inhibitor may include one or more other derivatives of DMTD, such as a carboxylic ester in which $R^9$ and $R^{10}$ may be joined to the sulfide sulfur atom through a carbonyl group. Preparation of these thioester containing DMTD derivatives is described, for example, in U.S. Pat. No. 2,760,933. DMTD derivatives produced by condensation of DMTD with alpha-halogenated aliphatic monocarboxylic carboxylic acids having at least 10 carbon atoms are described, for example, in U.S. Pat. No. 2,836,564. This process produces DMTD derivatives wherein $R^{11}$ and $R^{12}$ are HOOC—CH($R^{13}$)— ($R^{13}$ being a hydrocarbyl group). DMTD derivatives further produced by amidation or esterification of these terminal carboxylic acid groups may also be useful.

The preparation of 2-hydrocarbyldithio-5-mercapto-1,3,4-thiadiazoles is described, for example, in U.S. Pat. No. 3,663,561.

A particular class of DMTD derivatives may include mixtures of a 2-hydrocarbyldithio-5-mercapto-1,3,4-thiadiazole and a 2,5-bis-hydrocarbyldithio-1,3,4-thiadiazole. Such mixtures may be sold under the tradename HiTEC® 4313 and are commercially available from Afton Chemical.

Friction modifiers may include derivatives of polyethylene polyamines and/or ethoxylated long chain amines. The derivatives of polyethylene polyamines may advantageously include succinimides of a defined structure or may be simple amides.

Suitable succinimides derived from polyethylene polyamines may include those of the following structure:

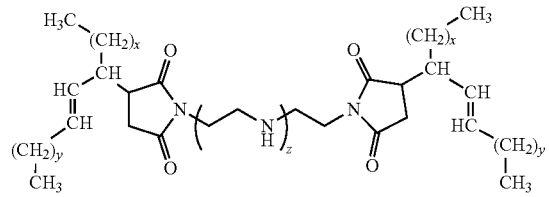

wherein x+y may be from 8 to 15 and z may be 0 or an integer from 1 to 5, in particular wherein x+y may be from 11 to 15 (e.g., 13) and z may be from 1 to 3. Preparation of such friction modifiers is described, for example, in U.S. Pat. No. 5,840,663.

The above succinimides may be post-reacted with acetic anhydride to form friction modifiers exemplified by the following structure (in which z=1):

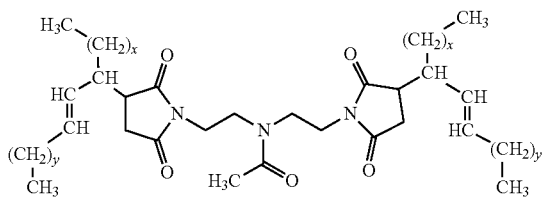

Preparation of this friction modifier, e.g., can be found in U.S. Patent Application Publication No. 2009/0005277. Post reaction with other reagents, e.g., borating agents, is also known in the art.

An example of an alternative simple amide may have the following structure:

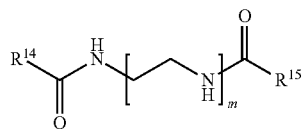

wherein $R^{14}$ and $R^{15}$ may be the same or different alkyl groups. For example, $R^{14}$ and $R^{15}$ may be $C_{14}$ to $C_{20}$ alkyl groups, which may be linear or branched, and m can be an integer from 1 to 5. In particular, $R^{14}$ and $R^{15}$ may both be derived from iso-stearic acid, and m may be 4.

Suitable ethoxylated amine friction modifiers may include or be reaction products of primary amines and/or diamines with ethylene oxide. The reaction with ethylene oxide may be suitably carried out using a stoichiometry such that substantially all primary and secondary amines may be converted to tertiary amines. Such amines may have the exemplary structures:

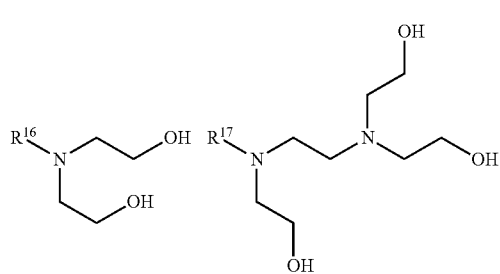

wherein $R^{16}$ and $R^{17}$ may be alkyl groups, or alkyl groups containing sulfur or oxygen linkages, containing from about 10 to 20 carbon atoms. Exemplary ethoxylated amine friction modifiers may include materials in which $R^{16}$ and/or $R^{17}$ may contain from 16 to 20 carbon atoms, e.g., from 16 to 18 carbon atoms. Materials of this type may be commercially available and sold under the tradenames of Ethomeen® and Ethoduomeen® by Akzo Nobel. Suitable materials from Akzo Nobel may include Ethomeen® T/12 and Ethoduomeen® T/13, inter alia.

Another alternative type of friction modifier includes an oil-soluble or oil-dispersible molybdenum-containing compound, such as an oil-soluble or oil-dispersible organo-molybdenum compound. Non-limiting examples of such oil-soluble or oil-dispersible organo-molybdenum compound may include, but are not necessarily limited to, molybdenum dithiocarbamates, molybdenum dithiophosphates, molybdenum dithiophosphinates, molybdenum xanthates, molybdenum thioxanthates, molybdenum sulfides, and the like, and mixtures thereof, in particular one or more of molybdenum dialkyldithiocarbamates, molybdenum dialkyldithiophosphates, molybdenum alkyl xanthates, and molybdenum alkylthioxanthates. Representative molybdenum alkyl xanthate and molybdenum alkylthioxanthate compounds may be expressed using the formulae of $Mo(R_{18}OCS_2)_4$ and $Mo(R_{18}SCS_2)_4$, respectively, wherein each $R_{18}$ may independently be an organo group selected from the group consisting of alkyl, aryl, aralkyl, and alkoxyalkyl, generally having from 1 to 30 carbon atoms or from 2 to 12 carbon atoms, in particular each being an alkyl group having from 2 to 12 carbon atoms.

In certain embodiments, the oil-soluble or oil-dispersible organo-molybdenum compound may comprise a molybdenum dithiocarbamate, such as a molybdenum dialkyldithiocarbamate, and/or may be substantially free from molybdenum dithiosphosphates, in particular from molybdenum dialkyldithiophosphates. In certain other embodiments, any oil-soluble or oil-dispersible molybdenum compounds may consist of a molybdenum dithiocarbamate, such as a molybdenum dialkyldithiocarbamate, and/or a molybdenum dithiophosphate, such as a molybdenum dialkyldithiophosphate, as the sole source(s) of molybdenum atoms in the lubricant composition. In either set of embodiments, the oil-soluble or oil-dispersible molybdenum compound may consist essentially of a molybdenum dithiocarbamate, such as a molybdenum dialkyldithiocarbamate, as the sole source of molybdenum atoms in the lubricant composition.

The molybdenum compound may be mono-, di-, tri-, or tetra-nuclear, in particular comprising or being di-nuclear and/or tri-nuclear molybdenum compounds.

Suitable dinuclear or dimeric molybdenum dialkyldithiocarbamates, for example, can be represented by the following formula:

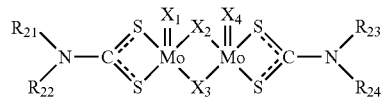

where $R_{21}$ through $R_{24}$ may each independently represent a straight chain, branched chain, or aromatic hydrocarbyl group having 1 to 24 carbon atoms, and where $X_1$ through $X_4$ may each independently represent an oxygen atom or a sulfur atom. The four hydrocarbyl groups, $R_{21}$ through $R_{24}$, may be identical to, or different from, each other.

Suitable tri-nuclear organo-molybdenum compounds may include those having the formula: $Mo_3S_kL_nQ_z$, and mixtures thereof. In such tri-nuclear formula, the three molybdenum atoms may be linked to multiple sulfur atoms (S), with k varying from 4 through 7. Additionally, each L may be an independently selected organic ligand having a sufficient number of carbon atoms to render the compound oil-soluble or oil-dispersible, with n being from 1 to 4. Further, when z is non-zero, Q may be selected from the group of neutral electron donating compounds such as water, amines, alcohols, phosphines, and/or ethers, with z ranging from 0 to 5 and including non-stoichiometric (non-integer) values.

In such tri-nuclear formula, at least 21 total carbon atoms (e.g., at least 25, at least 30, or at least 35) may typically be present among the combination of all ligands ($L_n$). Importantly, however, the organic groups of the ligands may advantageously collectively exhibit a sufficient number of carbon atoms to render the compound soluble or dispersible in the oil. For example, the number of carbon atoms within each ligand L may generally range from 1 to 100, e.g., from 1 to 30 or from 4 to 20.

Tri-nuclear molybdenum compounds having the formula $Mo_3S_kL_nQ_z$ may advantageously exhibit cationic cores surrounded by anionic ligands, such as represented by one or both of the following structures:

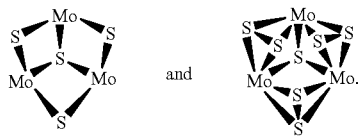

Such cationic cores may each have a net charge of +4 (e.g., due to the oxidation state of the Mo atoms each being +4). Consequently, in order to solubilize these cores, the total charge among all the ligands should correspond, in this case being ~4. Four mono-anionic ligands may offer an advantageous core neutralization. Without wishing to be bound by any theory, it is believed that two or more tri-nuclear cores may be bound or interconnected by means of one or more ligands, and the ligands may be multidentate. This includes the case of a multidentate ligand having multiple connections to a single core. Oxygen and/or selenium may be substituted for some portion of the sulfur atoms in either of the cores.

As ligands for the tri-nuclear cores described above, non-limiting examples may include, but are not necessarily limited to, dithiophosphates such as dialkyldithiophosphate, xanthates such as alkylxanthate and/or alkylthioxanthate, dithiocarbamates such as dialkyldithiocarbamate, and combinations thereof, in particular each comprising or being dialkyldithiocarbamate. Additionally or alternatively, the ligands for the tri-nuclear molybdenum-containing cores may independently be one or more of the following:

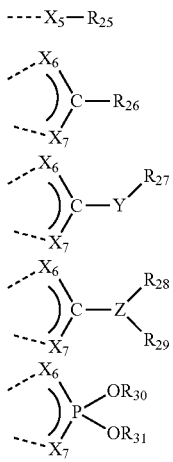

where $X_5$, $X_6$, $X_7$, and Y are each independently oxygen or sulfur, where Z is nitrogen or boron, and wherein $R_{25}$, $R_{26}$, $R_{27}$, $R_{28}$, $R_{29}$, $R_{30}$, and $R_{31}$ are each independently hydrogen or an organic (carbon-containing) moiety, such as a hydrocarbyl group, that may be the same or different from each other, in particular the same. Exemplary organic moieties may include or be alkyl (e.g., in which the carbon atom attached to the remainder of the ligand is primary or secondary), aryl, substituted aryl, alkaryl, substituted alkaryl, aralkyl, substituted aralkyl, an ether, a thioether, or a combination or reaction product thereof, in particular alkyl.

Oil-soluble or oil-dispersible tri-nuclear molybdenum compounds can be prepared by reacting in the appropriate liquid(s)/solvent(s) a molybdenum source such as $(NH_4)_2Mo_3S_{13} \cdot n(H_2O)$, where n varies from 0 to 2 including non-stoichiometric (non-integer) values, with a suitable ligand source, such as a tetraalkylthiuram disulfide. Other oil-soluble or dispersible tri-nuclear molybdenum compounds can be formed during a reaction in the appropriate solvent(s) of a molybdenum source such as of $(NH_4)_2Mo_3S_{13} \cdot n(H_2O)$, a ligand source, such as tetraalkylthiuram disulfide, a dialkyldithiocarbamate, or a dialkyldithiophosphate, and a sulfur abstracting agent, such as cyanide ions, sulfite ions, or substituted phosphines. Alternatively, a tri-nuclear molybdenum-sulfur halide salt such as $[M']_2[MO_3S_7A_6]$, where M' is a counter ion and A is a halogen such as Cl, Br, or I, may be reacted with a ligand source such as a dialkyldithiocarbamate or a dialkyldithiophosphate in an appropriate liquid/solvent (system) to form an oil-soluble or oil-dispersible trinuclear molybdenum compound. The appropriate liquid/solvent (system) may be, for example, aqueous or organic.

Other molybdenum precursors may include acidic molybdenum compounds. Such compounds may react with a basic nitrogen compound, as measured by ASTM D-664 or D-2896 titration procedure, and may typically be hexavalent. Examples may include, but are not necessarily limited to, molybdic acid, ammonium molybdate, sodium molybdate, potassium molybdate, and other alkaline metal molybdates and other molybdenum salts, e.g., hydrogen sodium molybdate, $MoOCl_4$, $MoO_2Br_2$, $Mo_2O_3Cl_6$, molybdenum trioxide, or similar acidic molybdenum compounds, or combinations thereof. Thus, additionally or alternatively, the compositions of the present disclosure can be provided with molybdenum by molybdenum/sulfur complexes of basic nitrogen compounds as described, for example, in U.S. Pat. Nos. 4,263,152, 4,285,822, 4,283,295, 4,272,387, 4,265,773, 4,261,843, 4,259,195, and 4,259,194, and/or in PCT Publication No. WO 94/06897.

Other additives known in the art may optionally be added to the lubricant compositions, such as defoaming agents, seal-swelling control agents, extreme pressure additives, pour point depressants, other viscosity modifiers, optionally dyes and dye stabilizers, and the like. They are typically disclosed in, for example, "Lubricant Additives" by C. V. Smallheer and R. Kennedy Smith, 1967, pp 1-11.

ADDITIONAL EMBODIMENTS

Additionally or alternatively, the present disclosure may include one or more of the following embodiments.

Embodiment 1. A brush copolymer composition comprising a copolymeric backbone and copolymeric brush arms, wherein:

the copolymeric brush arms comprise monomeric repeat units of at least two different acylated poly(alkylene amine)s of formulae (1) and (2):

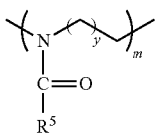

(1)

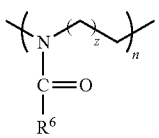

(2)

wherein each R⁵ is individually hydrogen or a linear or branched $C_1$-$C_{24}$ alkyl moiety; each R⁶, being different from each R⁵ although having the same or a greater number of carbons than each R⁵, is individually a linear or branched $C_8$-$C_{24}$ alkyl moiety; y and z are each 1 or 2; and a sum of m+n is from 90 mol % to 100 mol % of an average degree of polymerization of the copolymeric brush arms; and the copolymeric backbone comprises monomeric repeat units of at least two different acrylate monomers of formulae (3) and (4):

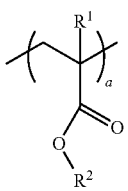

(3)

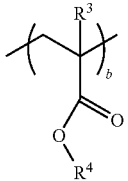

(4)

wherein each R¹ and R³ are individually hydrogen, a linear or branched $C_1$-$C_4$ alkyl moiety, or a mixture thereof, each R² is individually a covalently-linked copolymeric brush arm, a residual hydrogen, a residual trisubstituted silyl group in which the substitutions are each individually a linear, branched, and/or cyclic $C_1$-$C_8$ alkyl, aryl, alkaryl, or aralkyl moiety, a residual linear, cyclic, or branched $C_1$-$C_7$ acyl moiety, a residual linear or branched $C_1$-$C_4$ hydroxyalkyl moiety, or a residual monovalent counterion; each R⁴ is individually a linear, branched, and/or cyclic $C_8$-$C_{30}$ alkyl, aryl, alkaryl, or aralkyl moiety; and a sum of a+b is from 90 mol % to 100 mol % of an average degree of polymerization of the copolymeric backbone.

Embodiment 2. The brush copolymer composition of embodiment 1, wherein the brush copolymer composition exhibits upper critical solution temperature (UCST) behavior at a concentration of ~5 mg/mL in a Group III basestock having a kinematic viscosity at ~100° C. (KV100) of ~4 cSt.

Embodiment 3. The brush copolymer composition of embodiment 2, wherein the UCST behavior is manifest as a primary exothermic transition in a differential scanning calorimeter (DSC) having a peak centered below ~80.0° C. at a cooling rate of ~1° C./min during a second or third cooling portion of an iterative heating and cooling cycle.

Embodiment 4. The brush copolymer composition of embodiment 1, wherein the copolymeric brush arms exhibit upper critical solution temperature (UCST) behavior at a concentration of ~5 mg/mL in a Group III basestock having a kinematic viscosity at ~100° C. (KV100) of ~4 cSt.

Embodiment 5. The brush copolymer composition of embodiment 4, wherein the UCST behavior is manifest as a primary exothermic transition in a differential scanning calorimeter (DSC) having a peak centered below ~80.0° C. at a cooling rate of ~1° C./min during a second or third cooling portion of an iterative heating and cooling cycle.

Embodiment 6. The brush copolymer composition of embodiment 1, wherein a polydispersity of the brush copolymer composition, as measured using gel permeation chromatography (GPC) with tetrahydrofuran (THF) containing ~2% triethylamine (TEA) as an eluent at ~40° C. against poly(methyl methacrylate) (PMMA) standards, is less than 1.60.

Embodiment 7. The brush copolymer composition of embodiment 1, wherein a polydispersity of the copolymeric backbone, the copolymeric brush arms, or both, as measured using gel permeation chromatography (GPC) with tetrahydrofuran (THF) containing ~2% triethylamine (TEA) as an eluent at ~40° C. against poly(methyl methacrylate) (PMMA) standards, is(are) less than 1.60.

Embodiment 8. The brush copolymer composition of embodiment 1, wherein a number average molecular weight of the brush copolymer composition, as measured using gel permeation chromatography (GPC) with tetrahydrofuran (THF) containing ~2% TEA as an eluent at ~40° C. against poly(methyl methacrylate) (PMMA) standards, is from 30,000 g/mol to 100,000 g/mol.

Embodiment 9. The brush copolymer composition of embodiment 1, wherein:
each R⁵ is individually a linear or branched $C_2$-$C_{18}$ alkyl or alkenyl moiety;
each R⁶ is individually a linear $C_8$-$C_{20}$ alkyl moiety;
each R¹ and R³ are individually hydrogen or methyl;
each R² is individually a covalently-linked copolymeric brush arm, a residual hydrogen, or a residual linear or branched $C_1$-$C_4$ hydroxyalkyl moiety;
each R⁴ is individually a linear or branched $C_8$-$C_{24}$ alkyl moiety; and
y and z are each 1.

Embodiment 10. The brush copolymer composition of embodiment 1, wherein at least 50 mol % of the R² groups are covalently-linked copolymeric brush arms.

Embodiment 11. The brush copolymer composition of embodiment 1, wherein one or more of the following is satisfied:
a ratio of a:b is from 1:14 to 1:2;
a ratio of m:n is from 1:25 to 2:1;
the sum of a+b is 250 or less; and
the sum of m+n is 75 or less.

Embodiment 12. A brush copolymer composition comprising a copolymeric backbone and copolymeric brush arms, wherein:
the copolymeric brush arms exhibit upper critical solution temperature (UCST) behavior at a concentration of ~5 mg/mL in a Group III basestock having a kinematic viscosity at ~100° C. (KV100) of ~4 cSt and comprise monomeric repeat units of at least two different acylated poly(alkylene amine)s of formulae (1) and (2):

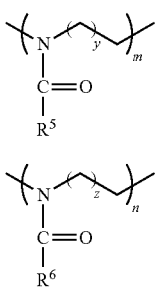

(1)

(2)

wherein each $R^5$ is individually hydrogen or a linear or branched $C_1$-$C_{24}$ alkyl moiety;
each $R^6$, being different from each $R^5$ although having the same or a greater number of carbons than each $R^5$, is individually a linear or branched $C_8$-$C_{24}$ alkyl moiety; and y and z are each 1 or 2; and
the copolymeric backbone comprises monomeric repeat units of at least two different acrylate monomers of formulae (3) and (4):

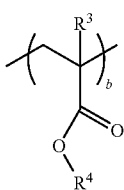

(3)

(4)

wherein each $R^1$ and $R^3$ are individually hydrogen, a linear or branched $C_1$-$C_4$ alkyl moiety, or a mixture thereof, each $R^2$ is individually a covalently-linked copolymeric brush arm, a residual hydrogen, a residual trisubstituted silyl group in which the substitutions are each individually a linear, branched, and/or cyclic $C_1$-$C_8$ alkyl, aryl, alkaryl, or aralkyl moiety, a residual linear, cyclic, or branched $C_1$-$C_7$ acyl moiety, a residual linear or branched $C_1$-$C_4$ hydroxyalkyl moiety, or a residual monovalent counterion; and each $R^4$ is individually a linear or branched $C_8$-$C_{30}$ alkyl, aryl, alkaryl, or aralkyl moiety,
wherein the brush copolymer composition also exhibits upper critical solution temperature (UCST) behavior at a concentration of ~5 mg/mL in a Group III basestock having a kinematic viscosity at ~−100° C. (KV100) of ~4 cSt.

Embodiment 13. The brush copolymer composition of embodiment 12, wherein the UCST behavior of either or both of the copolymeric brush arms and the brush copolymer composition is manifest as a primary exothermic transition in a differential scanning calorimeter (DSC) having a peak centered below ~80.0° C. at a cooling rate of ~1° C./min during a second or third cooling portion of an iterative heating and cooling cycle.

Embodiment 14. The brush copolymer composition of embodiment 12, wherein five or more of the following are satisfied:
a number average molecular weight of the brush copolymer composition, as measured using gel permeation chromatography (GPC) with tetrahydrofuran (THF) containing ~2% TEA as an eluent at ~40° C. against poly(methyl methacrylate) (PMMA) standards, is from 30,000 g/mol to 100,000 g/mol;
each $R^5$ is individually a linear or branched $C_2$-$C_{18}$ alkyl moiety; each $R^6$ is individually a linear $C_8$-$C_{20}$ alkyl moiety; each $R^1$ and $R^3$ are individually hydrogen or methyl; each $R^4$ is individually a linear or branched $C_8$-$C_{24}$ alkyl moiety; and y and z are each 1;
each $R^2$ is individually a covalently-linked copolymeric brush arm, a residual hydrogen, or a residual linear or branched $C_1$-$C_4$ hydroxyalkyl moiety, and at least 70 mol % of the $R^2$ groups are covalently-linked copolymeric brush arms;
a sum of m+n is from 90 mol % to 100 mol % of an average degree of polymerization of the copolymeric brush arms;
a ratio of m:n is from 1:25 to 2:1;
a sum of a+b is from 90 mol % to 100 mol % of an average degree of polymerization of the copolymeric backbone;
a ratio of a:b is from 1:14 to 1:2;
the sum of a+b is 250 or less; and
the sum of m+n is 75 or less.

Embodiment 15. A method of making a brush copolymer composition comprising a copolymeric backbone and copolymeric brush arms, the method comprising:
providing a copolymeric backbone comprising monomeric repeat units of at least two different acrylate monomers of formulae (3) and (4):

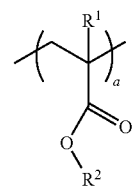

(3)

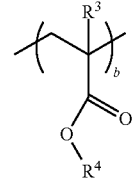

(4)

wherein each $R^1$ and $R^3$ are individually hydrogen, a linear or branched $C_1$-$C_4$ alkyl moiety, or a mixture thereof, each $R^2$ is individually a hydrogen, a trisubstituted silyl group in which the substitutions are each individually a linear, branched, and/or cyclic $C_1$-$C_8$ alkyl, aryl, alkaryl, or aralkyl moiety, a linear, cyclic, or branched $C_1$-$C_7$ acyl moiety, a linear or branched $C_1$-$C_4$ hydroxyalkyl moiety, or a monovalent counterion; and each $R^4$ is individually a linear or branched $C_8$-$C_{30}$ alkyl, aryl, alkaryl, or aralkyl moiety;
providing copolymeric brush arms comprising monomeric repeat units of at least two different acylated poly(alkylene amine)s of formulae (1) and (2):

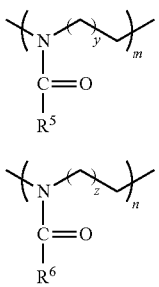

wherein each $R^5$ is individually hydrogen or a linear or branched $C_1$-$C_{24}$ alkyl moiety; each $R^6$, being different from each $R^5$ although having the same or a greater number of carbons than each $R^5$, is individually a linear or branched $C_8$-$C_{24}$ alkyl moiety; and y and z are each 1 or 2;

wherein the copolymeric brush arms are made via a cationic ring-opening polymerization (CROP) process using heterocyclic monomers containing a nitrogen and an oxygen atom, in which the additive chain end is terminated in a stabilized heterocyclic cation; and grafting the copolymeric brush arms onto the copolymeric backbone by:
  activating the acrylate monomeric repeat units of formula (3) in the copolymeric backbone by removing $R^2$ and/or forming a carboxylate anion; and
  coupling the stabilized heterocyclic cation in the copolymeric brush arms to the activated repeat units of formula (3), thereby effectively grafting the copolymer brush arms onto the copolymeric backbone and thereby forming the brush copolymer composition.

Embodiment 16. The method of embodiment 15, wherein the copolymeric backbone is made via a reversible deactivation radical polymerization (RDRP) process.

Embodiment 17. The method of embodiment 15, wherein a polydispersity of the brush copolymer composition, as measured using gel permeation chromatography (GPC) with tetrahydrofuran (THF) containing ~2% TEA as an eluent at ~40° C. against poly(methyl methacrylate) (PMMA) standards, is less than 1.60.

Embodiment 18. The method of embodiment 15, wherein a polydispersity of the copolymeric backbone, the copolymeric brush arms, or both, as measured using gel permeation chromatography (GPC) with tetrahydrofuran (THF) containing ~2% TEA as an eluent at ~40° C. against poly(methyl methacrylate) (PMMA) standards, is(are) less than 1.60.

Embodiment 19. The method of embodiment 15, wherein a number average molecular weight of the brush copolymer composition, as measured using gel permeation chromatography (GPC) with tetrahydrofuran (THF) containing 2% TEA as an eluent at ~40° C. against poly(methyl methacrylate) (PMMA) standards, is from 30,000 g/mol to 100,000 g/mol.

Embodiment 20. The method of embodiment 15, wherein:
  each $R^5$ is individually a linear or branched $C_2$-$C_{18}$ alkyl moiety;
  each $R^6$ is individually a linear $C_8$-$C_{20}$ alkyl moiety;
  each $R^1$ and $R^3$ are individually hydrogen or methyl;
  each $R^2$ is individually a covalently-linked copolymeric brush arm, a residual hydrogen, or a residual linear or branched $C_1$-$C_4$ hydroxyalkyl moiety;
  each $R^4$ is individually a linear or branched $C_8$-$C_{24}$ alkyl moiety; and
  y and z are each 1.

Embodiment 21. The method of embodiment 15, wherein the grafting steps are controlled so that at least 60 mol % of the $R^2$ groups are covalently-linked copolymeric brush arms.

Embodiment 22. The method of embodiment 15, wherein one or more of the following is satisfied:
  a sum of m+n is from 90 mol % to 100 mol % of an average degree of polymerization of the copolymeric brush arms;
  a ratio of m:n is from 1:25 to 2:1;
  a sum of a+b is from 90 mol % to 100 mol % of an average degree of polymerization of the copolymeric backbone;
  a ratio of a:b is from 1:14 to 1:2;
  the sum of a+b is 250 or less; and
  the sum of m+n is 75 or less.

Embodiment 23. A lubricant composition comprising:
  at least 70 wt % of one or more lubricating oil basestocks;
  up to 25 wt % of at least one lubricant additive comprising an antioxidant, a corrosion inhibitor, an anti-wear additive, a friction modifier, a dispersant, a detergent, a defoaming agent, an extreme pressure additive, a pour point depressant, a seal-swelling control agent, or a combination thereof; and
  from 0.5 wt % to 12 wt % of a brush copolymer composition according to embodiment 1.

Embodiment 24. A lubricant composition comprising:
  at least 70 wt % of one or more lubricating oil basestocks;
  up to 25 wt % of at least one lubricant additive comprising an antioxidant, a corrosion inhibitor, an anti-wear additive, a friction modifier, a dispersant, a detergent, a defoaming agent, an extreme pressure additive, a pour point depressant, a seal-swelling control agent, or a combination thereof; and
  from 0.5 wt % to 12 wt % of a brush copolymer composition according to embodiment 12.

Embodiment 25. A lubricant composition comprising:
  at least 70 wt % of one or more lubricating oil basestocks;
  up to 25 wt % of at least one lubricant additive comprising an antioxidant, a corrosion inhibitor, an anti-wear additive, a friction modifier, a dispersant, a detergent, a defoaming agent, an extreme pressure additive, a pour point depressant, a seal-swelling control agent, or a combination thereof; and
  from 0.5 wt % to 12 wt % of a brush copolymer composition made according to the method of embodiment 15 and which brush copolymer composition exhibits upper critical solution temperature (UCST) behavior at a concentration of ~5 mg/mL in a Group III basestock having a kinematic viscosity at ~100° C. (KV100) of ~4 cSt.

Embodiment 26. The lubricant composition of embodiment 25, wherein the UCST behavior of the brush copolymer composition is manifest as a primary exothermic transition in a differential scanning calorimeter (DSC) having a peak centered below ~85.0° C. at a cooling rate of ~1° C./min during a second or third cooling portion of an iterative heating and cooling cycle.

The invention will now be described by way of non-limiting example only.

Examples

The invention will be illustrated in detail hereinafter with reference to examples, without any intention that this should impose a restriction.

Materials 2-ethyl-2-oxazoline (EtOx, 99+%, commercially available from Acros Organics of Geel, Belgium) was dried over calcium hydride and distilled under nitrogen prior to use. Methyl tosylate (MeTos, 98%, commercially available from Aldrich of St. Louis, MO, USA) was distilled under reduced pressure and stored under nitrogen. Triethylamine (TEA, ≥99%, commercially available from Sigma Aldrich) was distilled and stored under nitrogen. The used extra dry solvents dichloromethane (99.8%) and chlorobenzene (99.8%), commercially available from Acros Organics, were stored over molecular sieves and under inert atmosphere. Titanium (IV) n-butoxide (99%), ethanolamine, and 3-amino-1-propanol (99%), commercially available from Acros Organics, were used as received. The initiator V-601, commercially available from Fujifilm Wako Chemicals Corporation of, was used as received. The monomers methacrylic acid (MAA, 99%, commercially available from Aldrich) and 2-ethylhexyl methacrylate (EHMA, 99%, commercially available from Acros Organics), and the transfer agent 2-cyano-2-propyl benzodithioate (CPBD, >97%, commercially available from Aldrich) were used as received. Sodium methoxide (NaOMe, 95%) and stearic acid (95%), commercially available from Sigma-Aldrich, were used as received. Dimethylformamide (DMF, ≥99%) is commercially available from Fisher Chemical of Pittsburgh, PA, USA.

Other acrylate monomers and macromonomers can either be commercially obtained or synthesized in whole or in part, e.g., 2-heptadecyl-2-oxazoline (stearyl oxazoline or SteOx) can be purchased commercially or made according to the following recipe.

Monomer Synthesis—Example 1

Stearic acid (~1.00 eq) was dissolved in MeOH (~30 eq) in a 500 mL round bottom flask equipped with a magnetic stirring bar. Sulfuric acid (~0.007 eq) was then added, and the reaction mixture was stirred at ~85° C. under reflux overnight (~8-18 hours). The temperature was then decreased, and the reflux was kept on until room temperature (~20-25° C.) was reached. $NaHCO_3$ was added slowly, until no release of gas was observed. The solvent was removed in vacuo, and the resulting methyl stearate was used as obtained. Subsequently, ethanolamine (~4 eq), and sodium methoxide (~3 mol %) were added to the round bottom flask, which was then placed in an oil bath and heated up to ~120° C. overnight. After completion of the amination, the reaction mixture was cooled down to ~90° C. and distilled under reduced pressure from ~90-160° C. When ~160° C. was reached, the solution was kept at this temperature for ~15 minutes before adding the titanium (IV) n-butoxide (~0.14 eq). The reaction mixture was then stirred at ~160° C. overnight under reduced pressure. The resulting 2-oxazoline was obtained from distillation under reduced pressure of the crude mixture at temperatures higher than ~250° C. A light yellow solid was obtained in ~50-65% yield. Exemplary data: $^1$H NMR (~300 MHz, $CDCl_3$), δ (ppm): ~0.74-0.85 (m, 3H, $CH_2CH_3$), ~1.11-1.31 (m, 28H, $CH_2$ alkyl chain), ~1.48-1.60 (m, 2H, $CCH_2CH_2$), ~2.19 (t, 2H, $CCH_2CH_2$), ~3.75 (t, 2H, $CH_2CH_2O$), ~4.14 (t, 2H, $NCH_2CH_2$).

Characterization

Proton nuclear magnetic resonance ($^1$H NMR) spectra were recorded on Bruker Avance III HD 300 MHz and HD 400 MHz instruments. Deuterated chloroform ($CDCl_3$) was used as solvent, and the signal of the residual protonated chloroform ($CHCl_3$) at ~7.26 ppm served as reference for the chemical shift, δ. Data analysis was performed using TopSpin 3.2 software.

Gel permeation chromatography (GPC) measurements were performed using two different eluents depending on the solubility of the samples.

(i) Tetrahydrofuran (TIF) with ~2% (v/v) TEA (trimethylamine). The Agilent Technologies 1260 Infinity™ instrument was equipped with refractive index (RI) and ~308 nm UV detectors, a PLgel™-5 m guard column, and a PLgel™-5 m mixed D column (~300×~7.5 mm). Unless otherwise specified, samples were run at ~1 mL/min at ~40° C. Poly(methyl methacrylate) standards (Agilent PMMA calibration kits, M-M-10 and M-L-10) were used for the calibration. Before injection (~100 μL), the samples were filtered through a PTFE membrane with ~0.2 μL pore size.

(ii) Chloroform ($CHCl_3$) with ~2% (v/v) TEA. The Agilent Infinity II™ MDS instrument was equipped with differential refractive index (DRI), viscometry (VS), dual angle light scatter (LS), and multiple wavelength UV detectors. The system was equipped with 2× PLgel™ Mixed C columns (~300×~7.5 mm) and a PLgel™ ~5 μm guard column. Samples were run at ~1 mL/min at ~30° C. Poly(methyl methacrylate), and polystyrene standards (Agilent EasiVials™) were used for the calibration. Ethanol was added as a flow rate marker. The samples were filtered through a GVHP membrane with ~0.22 m pore size before injection (~100 μL). In both cases, experimental molar mass, number average molecular weight (Mn), weight average molecular weight (Mw), and polydispersity (Mw/Mn) were determined by conventional calibration using Agilent GPC/SEC software (plots were made using OriginPro™ 2019b Academic software).

Turbidity analyses for the determination of the transition temperature of each sample were performed using an Agilent Technologies Cary 100 UV-Vis spectrophotometer equipped with an Agilent Technologies Cary temperature controller and an Agilent Technologies 6×6 multicell block peltier. The measurements were performed using Suprasil® quartz cuvettes (100-QS, light path≈10 mm, commercially available from Hellma of Jena, Germany) filled with ~5 mg/mL solutions of each polymer in YuBase™ 4 diluent/basestock (commercially available from SK of South Korea). For each sample, two heating/cooling cycles between ~15° C. and ~85° C. were performed with a temperature gradient of ~1° C./min at λ≈600 nm. All data were recorded using Cary WinUV™ software and elaborated using OriginPro™ 2019b (Academic) software. Transition temperatures reported are those measured/calculated at ~50% transmission for the second heating and/or second cooling cycle (the first heating cycle is designed to remove any thermal history that may tend to skew results).

Thermogravimetric analysis (TGA) analyses were performed on a Mettler-Toledo instrument equipped with an autosampler under an air flow of ~50 m/min from ~25° C. to ~550° C. with a heating rate of ~1° C./min. The samples (~5-20 mg each) were pre-pared using aluminium pans. The data were analyzed using Mettler-Toledo STAR™ software (plots were made using OriginPro™ 2019b Academic software).

Differential scanning calorimetry (DSC) analyses were used to determine thermal transitions on a Mettler-Toledo DSC1™ equipped with an autosampler under nitrogen atmosphere with a flow of ~50 m/min from ~−80° C. to ~150° C. A heating/cooling rate of ~60° C./min was used for the first cycle (not utilized for the subsequent calculations), and of ~1° C./min for the further two heating-cooling cycles. The samples (~5-20 mg each) were prepared using aluminum pans. The data were analyzed using Mettler-Toledo STAR$^e$™ software (plots were made using OriginPro™ 2019b Academic software). Thermal transition temperatures reported are those corresponding to a peak maximum or minimum (e.g., crystallization, depending upon the tabulation of the exotherm), as applicable. As with the turbidity measurements, transition temperatures reported are those for the third (and/or second) heating and/or third (and/or second) cooling cycle (the first heating cycle is designed to remove any thermal history that may tend to skew results).

Brush Arm Copolymer Synthesis—Examples 2-7 and Comparative Examples A-B

In the brush arm copolymers of Examples 2-7, all copolymers utilized the same initiator (methyl tosylate, or MeTos) and monomers, 2-ethyl-2-oxazoline (EtOx) and/or 2-heptadecyl-2-oxazoline (SteOx), and were synthesized under similar monomer-to-initiator ratios and other reaction conditions, with the only difference in reaction conditions being the different ratios between the comonomers themselves. In these Examples, the desired amounts of SteOx and EtOx were transferred into a microwave vial equipped with a magnetic stirring bar, which was then sealed and immersed in an oil bath at ~130° C. The reaction mixture was bubbled with a nitrogen flow for ~30 minutes before adding the MeTos stock initiator solution (~49 mg/mL in dry chlorobenzene).

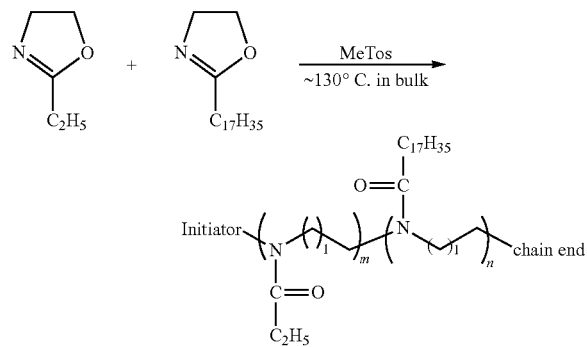

Despite the short-hand graphic representation in the equation above, all EtOx-SteOx copolymers of Examples 2-7 are believed not to be block copolymers or "blocky" in nature—they are believed to be substantially random copolymers, or close to it. This conclusion is supported by the experimental findings of R. Hoogenboom et al., "High-Throughput Synthesis and Screening of a Library of Random and Gradient Copoly(2-oxazoline)s," *Journal of Combinatorial Chemistry*, 8(2), 145-48, in which shorter and longer alkyl chain oxazoline monomers were found to have relatively similar reactivity ratios.

Regarding the equation above, the molar ratio of total monomers to initiator in the reaction mixtures were each ~50:1. Subsequently, each reaction mixture was reacted for the required amount of time under Cationic Ring Opening (co)Polymerization (CROP) conditions in order to reach substantially full conversion (at least 95%, or preferably at least 99%), depending on the final copolymer composition. With MeTos as the intiator, the "initiator" end is believed to constitute a methyl group, and the active chain end is believed to constitute an oxazolinium species of one of the comonomers (balanced with a counteranion, such as a hydroxyl) or simply the covalently-bonded oxazolinium counteranion itself (e.g., a hydroxyl group). Exemplary data: $^1$H NMR (~300 MHz, CDCl$_3$), δ (ppm): ~0.69-0.91 (m, 6H, CH$_2$CH$_2$CH$_3$, C(=O)OCH$_2$CH$_3$), ~0.91-1.32 (m, 28H, CH$_2$ alkyl chain), ~1.32-1.63 (m, 2H, NC(=O)CH$_2$CH$_2$), ~2.02-2.40 (m, 4H, NC(=O)CH$_2$CH$_2$, NC(=O)CH$_2$CH$_3$), ~3.14-3.58 (m, 8H, CH$_2$ backbone).

In Comparative Examples A and B, homopolymers of ~100% EtOx and ~100% SteOx, respectively, were synthesized under similar conditions as the copolymers.

TABLE 1

| Sample | SteOx:EtOx:Init | Rxn time [min] | Conv [%] | Mn$^{th}$ [g/mol] | Mn$^{ms}$ [g/mol] | PDI |
|---|---|---|---|---|---|---|
| Comp. A | ~0:50:1 | ~60 | ≥99 | 5000 | ~3300 | ~1.22 |
| Ex. 2 | ~25:25:1 | ~100 | ≥99 | 10000 | ~5500 | ~1.21 |
| Ex. 3 | ~30:20:1 | ~120 | ≥99 | 11000 | ~7500 | ~1.26 |
| Ex. 4 | ~35:15:1 | ~60 | ≥99 | 12000 | ~9500 | ~1.20 |
| Ex. 5 | ~40:10:1 | ~80 | ≥99 | 13000 | ~10000 | ~1.25 |
| Ex. 6 | ~45:5:1 | ~90 | ≥99 | 14000 | ~10800 | ~1.22 |
| Ex. 7 | ~48:2:1 | ~95 | ≥99 | 15000 | ~11000 | ~1.27 |
| Comp. B | ~50:0:1 | ~90 | ≥99 | 15500 | ~10900* | ~1.21* |

In Table 1, the ratio of the SteOx and EtOx monomers was varied, while the total monomer concentration to initiator (MeTos) concentration ratio was kept constant at ~50:1. A >99% monomer conversion was obtained for all Examples and Comparative Examples, as determined by $^1$H NMR spectra (not shown). The CROP reactions resulted in well-defined polymer products characterized by relatively low polydispersities (PDI). For copolymers of Examples 2-7 and EtOx homopolymer of Comparative Example A, Mn$^{ms}$ and polydispersity index (PDI, or Mw/Mn as measured) were obtained via GPC using THF (w/2% TEA) as eluent against PMMA standards. As indicated by the asterisks in Table 1, in the case of SteOx homopolymer of Comparative Example B, due to its lack of solubility in THF, CHCl$_3$ (again w/2% v/v TEA) was used as eluent with PMMA standards. As can be observed from the data reported in Table 1, the measured/experimental Mn (Mn$^{ms}$) values are lower than the theoretical Mn (Mn$^{th}$) values for all Examples and Comparative Examples regardless of the eluent used. This difference was expected, inter alia, because the PMMA standards used for the GPC calibration are believed to exhibit a differential hydrodynamic volume change, relative to the (co)polymers, between eluents. Nevertheless, the conversion results (obtained from $^1$H NMR spectra) and the uniformly narrow polydispersity values indicate good polymerization control of the CROP reaction under the reaction conditions.

The thermal properties of Examples 2-7 and Comparative Examples A-B were evaluated via thermogravimetric analysis (TGA) and differential scanning calorimetry (DSC) measurements. All polymers from these Examples and Comparative Examples showed a thermal stability up to ~300° C. For the DSC measurements, a first fast heating/cooling cycle from ~-80° C. to ~150° C. at ~60° C./min was used to remove the thermal history of the samples, then two further cycles at ~1° C./min were performed. FIG. 1 shows the traces of the third cooling cycle of each homo- and co-polymer, for example. As can be observed, each of Examples 2-7 and Comparative Example B appeared to exhibit a primary exothermic peak (presumed to indicate crystallization, or some alpha transition) within the range of temperatures measured, while Comparative Example A appeared to show no thermal transitions within the range of temperatures measured, as expected. Because the exotherms appears as peaks, indicating alpha transitions, they are postulated to imply crystallization upon cooling (and correspondingly dissolution upon heating), which indicates Upper Critical Solution Temperature (UCST) behavior over the measured temperature range. The lack of thermal (alpha) transition behavior of Comparative Example A indicates no substantial change in order, in this case indicating relatively uniform solubility over the measured temperature range (although relatively uniform insolubility could alternatively be inferred from merely the DSC data, that is not the case for EtOx homopolymers).

Examples 2 and 7 appeared to exhibit a higher thermal transition temperature, closer to that of the SteOx homopolymer (Comparative Example B), compared to the other copolymers. Without being bound by theory, this can be explained with an increase in the overall order of the two systems. On the one hand, Example 7 contained the lowest amount of EtOx, resulting in a copolymer mainly composed of SteOx. Consequently, the (randomly) interposed EtOx units appear not to be enough to disrupt the order (crystallinity) of the longer alkyl side chains of the SteOx units, which can easily align into ordered structures, thereby leading to a transition temperature closer to Comparative Example B. On the other hand, Example 2 contained the highest amount of EtOx (relative to the other copolymer brush Examples); however, the two monomers were copolymerized in roughly equal molar amounts. Again, without being bound by theory, since the comonomers are believed to have a similar reactivity, it is postulated that they could be close to alternated in the resulting copolymer, which could yield an overall more ordered system compared to the other copolymers. As a consequence, the polymer chains could more easily pack and form ordered structures, which would result in a relatively high exotherm temperature. Examples 3-4 appear to exhibit a similar thermal transition temperature, lower than that of the SteOx homopolymer of Comparative Example B. Without being bound by theory, the uneven distribution of the two comonomers along the polymer may complicate the packing dynamics between polymer chains, resulting in less ordered regions. This aspect is even more accentuated in the case of Example 5, which shows the lowest thermal transition temperature of the bunch. However, going once again towards a more ordered system by increasing the amount of SteOx and, thus, decreasing the EtOx content appears to result in an increase in the thermal transition temperature, as seen in the case of Example 6.

The solubility behavior of Examples 2-7 and Comparative Example B in diluent oil/basestock were evaluated via turbidity measurements. The (co)polymers were each mixed with (dissolved in) Yubase™ 4 (~5 mg polymer/mL diluent) and then subjected to two heating/cooling cycles from ~15° C. to ~85° C., with turbidity being measured at a wavelength of ~600 nm. FIG. 2, for example, shows the measured curves of the second heating cycle for each sample. All copolymers of Examples 2-7 and Comparative Example B appeared to show UCST-type behavior (at higher temperatures, the samples appear soluble in the diluent oil, resulting in largely transparent solutions with a transmittance at or near 100%).

However, when the temperature was decreased, the transmittance dropped and the polymer mixtures (solutions) become heterogeneous. Without being bound by theory, the heterogeneity was believed to be due to the formation of aggregates likely resulting from crystallization of the long alkyl chains of the SteOx repeat units. Nevertheless, it is notable that, for all samples, the transmittance at the lowest temperatures does not go down to 0%, which is believed to imply that the (co)polymers were still slightly soluble in the oil, even at lower temperatures (e.g., ~15° C.). As in the case of DSC analyses, the sample mixtures/solutions having an overall more ordered structure (Examples 2, 6, and 7) appeared to exhibit relatively higher transition temperatures, since a higher temperature would theoretically be required to break crystallinity of (co)polymer side chains compared to other less ordered associations. By increasing the disorder in the (co)polymer composition, and thus the level of order in the copolymers, the turbidity transition temperature (approximated as the temperature at ~50% transmission) trends to decrease with increasing SteOx content to about 90% SteOx/10% EtOx. The turbidity curve of the copolymer of Example 5 appeared to show a complex turbidity (perhaps two transition temperatures). Without being bound by theory, the initial part of this effect may be caused by dynamic decrystallization of the SteOx portions of the polymer chains, resulting in a first relatively sharp phase transition. However, with additional increase in temperature, the polymer chains may further thermally expand, inducing solubilization of smaller ordered or less crystalline structures, which evince a second relatively broader transition. For Examples 2-7 and Comparative Example B, Table 2 below reports the turbidity transition temperatures measured during the second heating ($T^{UV}_{turb,\,heat}$) and second cooling ($T^{UV}_{turb,\,cool}$) cycles (calculated at ~50% transmittance), as well as the thermal transition temperatures ($T^{DSC}_{th,\,cool}$) measured during the third cooling stage in DSC analyses. As can be observed, the data are in relatively good agreement, implicating a correlation between the alpha transition (peak exotherm) temperatures in each (co)polymer and the temperatures at which phase transitions occur (onset of UCST behavior) in Yubase™ 4.

TABLE 2

| Sample | SteOx:EtOx | Turbid trans(heat) [° C.] | Turbid trans(cool) [° C.] | DSC trans(cool) [° C.] |
| --- | --- | --- | --- | --- |
| Ex. 2 | ~25:25 | ~80.4 | ~55.7 | ~72.5 |
| Ex. 3 | ~30:20 | ~52.1 | ~35.4 | ~41.8 |
| Ex. 4 | ~35:15 | ~52.5 | ~35.2 | ~42.3 |
| Ex. 5 | ~40:10 | ~50.3 | ~36.7 | ~31.9 |
| Ex. 6 | ~45:5: | ~49 | ~30.5 | ~38.4 |
| Ex. 7 | ~48:2 | >85.0 | ~76.6 | ~75.3 |
| Comp. B | ~50:0 | >90 | >85.0 | ~85.9 |

Brush Arm Copolymer Synthesis—Examples 8-16 and Comparative Example C

In the brush arm copolymers of Examples 8-16 and Comparative Example C, various combinations of SteOx, EtOx, 2-(15-methyl)hexadecyl-2-oxazoline (isostearyl oxazoline, or isoSteOx), and 2-heptyl-2-oxazoline (HepOx), as well as isoSteOx alone, were used. The same initiator (MeTos) was used for all (co)polymerizations. In Examples 8-9 and Comparative Example C, the molar ratios of total monomers to initiator were ~25:1, whereas the molar ratios of total monomers to initiator in Examples 10-16 were ~50:1. In each of these Examples, the desired amounts of monomer(s) was (were) transferred into a microwave vial equipped with a magnetic stirring bar, which was then sealed and immersed in an oil bath at ~130° C. The reaction mixture was bubbled with a nitrogen flow for ~30 minutes before adding the initiator solution (~49 mg/mL MeTos in dry chlorobenzene). Each reaction mixture was reacted for the required amount of time (~60 minutes) under Cationic Ring Opening (co)Polymerization (CROP) conditions in order to reach the reported level of monomer conversion, which was measured by $^1$H NMR. Table 3 below shows the results.

TABLE 3

| Sample | Oxazoline type | Oxazoline:Init | Conv [%] | $Mn^{th}$ [g/mol] | $Mn^{ms}$ [g/mol] | PDI |
|---|---|---|---|---|---|---|
| Comp. C | isoSteOx | ~25:1 | ~82 | ~6300 | ~5200 | ~1.19 |
| Ex. 8 | EtOx:isoSteOx | ~12.5:12.5:1 | ~87 | ~4400 | ~5300 | ~1.22 |
| Ex. 9 | isoSteOx:SteOx | ~12.5:12.5:1 | ~95 | ~7600 | ~6300 | ~1.22 |
| Ex. 10 | EtOx:isoSteOx | ~15:35:1 | ~99 | ~12300 | ~8100 | ~1.22 |
| Ex. 11 | EtOx:isoSteOx | ~5:45:1 | ~99 | ~14400 | ~7400 | ~1.25 |
| Ex. 12 | isoSteOx:SteOx | ~15:35:1 | ~99 | ~15500 | ~10300 | ~1.25 |
| Ex. 13 | isoSteOx:SteOx | ~7:43:1 | ~99 | ~15500 | ~9300 | ~1.24 |
| Ex. 14 | HepOx:SteOx | ~20:30:1 | ~99 | ~12700 | ~10700 | ~1.23 |
| Ex. 15 | HepOx:SteOx | ~30:20:1 | ~99 | ~11300 | ~8900 | ~1.20 |
| Ex. 16 | HepOx:SteOx | ~7:43:1 | ~99 | ~14500 | ~12100 | ~1.26 |

The solubility behavior of Examples 8-16 and Comparative Example C in diluent oil/basestock were evaluated via turbidity measurements, as the results of which are shown in Table 4 below. The (co)polymers were each mixed with (dissolved in) Yubase™ 4 (~5 mg polymer/mL diluent) and then subjected to two heating/cooling cycles from ~15° C. to ~85° C., with turbidity being measured at a wavelength of ~600 nm. As with Examples 2-7 and Comparative Example B above, turbidity transition temperatures were approximated as the temperature at ~50% transmission on both heating and cooling cycles. Numbers reported are from the second cycle of each kind. Also, three heating and cooling cycles were conducted in a DSC, and peak exotherm temperatures from the third cooling cycle are reported.

while Example 8 appeared to be insoluble in Yubase™ 4 over that same temperature range. Also, only copolymers of Examples 12-17 appeared to show UCST-type behavior (at higher temperatures, the samples appear soluble in the diluent oil, resulting in largely transparent solutions with a transmittance at or near 100%). However, it should be noted that, although the copolymer of Example 14 appeared to exhibit UCST-type behavior, the copolymer did not solubilize completely in Yubase™ 4 at the higher temperature end of the testing regime (as evidenced by a transmittance level measurably below 100%), which introduces potential error into the measured turbidity transition values (marked with an asterisk in Table 4).

Backbone Copolymer Synthesis—Examples 17-20

Examples 17-20 describe the syntheses of copolymers of differing ratios of methacrylic acid and 2-ethylhexyl methacrylate using a Reversible Addition-Fragmentation chain-Transfer (RAFT) (co)polymerization process, which is a species of Reversible Deactivation Radical (co)Polymerization (RDRP) process. In Example 17, methacrylic acid (~0.66 mL, ~7.8 mmol, MAA) and 2-ethylhexyl methacrylate (~7 mL, ~31.2 mmol, EHMA) were transferred in a round bottom flask equipped with a magnetic stirring bar and dissolved in dimethylformamide (DMF), to achieve a final monomer concentration of ~5 mol/L. A solution of ~22.4 mg of V-601 initiator in DMF, as well as a solution of ~86 mg of 2-cyano-2-propyl benzodithioate transfer agent in DMF, were added to the flask. The molar ratio of [MAA]:[EHMA]:[CTA]:[I] in Example 17 was ~20:80:1:0.25.

TABLE 4

| Sample | Oxazoline type | Oxazoline:Init | Turbid trans (heat) [° C.] | Turbid trans (cool) [° C.] | DSC trans (cool) [° C.] |
|---|---|---|---|---|---|
| Comp. C | isoSteOx | ~25:1 | — (soluble) | — (soluble) | — |
| Ex. 8 | EtOx:isoSteOx | ~12.5:12.5:1 | — (insoluble) | — (insoluble) | — |
| Ex. 9 | isoSteOx:SteOx | ~12.5:12.5:1 | — (soluble) | — (soluble) | — |
| Ex. 10 | EtOx:isoSteOx | ~15:35:1 | — (soluble) | — (soluble) | ~26 |
| Ex. 11 | EtOx:isoSteOx | ~5:45:1 | — (soluble) | — (soluble) | ~12 |
| Ex. 12 | isoSteOx:SteOx | ~15:35:1 | ~70 | ~35 | ~65 |
| Ex. 13 | isoSteOx:SteOx | ~7:43:1 | ~77 | ~62 | ~75 |
| Ex. 14 | HepOx:SteOx | ~20:30:1 | ~85* | ~50* | ~78 |
| Ex. 15 | HepOx:SteOx | ~30:20:1 | ~83 | ~60 | ~65 |
| Ex. 16 | HepOx:SteOx | ~7:43:1 | ~90[1] | ~84[1] | ~83 |

[1] measured over a range from ~15-95° C.

As the data indicates, the (co)polymers of Comparative Example C and Examples 9-11 appeared to be soluble in Yubase™ 4 over the turbidity analysis temperature range, Examples 18-20 utilized the same molar ratios of transfer agent and initiator, but with molar ratios of [MAA]:[EHMA] of ~30:70, ~40:60, and ~50:50, respectively.

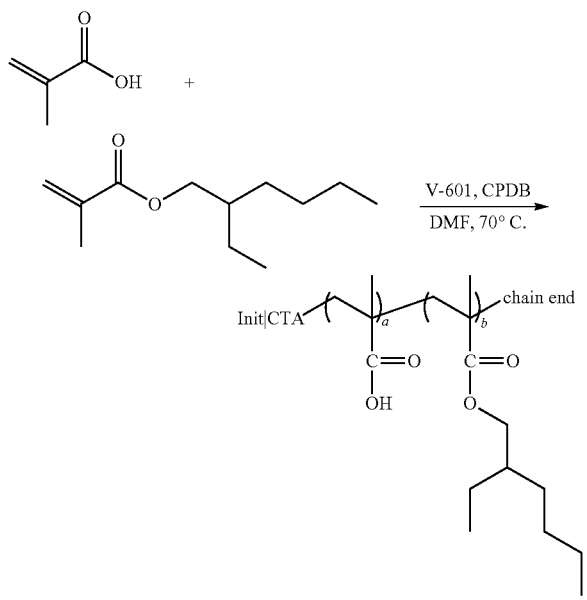

Despite the short-hand graphic representation in the equation above, all MAA-EHMA copolymers of Examples 17-20 are believed not to be block copolymers or "blocky" in nature—they are believed to be substantially random copolymers, or close to it.

Subsequently, each reaction mixture was bubbled with a nitrogen flow for ~30 minutes before the flask was capped with a silicon septum and heated to ~70° C. in an oil bath for ~20 hours. Each copolymer was obtained as a pink powder by precipitation into methanol. With V-601 (bis[2-cyano-2-propanoate methyl ester]-1,2-diazene) as the initiator and 2-cyano-2-propyl benzodithioate, the "initiator/CTA" end is believed to constitute a 2-cyano-2-propyl moiety (same, in this case, whether a residue of the initiator or of the CTA), and the "active" chain end is believed to be reversibly capped with the benzodithioate portion of the CTA. The conversions were determined by $^1$H NMR. Exemplary data: $^1$H NMR (~400 MHz, CDCl$_3$), δ (ppm): ~0.72-1.15 (m, 12H, COOHCCH$_3$, COOCH$_2$CCH$_3$, CHCH$_2$CH$_3$, CH$_2$CH$_2$CH$_3$), ~1.16-1.47 (m, 8H, CHCH$_2$CH$_3$, CHCH$_2$CH$_2$, CH$_2$CH$_2$CH$_3$, CH$_2$CH$_2$CH$_3$), ~1.47-1.64 (m, 1H, CH$_2$CHCH$_2$), ~1.68-2.26 (m, 4H, CH$_2$CCOOH, CH$_2$CCOOCH$_2$), ~3.53-4.15 (m, 2H, OCH$_2$CH).

Of the MAA-EHMA copolymers of Examples 17-20, only the copolymer with a 4:1 molar ratio of EHMA to MAA (Example 17) was found to have desirable solubility in dichloromethane (DCM). As the subsequent reaction to graft brush arm copolymers onto the copolymeric polyacrylate backbone was to be conducted using DCM as a diluent/solvent, only comonomer systems having at least a ~3:1 (~75/25 or higher) molar ratio of acrylate monomers of formulae (4) to (3), respectively, were chosen to progress further. The MAA-EHMA copolymer of Example 17 was analyzed by GPC, and, as with most of the other Examples and Comparative Examples, $Mn^{ms}$ and polydispersity index (PDI, or Mw/Mn as measured) were obtained using THF (w/2% v/v TEA) at ~40° C. as eluent against PMMA standards. On that basis, Example 17 yielded an $Mn^{ms}$ of 17500 g/mol and a PDI of 1.18. The $Mn^{th}$ of Example 17 was calculated at approximately 17800 g/mol, and the conversion for Example 17, as determined by $^1$H NMR, was >95%.

Brush Copolymer Grafting Reaction—Examples 21-34 and Comparative Example D

Brush copolymers according to Examples 21-34 and Comparative Example D were done in three steps: (1) CROP of 2-oxazoline monomer(s) to form brush (co)polymer arms (polyOx); (2) RAFT of (meth)acrylate monomers to form the copolymeric backbone (poly(xMA)); and (3) a grafting-onto reaction of the brush (co)polymer arms with pendant functional groups of (meth)acrylate monomers on the copolymeric backbone to form the various brush copolymer compositions. Since steps (1) and (2) are done separately from, and do not depend upon, each other, they may be done in any order or simultaneously, so long as both are done prior to step (3) (which utilizes the products of both steps (1) and (2)).

Step 1—the CROP of the 2-oxazoline monomers was performed in solution. The desired amounts of the 2-oxazoline monomers were transferred in a micro-wave vial equipped with a magnetic stirring bar, which was then sealed and immersed in an oil bath at ~100° C. The mixture was bubbled with a nitrogen flow for ~30 minutes before adding dry dichloromethane (DCM). The final monomer concentration in DCM was ~4 mol/L. Subsequently, the MeTos stock solution was added, and the reaction mixture was kept at ~100° C. for times ranging from ~35 minutes to ~4 hours. The conversions were determined by $^1$H NMR. The molar ratio of 2-oxazoline monomers to initiator ranged from ~25:1 to ~100:1.

Step 2—the RAFT polymerization of methacrylic acid (MAA) and 2-ethylhexyl methacrylate (EHMA) was carried out in a ~5M solution in DMF at ~70° C. using 2-cyano-2-propyl benzodithioate (CPBD) as chain transfer agent and V-601 as initiator. As detailed in Examples 17-20, the effect on the hydrophobicity of the final copolymer was evaluated by varying the ratio between the two monomers. For polymer solubility in the grafting-onto reaction solvent (dichloromethane), a molar ratio of [MAA] to [EHMA] of 20:80 was chosen (same as in Example 17). The overall [monomers] to [CPDB] to [V-601] ratio was 100:1:0.25 (also same as in Example 17). The monomer conversion was determined by $^1$H NMR.

Step 3—a solution of the poly(xMA) from Step 2 in dry DCM and containing triethylamine (TEA) was added via a syringe into the capped microwave vial containing the oligomeric oxazoline (co)polymer chains, which are presumed to be "living" and thus to contain an oxazolinium chain end (or a non-equilibrium isomer thereof, or even a reversibly end-capped version thereof). In all but one case, the molar amount of poly(xMA) was calculated, based on the concentration of the pendant carboxylic acid group of the MAA monomer repeat units, to be about 1.4 times (~20/14 molar ratio, or a ~40% excess) of the 2-oxazoline (co)polymer (living) chain ends. In one case (Example 32), the molar amount of the poly(xMA) was calculated, based on the concentration of the pendant carboxylic acid group of the MAA monomer repeat units, to be about 2.8 times (~20/7 molar ratio, or a ~180% excess) of the 2-oxazoline (co)polymer (living) chain ends. The TEA was included in a consistent amount sufficient to assist in the grafting-onto reaction (such as in a ~3-fold molar excess), e.g., by helping deprotonate the carboxylic acid hydrogens, allowing more facile reaction with the (e.g., oxazolinium species at the) 2-oxazoline (co)polymer chain ends. The concentration of the mixture in Step 3 was targeted to be ~2 mol/L. This mixture was heated to temperatures ranging from ~70° C. to ~120° C. for ~1 hour. The resulting graft copolymers were analyzed via GPC without further purification and, in addition to molecular weights and PDI, deconvolution (if necessary) and comparison of integrated peak areas of the unreacted brush arms and brush copolymer were used to help calculate grafting efficiency, a.k.a. brush yield (using OriginPro 2019b Academic software).

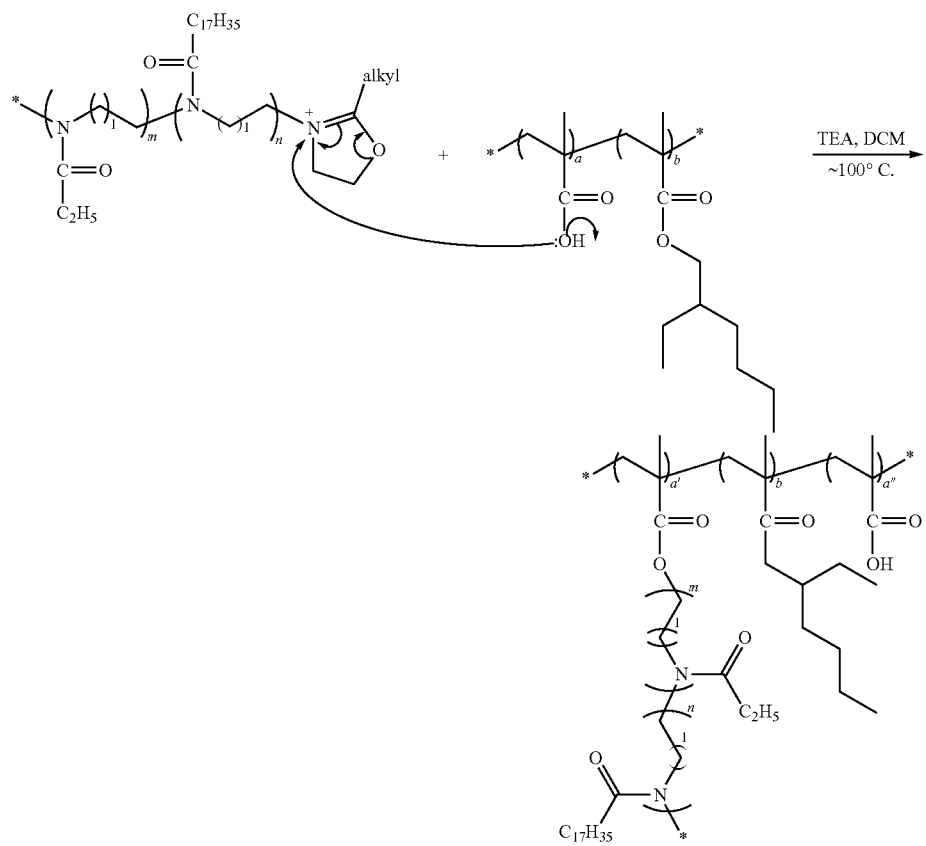

Despite the short-hand graphic representation of Step 3 in the equation above, all repeat units of both the backbone and brush arms of the brush copolymers are believed not to be block copolymers or "blocky" in nature—they are believed to be substantially randomly copolymerized, or close to it. Also, the short-hand graphic representation of the ring-opened ethyl oxazoline monomer being nearest the attachment point to the backbone is arbitrary—it should be understood that either repeat unit may actually be attached at each grafting point from the copolymeric backbone. Asterisks are used as placeholders for initiator and terminal chain ends for convenience only.

reaction time on monomer conversion and molecular weight distribution. Example 22 was considered the most balanced reaction for comparison and, as such, the remainder of EtOx-SteOx copolymers targeted ~1 hour CROP reaction time and ~85-90% conversion (the lone exception was Example 31, where a higher targeted degree of copolymerization necessitated an increased CROP reaction time to achieve the targeted conversion level). Examples 22, 28, and 29 explore variations in EtOx-SteOx comonomer ratio at roughly constant degree of polymerization, which yielded expected variations in measured brush arm number average molecular weight but substantially no variation in measured

TABLE 5

| Sample | EtOx:SteOx:Init | CROP time | Conv [%] | $Mn^{th}$ [g/mol] | $Mn^{ms}$ [g/mol] | polyOx PDI |
|---|---|---|---|---|---|---|
| Ex. 21 | ~12.5:12.5:1 | ~35 mins | ~50 | ~2600 | ~4500 | ~1.19 |
| Ex. 22 | ~12.5:12.5:1 | ~60 mins | ~85 | ~4300 | ~7000 | ~1.15 |
| Ex. 23 | ~12.5:12.5:1 | ~120 mins | ≥99 | ~5100 | ~5500 | ~1.16 |
| Ex. 24 | ~12.5:12.5:1 | ~180 mins | ≥99 | ~5100 | ~6700 | ~1.14 |
| Ex. 25 | ~12.5:12.5:1 | ~60 mins | ~85-90 | ~4700 | ~4600 | ~1.18 |
| Ex. 26 | ~12.5:12.5:1 | ~60 mins | ~85-90 | ~4600 | ~4700 | ~1.18 |
| Ex. 27 | ~12.5:12.5:1 | ~60 mins | ~85-90 | ~4100 | ~5300 | ~1.18 |
| Ex. 28 | ~7.5:17.5:1 | ~60 mins | ~85-90 | ~5100 | ~5800 | ~1.16 |
| Ex. 29 | ~2.5:22.5:1 | ~60 mins | ~85-90 | ~6500 | ~6000 | ~1.17 |
| Ex. 30 | ~25:25:1 | ~60 mins | ~85-90 | ~9200 | ~9300 | ~1.21 |
| Ex. 31 | ~50:50:1 | ~240 mins | ~85-90 | ~20400 | ~10400 | ~1.22 |
| Ex. 32 | ~12.5:12.5:1 | ~60 mins | ~85-90 | ~5100 | ~6100 | ~1.17 |

Details for Step 1 involving Examples 21-32 are shown in Table 5 above, all of which involve EtOx and SteOx comonomers. Examples 21-24 explore the effect of CROP brush arm PDI. Examples 22, 30, and 31 explore variations in EtOx-SteOx degree of polymerization, which also yielded some variations in measured brush arm number average molecular weight with only minor variation in measured brush arm PDI. Although ~1 hour CROP reaction time was sufficient for both a 25 and 50 degree of polymerization in Examples 22 and 30, it should be noted that a 100 degree of polymerization (Example 31) took ~4 times as long to achieve a similar monomer conversion and resulted in a measured number average molecular weight much more of a departure from theoretical than the lower degrees of polymerization.

For Step 2 of each of Examples 21-32, the backbone copolymer synthesized in Example 17 was utilized. As such, each poly(xMA) for Examples 21-32 was identical in kind and, in all but one Example, in molar amount relative to oxazoline brush arm copolymer chain ends as well (as mentioned above, Example 32 calculated the relative molar amount differently, to leave more unreacted methacrylic acid pendant groups and to thus create fewer oxazoline brush arm graft points).

TABLE 6

| Sample | EtOx:SteOx | graft Temp | total $Mn^{th}$ [g/mol] | total $Mn^{ms}$ [g/mol] | grafted PDI | Brush yield |
|---|---|---|---|---|---|---|
| Ex. 21 | ~12.5:12.5 | ~100° C. | ~54000 | ~41000 | ~1.14 | ~58% |
| Ex. 22 | ~12.5:12.5 | ~100° C. | ~78000 | ~60000 | ~1.18 | ~79% |
| Ex. 23 | ~12.5:12.5 | ~100° C. | ~89000 | ~55000 | ~1.17 | ~65% |
| Ex. 24 | ~12.5:12.5 | ~100° C. | ~89000 | ~51000 | ~1.19 | ~70% |
| Ex. 25 | ~12.5:12.5 | ~70° C. | ~84000 | ~57000 | ~1.20 | ~75% |
| Ex. 26 | ~12.5:12.5 | ~80° C. | ~82000 | ~60000 | ~1.21 | ~87% |
| Ex. 27 | ~12.5:12.5 | ~120° C. | ~75000 | ~64000 | ~1.21 | ~87% |
| Ex. 28 | ~7.5:17.5 | ~100° C. | ~89000 | ~65000 | ~1.21 | ~84% |
| Ex. 29 | ~2.5:22.5 | ~100° C. | ~109000 | ~74500 | ~1.21 | ~56% |
| Ex. 30 | ~25:25 | ~100° C. | ~147000 | ~106000 | ~1.33 | ~74% |
| Ex. 31 | ~50:50 | ~100° C. | ~303000 | ~130000 | ~1.33 | ~63% |
| Ex. 32 | ~12.5:12.5 | ~100° C. | ~54000 | ~39300 | ~1.16 | ~78% |

Details for Step 3 involving Examples 21-32 are shown in Table 6 above. The grafted brush copolymers show narrow molecular weight distributions approximately in line with or only slightly higher than the brush arm copolymers themselves, strongly implying that the grafting-onto step is a relatively fast reaction: when the poly(xMA) is added to the reaction mixture containing the oxazoline copolymer, the deprotonated carboxylic acid groups of the MAA repeat units on the copolymeric backbone appear to immediately react with the (living) oxazoline brush arm chain ends, resulting in well-defined brush copolymers. As noted in the Step 1 analysis, Examples 21-24 varied CROP time for the polyOx brush arm reaction, but it seems like Example 22, which contained the targeted conversion, also unexpectedly showed an improved brush yield over the samples having both lower and higher monomer conversion. Perhaps not coincidentally, therefore, the grafted brush copolymer of Example 22 also exhibited the closest agreement of measured number average molecular weight to theoretical of those four experiments. This only reinforced the choice of the conditions of Example 22 as exemplary and comparative for further studies. Nevertheless, the relatively high brush yields across the variety of monomer conversions in these samples indicates that the grafting-onto reaction works efficiently even with less than optimal reaction conditions. Examples 22 and 25-27 explore variations in the temperature of the grafting reaction, which seemed to indicate a relatively linear correlation between grafting temperature and brush yield with relatively little effect on molecular weight distribution. It was noted that, at lower (~70/80° C.) and higher (~120° C.) temperatures, slightly more side reactions can be observed than at an intermediate temperature (~100° C.), which could reduce solubility of the resulting grafted copolymers in hydrocarbon lubricant oil. As noted in the Step 1 analysis, Examples 22, 28, and 29 explore variations in EtOx-SteOx comonomer ratio at roughly constant degree of polymerization, which, in addition to the effects noted in the Step 1 analysis, also seemed to indicate a non-linear relationship between decreasing brush yield and increasing SteOx content. As noted in the Step 1 analysis, Examples 22, 30, and 31 explore variations in EtOx-SteOx degree of polymerization at roughly constant comonomer ratio, which, in addition to the effects noted in the Step 1 analysis, also seemed to indicate a relatively linear decrease in brush yield with increasing degree of polymerization. Based on the impact of increasing SteOx content on brush yield from Examples 22, 28, and 29, perhaps this indication was not surprising. Examples 22 and 32 explore the impact of reducing the proportion of graft chains to graft point anchors (carboxylate pendant moieties of the methacrylic acid repeat units), which appeared to exhibit a slightly decreased brush yield and a slightly decreased measured number average molecular weight, relative to theoretical. Unsurprisingly, the decreased reaction/functionality of the carboxylic acid portions of the MAA copolymers. However, the relatively low polydispersity for the brush copolymer, similar in comparison to the polydispersity of the brush arms themselves, reinforces the resiliency of the chemistry of the grafting-onto reaction, even under less than optimal reaction conditions.

TABLE 7

| Sample | SteOx:EtOx | total $Mn^{th}$ [g/mol] | grafted PDI | Turbid trans (heat) [° C.] | Turbid trans (cool) [° C.] | DSC trans (cool) [° C.] |
|---|---|---|---|---|---|---|
| Ex. 21 | ~12.5:12.5 | ~54000 | ~1.14 | ~45 | ~34 | — |
| Ex. 22 | ~12.5:12.5 | ~78000 | ~1.18 | ~46 | ~34 | ~29 |
| Ex. 23 | ~12.5:12.5 | ~89000 | ~1.17 | ~38 | — | — |
| Ex. 24 | ~12.5:12.5 | ~89000 | ~1.19 | ~47 | ~44 | — |
| Ex. 25 | ~12.5:12.5 | ~84000 | ~1.20 | — | — | — |
| Ex. 26 | ~12.5:12.5 | ~82000 | ~1.21 | — | — | — |

TABLE 7-continued

| Sample | SteOx:EtOx | total Mn$^{th}$ [g/mol] | grafted PDI | Turbid trans (heat) [° C.] | Turbid trans (cool) [° C.] | DSC trans (cool) [° C.] |
|---|---|---|---|---|---|---|
| Ex. 27 | ~12.5:12.5 | ~75000 | ~1.21 | ~54 | ~48 | — |
| Ex. 28 | ~7.5:17.5 | ~89000 | ~1.21 | ~46 | ~36 | ~29 |
| Ex. 29 | ~2.5:22.5 | ~109000 | ~1.21 | ~51 | ~49 | ~36 |
| Ex. 30 | ~25:25 | ~147000 | ~1.33 | — (insoluble) | — (insoluble) | ~18 |
| Ex. 31 | ~50:50 | ~303000 | ~1.33 | — (insoluble) | — (insoluble) | none |
| Ex. 32 | ~12.5:12.5 | ~54000 | ~1.16 | — (insoluble) | — (insoluble) | ~16 |

In addition to GPC and $^1$H NMR analysis, the brush copolymers of Examples 21-32 were subject to analysis by DSC and turbidity equipment, to elucidate thermal and solution-based transitions. As above, for DSC measurements, a first fast heating/cooling cycle from ~−80° C. to ~150° C. at ~60° C./min was used to remove the thermal history of the samples, then two further cycles at ~1° C./min were performed. Because the exotherms appear as peaks in the DSC output, indicating alpha transitions, they are postulated to imply crystallization upon cooling (and correspondingly dissolution upon heating), which indicates Upper Critical Solution Temperature (UCST) behavior over the measured temperature range. The solubility behavior of Examples 21-32 in diluent oil/basestock were evaluated via turbidity measurements. The brush copolymers were each mixed with (dissolved in) Yubase™ 4 (~5 mg polymer/mL diluent) and then subjected to two heating/cooling cycles from ~15° C. to ~85° C., with turbidity being measured at a wavelength of ~600 nm. As above, turbidity transition temperatures were approximated as the temperature at ~50% transmission on both heating and cooling cycles. Numbers reported are from the second cycle of each kind. Turbidity and DSC data involving measured transition temperatures, where available, are presented in Table 7 above.

TABLE 8

| Sample | Oxazoline type | Ox:Init | Conv [%] | Mn$^{th}$ [g/mol] | Mn$^{ms}$ [g/mol] | polyOx PDI |
|---|---|---|---|---|---|---|
| Ex. 33 | EtOx:SteOx | ~12.5:12.5:1 | ~87 | ~4400 | ~5200 | ~1.22 |
| Ex. 34 | isoSteOx:SteOx | ~12.5:12.5:1 | ~95 | ~7400 | ~6300 | ~1.19 |
| Comp D | isoSteOx | ~25:1 | ~82 | ~6300 | ~5200 | ~1.22 |

Details for Step 1 involving Examples 33-34 and Comparative Example D are shown in Table 8 above, in tandem with the CROP description herein. CROP reactions for these were all done at ~100° C. for ~1 hour to attain the conversion reported. All measured molecular weights were in reasonable agreement with theoretical molecular weights, and all polydispersities were relatively narrow/low.

For Step 2 of each of Examples 33-34 and Comparative Example D, the backbone copolymer synthesized in Example 17 was utilized. As such, each poly(xMA) for Examples 33-34 and Comparative Example D was identical in kind and in molar amount relative to oxazoline brush arm copolymer chain ends as well.

Details for Step 3 involving Examples 33-34 and Comparative Example D are shown in Table 9 above. The grafted brush copolymers show narrow molecular weight distributions approximately in line with the brush arm copolymers themselves. The relatively low brush yield for these samples, at least relative to the brush copolymers involving EtOx:SteOx copolymer brush arms, indicated a solubility problem in the Step 3 solvent, which also implied difficulty in establishing thermal and turbidity transitions. Indeed, DSC experiments verified that the brush copolymers of Example 34 and Comparative Example D were both soluble at all temperatures in the analysis range, and that the brush copolymer of Example 33 is relatively insoluble at all temperature in the analysis range. Thus, none of these samples indicate Upper Critical Solution Temperature (UCST) behavior over the measured temperature range.

The disclosures of all patents, articles and other materials described herein are hereby incorporated, in their entirety, into this specification by reference. A description of a composition comprising, consisting of, or consisting essentially of multiple specified components, as presented herein and in the appended claims, should be construed to also encompass compositions made by admixing said multiple specified components. The principles, preferred embodiments and modes of operation of the present invention have been described in the foregoing specification. What applicants submit is their invention, however, is not to be construed as limited to the particular embodiments disclosed, since the disclosed embodiments are regarded as illustrative rather than limiting. Changes may be made by those skilled in the art without departing from the spirit of the invention.

What is claimed is:

1. A brush copolymer composition comprising a copolymeric backbone and copolymeric brush arms, wherein: the

TABLE 9

| Sample | Oxazoline type | Ox ratio | graft Temp | total Mn$^{th}$ [g/mol] | total Mn$^{ms}$ [g/mol] | grafted PDI | Brush yield |
|---|---|---|---|---|---|---|---|
| Ex. 33 | EtOx:SteOx | ~12.5:12.5 | ~100° C. | ~34000 | ~55000 | ~1.19 | ~43% |
| Ex. 34 | isoSteOx:SteOx | ~12.5:12.5 | ~100° C. | ~47000 | ~49000 | ~1.16 | ~35% |
| Comp D | isoSteOx | ~25 | ~100° C. | ~47000 | ~50000 | ~1.16 | ~45% | copolymeric brush arms comprise monomeric repeat units of at least two different acylated poly (alkylene amine) s of formulae (1) and (2):

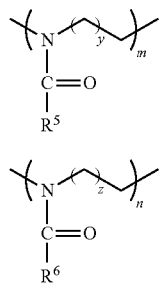

(1)

(2)

wherein each $R^5$ is individually hydrogen or a linear or branched $C_1$-$C_{24}$ alkyl moiety; each $R^6$, being different from each $R^5$ although having the same or a greater number of carbons than each $R^5$, is individually a linear or branched $C_8$-$C_{24}$ alkyl moiety; y and z are each 1 or 2; and a sum of m+n is from 90 mol % to 100 mol % of an average degree of polymerization of the copolymeric brush arms; and the copolymeric backbone comprises monomeric repeat units of at least two different acrylate monomers of formulae (3) and (4):

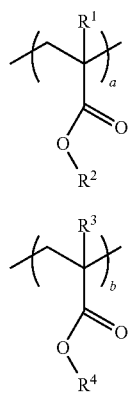

(3)

(4)

wherein each $R^1$ and $R^3$ are individually hydrogen, a linear or branched $C_1$-$C_4$ alkyl moiety, or a mixture thereof; each $R^2$ is individually a covalently-linked copolymeric brush arm, a residual hydrogen, a residual trisubstituted silyl group in which the substitutions are each individually a linear, branched, and/or cyclic $C_1$-$C_8$ alkyl, aryl, alkaryl, or aralkyl moiety, a residual linear, cyclic, or branched $C_1$-$C_7$ acyl moiety, a residual linear or branched $C_1$-$C_4$ hydroxyalkyl moiety, or a residual monovalent counterion; each R4 is individually a linear, branched, and/or cyclic $C_8$-$C_{30}$ alkyl, aryl, alkaryl, or aralkyl moiety; and a sum of a +b is from 90 mol % to 100 mol % of an average degree of polymerization of the copolymeric backbone.

2. A method of making a brush copolymer composition comprising a copolymeric backbone and copolymeric brush arms, the method comprising: providing a copolymeric backbone comprising monomeric repeat units of at least two different acrylate monomers of formulae (3) and (4):

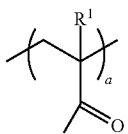

(3)

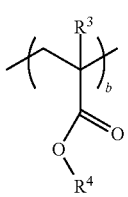

(4)

wherein each $R^1$ and $R^3$ are individually hydrogen, a linear or branched $C_1$-$C_4$ alkyl moiety, or a mixture thereof; each $R^2$ is individually a hydrogen, a trisubstituted silyl group in which the substitutions are each individually a linear, branched, and/or cyclic $C_1$-$C_8$ alkyl, aryl, alkaryl, or aralkyl moiety, a linear, cyclic, or branched C1-C7 acyl moiety, a linear or branched $C_1$-$C_4$ hydroxyalkyl moiety, or a monovalent counterion; a sum of a +b is from 90 mol % to 100 mol % of an average degree of polymerization of the copolymeric backbone; and each $R^4$ is individually a linear or branched $C_8$-$C_{30}$ alkyl, aryl, alkaryl, or aralkyl moiety providing copolymeric brush arms comprising monomeric repeat units of at least two different acylated poly (alkylene amine) s of formulae (1) and (2):

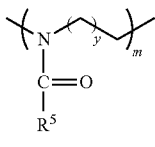

(1)

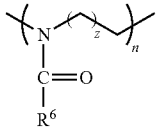

(2)

wherein each $R^5$ is individually hydrogen or a linear or branched $C_1$-$C_{24}$ alkyl moiety; each $R^6$, being different from each $R^5$ although having the same or a greater number of carbons than each $R^5$, is individually a linear or branched $C_8$-$C_{24}$ alkyl moiety; y and z are each 1 or 2; and a sum of m+n is from 90 mol % to 100 mol % of an average degree of polymerization of the copolymeric brush arms; wherein the copolymeric brush arms are made via a cationic ring-opening polymerization (CROP) process using heterocyclic monomers containing a nitrogen and an oxygen atom, in which the additive chain end is terminated in a stabilized heterocyclic cation; and grafting the copolymeric brush arms onto the copolymeric backbone by: activating the acrylate monomeric repeat units of formula (3) in the copolymeric backbone by removing $R^2$ and/or forming a carboxylate anion; and coupling the stabilized heterocyclic cation in the copolymeric brush arms to the activated repeat units of formula (3), thereby effectively grafting the copolymer brush arms onto the copolymeric backbone and thereby forming the brush copolymer composition.

3. The brush copolymer composition of claim 1, wherein: a polydispersity of one, two, or all of the copolymeric backbone, the copolymeric brush arms, and the brush copolymer composition, as measured using gel permeation chromatography (GPC) with tetrahydrofuran (THF) containing ~2% (v/v) triethylamine (TEA) as an eluent at ~40° C. against poly (methyl methacrylate) (PMMA) standards, is (are) less than 1.60; and/or a number average molecular weight of the brush copolymer composition, as measured using gel permeation chromatography (GPC) with tetrahydrofuran (THF) containing ~2% (v/V) TEA as an eluent at ~40° C. against poly (methyl methacrylate) (PMMA) standards, is from 30,000 g/mol to 100,000 g/mol.

4. The brush copolymer composition of claim 1, wherein: each $R^5$ is individually a linear or branched $C_2$-$C_{18}$ alkyl moiety; each $R^6$ is individually a linear $C_8$-$C_{20}$ alkyl moiety; each $R^1$ and $R^3$ are individually hydrogen or methyl; each $R^2$ is individually a covalently-linked copolymeric brush arm, a residual hydrogen, or a residual linear or branched $C_1$-$C_4$ hydroxyalkyl moiety; each $R^4$ is individually a linear or branched $C_8$-$C_{24}$ alkyl moiety; and y and z are each 1.

5. The brush copolymer composition of claim 1, wherein at least 50 mol % or at least 60 mol % of the $R^2$ groups are covalently-linked copolymeric brush arms.

6. The brush copolymer composition of claim 1, wherein the copolymeric backbone is made via a reversible deactivation radical polymerization (RDRP) process.

7. The brush copolymer composition of claim 1, wherein one or more of the following is satisfied: (i) a ratio of a: b is from 1:14 to 1:2; (ii) a ratio of m:n is from 1:25 to 2:1; (iii) the sum of a +b is 250 or less; or (iv) the sum of m+n is 75 or less.

8. A lubricant composition comprising: at least 70 wt % of one or more lubricating oil basestocks; up to 25 wt % of at least one lubricant additive comprising an antioxidant, a corrosion inhibitor, an anti-wear additive, a friction modifier, a dispersant, a detergent, a defoaming agent, an extreme pressure additive, a pour point depressant, a seal-swelling control agent, or a combination thereof; and from 0.5 wt % to 12 wt % of a brush copolymer composition according to claim 1.

9. The brush copolymer composition of claim 7, wherein the at least two different monomer repeat units of formulae (3) and (4) provide the copolymer backbone with a calculated solubility parameter of at most 9.45 $(cal/cm^3)^{1/2}$.

* * * * *